(12) United States Patent
Kami et al.

(10) Patent No.: US 8,514,255 B2
(45) Date of Patent: Aug. 20, 2013

(54) INFORMATION STORAGE MEDIUM, IMAGE CONTROL DEVICE, AND IMAGE CONTROL METHOD

(75) Inventors: Hirofumi Kami, Machida (JP); Masanao Kuroda, Yokohama (JP); Masahide Kito, Tokyo (JP); Katsunori Kimizu, Yokohama (JP); Naohiro Hayashi, Kawasaki (JP); Tomokazu Matsumaru, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 306 days.

(21) Appl. No.: 12/870,300

(22) Filed: Aug. 27, 2010

(65) Prior Publication Data

US 2011/0102469 A1  May 5, 2011

(30) Foreign Application Priority Data

Aug. 31, 2009 (JP) .................................. 2009-200000
Aug. 31, 2009 (JP) .................................. 2009-200002

(51) Int. Cl.
*G09G 5/00* (2006.01)

(52) U.S. Cl.
USPC ........... 345/680; 345/679; 345/681; 345/682; 345/683; 345/684; 463/2; 463/30; 463/31; 463/32; 463/33; 463/34; 463/35

(58) Field of Classification Search
USPC .......... 345/679–683; 463/2, 30–35; 715/706
See application file for complete search history.

(56) References Cited

U.S. PATENT DOCUMENTS 7,140,962 B2 *  11/2006  Okuda et al. ...................... 463/2
2009/0042647 A1 *  2/2009  Muller ............................. 463/31

FOREIGN PATENT DOCUMENTS

| CN | 1520913 A | 8/2004 |
| JP | 04-304571 A | 10/1992 |
| JP | A-2008-71069 | 3/2008 |

* cited by examiner

Primary Examiner — Xiao M. Wu
Assistant Examiner — Todd Buttram
(74) Attorney, Agent, or Firm — Oliff & Berridge, PLC

(57) ABSTRACT

An image control device includes a display control section that performs a normal display control process that controls an image based on a first designation position, and controls the image based on a second designation position, and performs a special display control process that controls the image based on the first designation position and the second designation position based on a given condition.

29 Claims, 31 Drawing Sheets

FIG.9
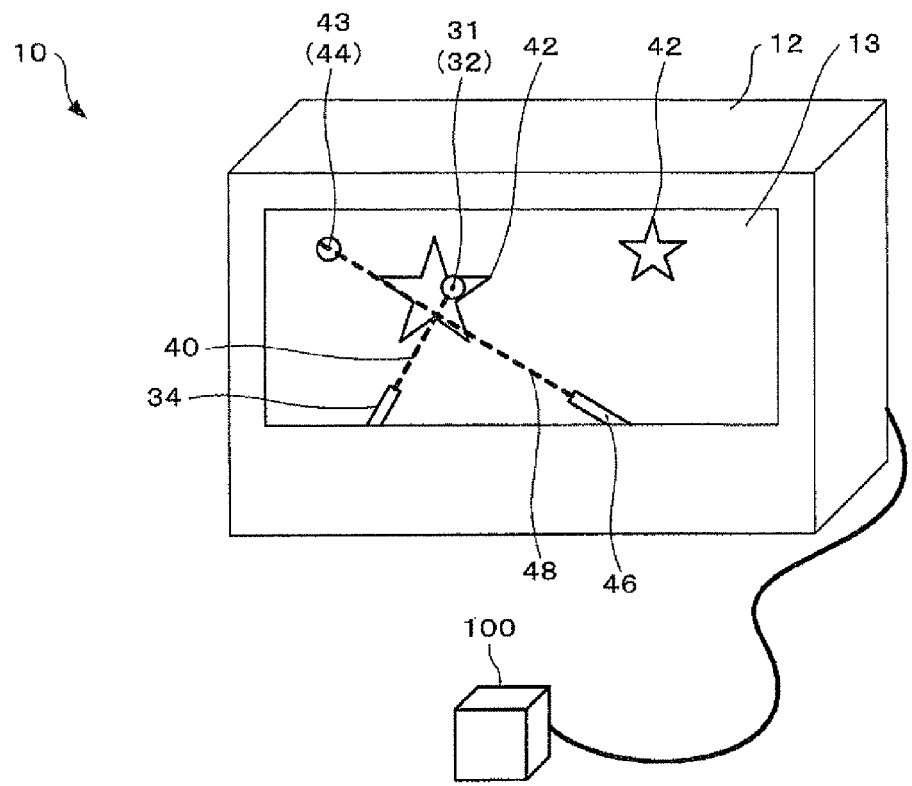
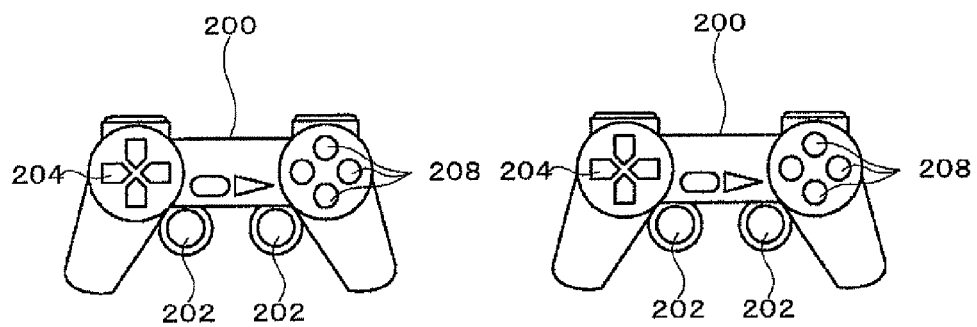

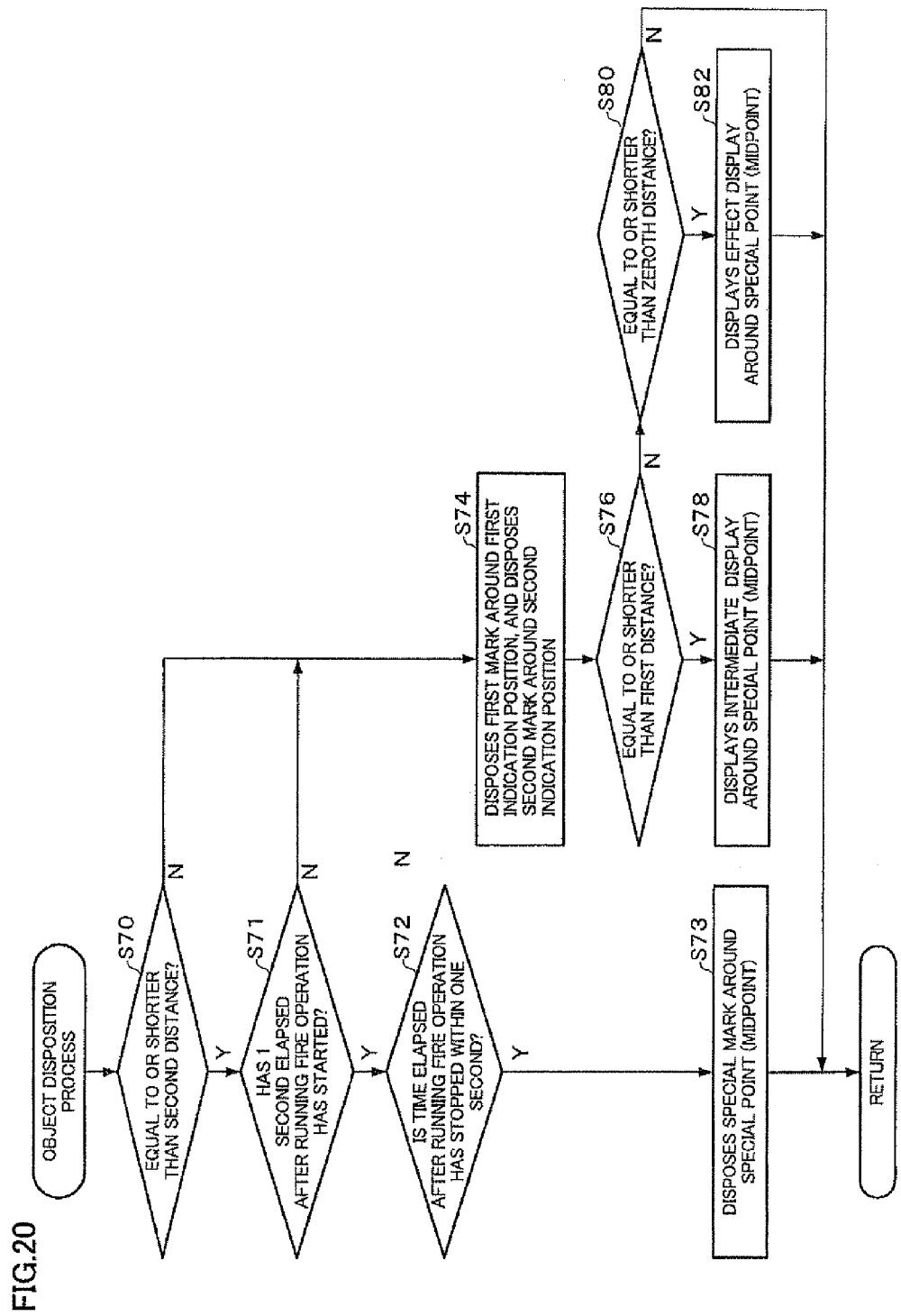

FIG.21
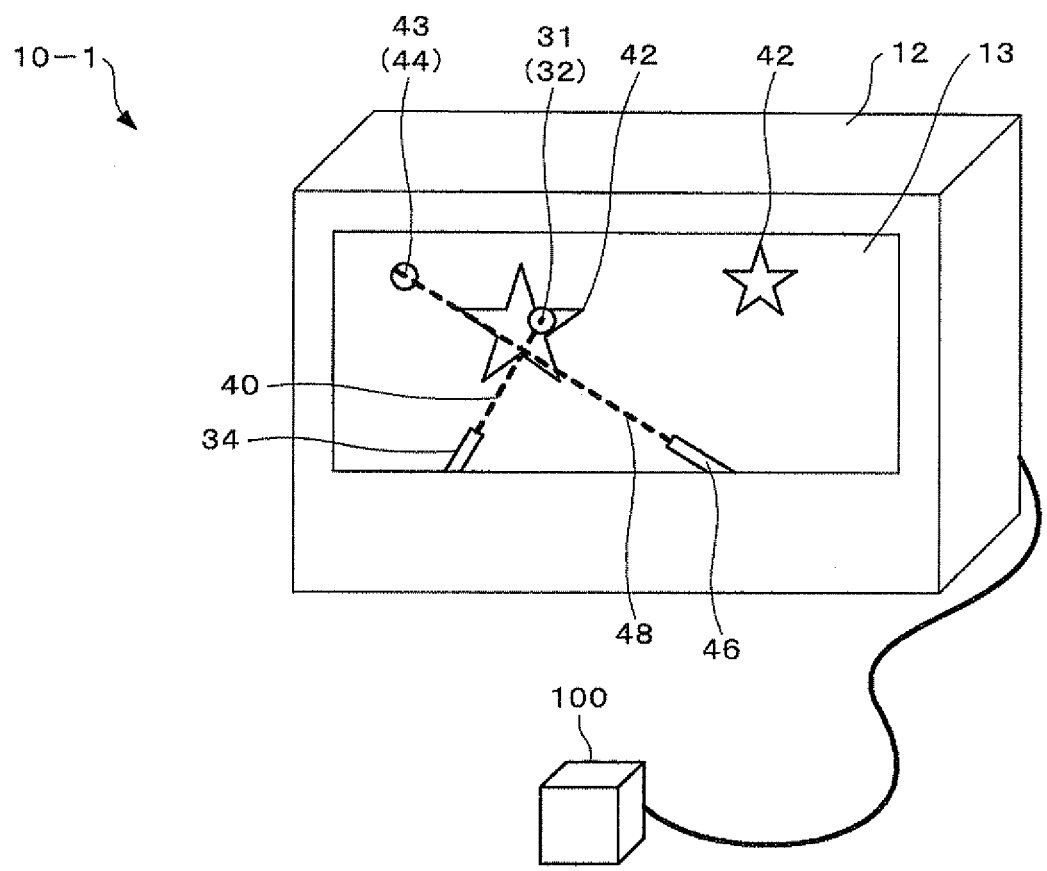
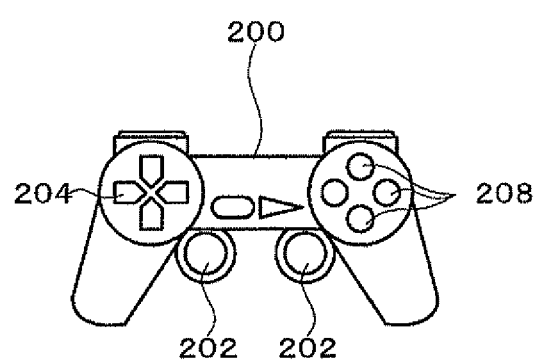

INFORMATION STORAGE MEDIUM, IMAGE CONTROL DEVICE, AND IMAGE CONTROL METHOD

Japanese Patent Application No. 2009-200000 filed on Aug. 31, 2009, and Japanese Patent Application No. 2009-200002 filed on Aug. 31, 2009, are hereby incorporated by reference in their entirety.

BACKGROUND OF THE INVENTION

The present invention relates to an information storage medium, an image control device, and an image control method.

An image control device that sets an indication position based on information about an operation that indicates a position within an image, and controls the image based on the indication position, has been known. Such an image control device may display the position, the moving path, or the like of a moving object (e.g., arrow or bullet) based on the indication position (see JP-A2008-71069).

A related-art image control device may set information that indicates an indication position indicated by each of two operation sections within a single display screen, and may display the position, the moving path, or the like of a moving object that corresponds to each operation section based on each indication position. However, a related-art image control device performs a process similar to that performed when using a single operation section even when using two operation sections.

SUMMARY

According to a first aspect of the invention, there is provided a non-transitory information storage medium storing a program for controlling an image, the program causing a computer to function as:

a designation position setting section that sets a first designation position based on first information that changes based on a first operation that designates a position within the image, and sets a second designation position based on second information that changes based on a second operation that designates a position within the image; and a display control section that performs a normal display control process that controls the image based on the first designation position, and controls the image based on the second designation position, the display control section performing a special display control process that controls the image based on the first designation position and the second designation position based on a given condition.

According to a second aspect of the invention, there is provided a non-transitory information storage medium storing a program for controlling an image, the program causing a computer to function as:

a designation position setting section that sets a first designation position based on first information that changes based on a first operation that designates a position within the image, and sets a second designation position based on second information that changes based on a second operation that designates a position within the image; and a display control section that displays a first gun sight that indicates a first attack position based on the first designation position, and displays a second gun sight that indicates a second attack position based on the second designation position, the display control section performing a special display control process that displays an attack effect based on a positional relationship between the first designation position and the second designation position.

According to a third aspect of the invention, there is provided an image control device that controls an image, the image control device comprising:

a designation position setting section that sets a first designation position based on first information that changes based on a first operation that designates a position within the image, and sets a second designation position based on second information that changes based on a second operation that designates a position within the image; and a display control section that performs a normal display control process that controls the image based on the first designation position, and controls the image based on the second designation position, the display control section performing a special display control process that controls the image based on the first designation position and the second designation position based on a given condition.

According to a fourth aspect of the invention, there is provided an image control device that controls an image, the image control device comprising:

a designation position setting section that sets a first designation position based on first information that changes based on a first operation that designates a position within the image, and sets a second designation position based on second information that changes based on a second operation that designates a position within the image; and a display control section that displays a first gun sight that indicates a first attack position based on the first designation position, and displays a second gun sight that indicates a second attack position based on the second designation position, the display control section performing a special display control process that displays an attack effect based on a positional relationship between the first designation position and the second designation position.

According to a fifth aspect of the invention, there is provided an image control method that controls an image, the image control method comprising:

setting a first designation position based on first information that changes based on a first operation that designates a position within the image, and setting a second designation position based on second information that changes based on a second operation that designates a position within the image;

performing a normal display control process that controls the image based on the first designation position, and controls the image based on the second designation position; and performing a special display control process that controls the image based on the first designation position and the second designation position based on a given condition.

According to a sixth aspect of the invention, there is provided an image control method that controls an image, the image control method comprising:

setting a first designation position based on first information that changes based on a first operation that designates a position within the image, and setting a second designation position based on second information that changes based on a second operation that designates a position within the image;

displaying a first gun sight that indicates a first attack position based on the first designation position, and displaying a second gun sight that indicates a second attack position based on the second designation position; and performing a special display control process that displays an attack effect based on a positional relationship between the first designation position and the second designation position.

BRIEF DESCRIPTION OF THE SEVERAL VIEWS OF THE DRAWING

FIG. 9 is a perspective view showing an image control device according to a modification of the first embodiment of the invention.

FIG. 20 is a flowchart showing an example of a process performed by the image control device according to the second embodiment of the invention.

FIG. 21 is a perspective view showing an image control device according to a modification of the second embodiment of the invention.

FIGS. 24A and 2413 are views showing examples of an image displayed on an image control device according to a modification of the second embodiment of the invention.

DETAILED DESCRIPTION OF THE EMBODIMENT

Figure 1A:
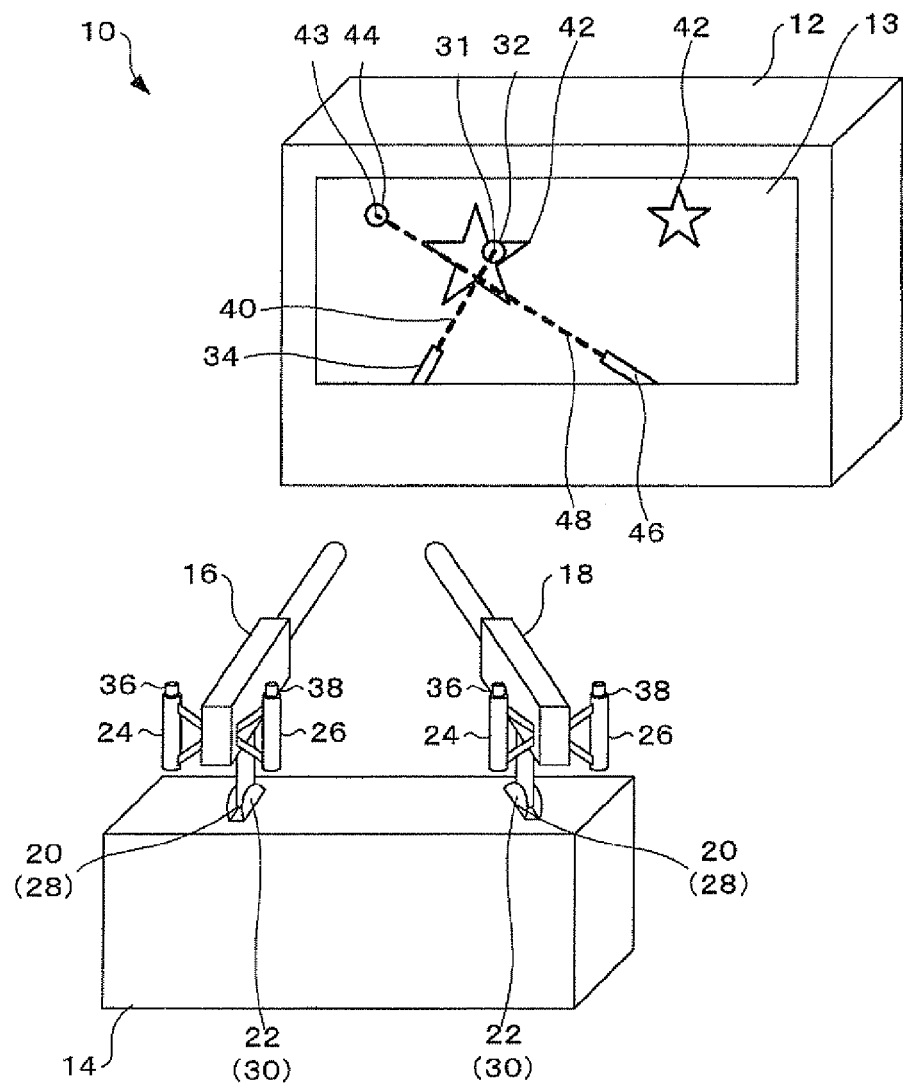
FIGS. 1A and 1B are perspective views showing an image control device according to a first embodiment of the invention.

The invention may provide an information storage medium, an image control device, and an image control method that can display an image generated when a plurality of operations are performed to designate a position within an image.

(1) According to one embodiment of the invention, there is provided a non-transitory information storage medium storing a program for controlling an image, the program causing a computer to function as:

a designation position setting section that sets a first designation position based on first information that changes based on a first operation that designates a position within the image, and sets a second designation position based on second information that changes based on a second operation that designates a position within the image; and a display control section that performs a normal display control process that controls the image based on the first designation position, and controls the image based on the second designation position, the display control section performing a special display control process that controls the image based on the first designation position and the second designation position based on a given condition.

According to the above embodiment, image control based on the first designation position and image control based on the second designation position are individually performed as the normal display control process, and image control based on the first designation position and the second designation position is performed as the special display control process.

Therefore, an image generated when a plurality of operations are performed to designate a position within an image can be displayed based on a given condition.

(2) In the above information storage medium, the display control section may perform the normal display control process that displays a first display based on the first designation position, and displays a second display based on the second designation position, and may perform the special display control process that displays a special display based on the first designation position and the second designation position.

According to the above embodiment, the first display based on the first designation position and the second display based on the second designation position are individually displayed as the normal display control process, and the special display based on the first designation position and the second designation position is displayed as the special display control process.

(3) In the above information storage medium, the program may cause the computer to further function as:

a first position determination section that determines a positional relationship between the first designation position and the second designation position; and the display control section may control at least one of start and finish of the special display control process and start and finish of the normal display control process based on the positional relationship between the first designation position and the second designation position.

According to the above configuration, the special display control process or the normal display control process can be performed based on a change in the positional relationship between the first designation position and the second designation position.

(4) In the above information storage medium, the display control section may perform the normal display control process that displays a first display based on the first designation position, and displays a second display based on the second designation position when the positional relationship between the first designation position and the second designation position is outside a first range, and displays one of a plurality of intermediate displays that gradually change in shape based on the positional relationship between the first designation position and the second designation position, based on the first designation position and the second designation position when the positional relationship between the first designation position and the second designation position is within the first range and outside a second range, and may perform the special display control process that displays a special display based on the first designation position and the second designation position when the positional relationship between the first designation position and the second designation position is within the second range.

According to the above configuration, the first display and the second display gradually change into the special display as the distance between the first designation position and the second designation position decreases, for example.

(5) In the above information storage medium, the display control section may perform at least one of a process that displays a first designation position display that indicates the position designated by the first operation based on the first designation position, and displays a second designation position display that indicates the position designated by the second operation based on the second designation position, a process that displays a first moving path display that indicates a moving path of a first moving object based on the first designation position, and displays a second moving path display that indicates a moving path of a second moving object based on the second designation position, and a process that displays a first movement result display that indicates a movement result of the first moving object based on the first designation position, and displays a second movement result display that indicates a movement result of the second moving object based on the second designation position, as the normal display control process, and may perform at least one of a process that displays a special position display that indicates the positions designated by the first operation and the second operation based on the first designation position and the second designation position, a process that displays the first moving path display that indicates the moving path of the first moving object and the second moving path display that indicates the moving path of the second moving object based on the first designation position and the second designation position, and a process that displays a special movement result display that indicates the movement result of the first moving object and the movement result of the second moving object based on the first designation position and the second designation position, as the special display control process.

According to the above configuration, the first operation and the second operation can be performed based on at least one display as a reference.

(6) In the above information storage medium, the program may cause the computer to further function as a special position calculation section that calculates a special position based on the first designation position and the second designation position; and the display control section may perform the special display control process that controls the image based on the special position.

According to the above configuration, an image based on a change in the special position can be displayed when the special display control process is performed.

(7) In the above information storage medium, the program may cause the computer to further function as a second position determination section that performs a normal position determination process that determines a positional relationship between a display object displayed within the image and the first designation position, and determines a positional relationship between the display object and the second designation position, and performs a special position determination process that determines a positional relationship between the display object and the special position.

According to the above configuration, the first operation and the second operation can be arbitrarily performed, or can be performed in connection with each other.

(8) In the above information storage medium, the second position determination section may perform the normal position determination process that determines the positional relationship between the display object and the first designation position based on a third range, and determines the positional relationship between the display object and the second designation position based on the third range, and may perform the special position determination process that determines the positional relationship between the display object and the special position based on a fourth range.

According to the above configuration, the position determination result differs between the case where the normal position determination process is performed and the case where the special position determination process is performed.

(9) In the above information storage medium, the program may cause the computer to further function as a first position determination section that determines whether or not a positional relationship between the first designation position and the second designation position is within a given range; and the display control section may perform the normal display control process that controls the image based on the first designation position, and controls the image based on the second designation position when the positional relationship between the first designation position and the second designation position is outside the given range, and may perform the special display control process that controls the image based on at least one of the first designation position and the second designation position when the positional relationship between the first designation position and the second designation position is within the given range.

According to the above configuration, image control based on the first designation position and image control based on the second designation position are individually performed as the normal display control process, and image control based on at least one of the first designation position and the second designation position is performed as the special display control process.

Moreover, an image generated when a plurality of operations are performed to designate a position within an image can be displayed based on a given condition.

(10) In the above information storage medium, the program may cause the computer to further function as a counter section that counts a given time; and the display control section controls at least one of start and finish of the special display control process and start and finish of the normal display control process based on whether or not the given time has elapsed.

According to the above configuration, the special display control process or the normal display control process can be performed based on whether or not the given time has elapsed.

(11) In the above information storage medium, the program may cause the computer to further function as an event determination section that determines whether or not a given event has occurred; and the display control section may control at least one of start and finish of the special display control process and start and finish of the normal display control process based on occurrence of the given event.

According to the above configuration, the special display control process or the normal display control process can be performed based on occurrence of the given event.

(12) In the above information storage medium, the designation position setting section may set three or more designation positions based on three or more pieces of information that respectively change based on three or more operations that designate a position within the image; and the display control section may perform the normal display control process that controls the image based on each of the three or more designation positions, may perform the special display control process that controls the image based on the three or more designation positions, and may control at least one of start and finish of the special display control process and start and finish of the normal display control process based on the number of the designation positions.

According to the above configuration, the special display control process or the normal display control process can be performed based on a change in the number of designation positions.

(13) In the above information storage medium, the program may cause a computer to further function as an attribute setting section that links one of a plurality of attributes to each of the first designation position and the second designation position; and the display control section may control at least one of start and finish of the special display control process and start and finish of the normal display control process based on the combination of the attributes linked to the first designation position and the second designation position.

According to the above configuration, the special display control process or the normal display control process can be performed based on a change in the combination of the attributes.

(14) In the above information storage medium, the program may cause the computer to further function as a second position determination section that determines a positional relationship between a display object displayed within the image and the first designation position, and determines a positional relationship between the display object and the second designation position; and the second position determination section may determine the positional relationship between the display object and the first designation position based on a third range, and may determine the positional relationship between the display object and the second designation position based on the third range when the normal display control process is performed, and may determine the positional relationship between the display object and the first designation position based on a fourth range, and may determine the positional relationship between the display object and the second designation position based on the fourth range when the special display control process is performed.

According to the above configuration, the position determination result differs between the case where the normal position determination process is performed and the case where the special position determination process is performed.

(15) In the above information storage medium, the program may cause the computer to further function as:

an attribute setting section that links one of a plurality of attributes to each of the first designation position and the second designation position; and a range change section that changes the fourth range based on the combination of the attributes linked to the first designation position and the second designation position.

According to the above configuration, the position determination result when the special display control process is performed changes based on the combination of the attributes linked to the first designation position and the second designation position.

(16) In the above information storage medium, the program may cause the computer to further function as an update section that updates a given parameter with a first update parameter when the normal display control process is performed, and updates the given parameter with a second update parameter when the special display control process is performed.

According to the above configuration, the update parameter of the given parameter differs between the case where the normal display control process is performed and the case where the special display control process is performed.

(17) In the above information storage medium, the program may cause the computer to further function as:

an attribute setting section that links one of a plurality of attributes to each of the first designation position and the second designation position; and an update parameter change section that changes at least one of the first update parameter and the second update parameter based on the combination of the attributes linked to the first designation position and the second designation position.

According to the above configuration, the update parameter of the given parameter changes based on the combination of the attributes linked to the first designation position and the second designation position.

(18) In the above information storage medium,
the program may cause the computer to further function as an attribute setting section that links one of a plurality of attributes to each of the first designation position and the second designation position; and
the display control section may control the image based on the combination of the attributes linked to the first designation position and the second designation position.

According to the above configuration, the image displayed changes based on the combination of the attributes linked to the first designation position and the second designation position.

(19) In the above information storage medium,
the display control section may function as an object space setting section that sets an object in an object space, a virtual camera control section that controls at least one of a position, a direction, and an angle of view of a virtual camera, and a drawing section that draws an image of the object space viewed from the virtual camera; and
the virtual camera control section may control at least one of the position, the direction, and the angle of view of the virtual camera based on the given condition.

According to the above configuration, virtual camera control can be changed based on starts or finish of the normal display control process or the special display control process.

(20) In the above information storage medium,
the program may cause the computer to further function as a second position determination section that determines a positional relationship between a display object displayed within the image and the first designation position, and determines a positional relationship between the display object and the second designation position; and
the display control section may perform the special display control process based on the positional relationship between the display object and the first designation position and the positional relationships between the display object and the second designation position.

According to the above configuration, the special display control process or the normal display control process can be performed based on the positional relationship between the display object and the first designation position and the positional relationship between the display object and the second designation position.

(21) In the above information storage medium,
the display control section may perform the normal display control process that moves the display object based on the first designation position, and moves the display object based on the second designation position, and may perform the special display control process that moves the display object based on at least one of the first designation position and the second designation position.

According to the above embodiment, the display object is moved based on a change in the first designation position or the second designation position as the normal display control process, and the display object is moved based on a change in the first designation position and the second designation position as the special display control process.

(22) In the above information storage medium,
the second position determination section may determine whether or not a positional relationship between a first object displayed within the image and the first designation position satisfies a third condition, determine whether or not a positional relationship between a second object displayed within the image and the first designation position satisfies the third condition, determine whether or not a positional relationship between the first object and the second designation position satisfies the third condition, and determine whether or not a positional relationship between the second object and the second designation position satisfies the third condition; and
the display control section may perform the normal display control process that moves the first object based on the first designation position when the positional relationship between the first object and the first designation position satisfies the third condition, and moves the first object based on the second designation position when the positional relationship between the first object and the second designation position satisfies the third condition, and may perform the special display control process that moves the second object based on at least one of the first designation position and the second designation position when the positional relationship between the second object and the first designation position and the positional relationship between the second object and the second designation position satisfy the third condition.

According to the above embodiment, the first display object can be moved when the positional relationship between the first display object and the first designation position or the second designation position satisfies the third condition, and the second display object can be moved when the positional relationship between the second display object and each of the first designation position and the second designation position satisfies the third condition.

(23) In the above information storage medium,
the display control section may not move the second object based on the first designation position when the positional relationship between the second object and the second designation position does not satisfy the third condition even when the positional relationship between the second object and the first designation position satisfies the third condition, and may not move the second object based on the second designation position when the positional relationship between the second object and the first designation position does not satisfy the third condition even when the positional relationship between the second object and the second designation position satisfies the third condition.

According to the above embodiment, the second display object is not moved even if the positional relationship between the second display object and the first designation position of the second designation position satisfies the third condition.

(24) In the above information storage medium,
the program may cause the computer to further function as:
a first designation position setting section that sets a first designation position based on first information that changes based on a first operation that designates a position within an image displayed on a first image control device;
a communication control section that causes the first image control device to transmit the first information to a destination, and receive second information that changes based on a second operation that designates a position within an image displayed on a second image control device; and
a second designation position setting section that sets a second designation position based on the second information.

According to the above configuration, image control based on the first designation position and image control based on the second designation position are individually performed as the normal display control process, and image control based on the first designation position and the second designation position is performed as the special display control process.

Specifically, an image generated when a plurality of operations are performed to designate a position within an image displayed on each of a plurality of image control devices can be displayed based on a given condition.

(25) In the above information storage medium,
the communication control section may cause the first image control device to receive two or more pieces of information that respectively change based on two or more operations that designate a position within an image displayed on each of two or more of the second image control devices;

the second designation position setting section may set two or more designation positions based on the two or more pieces of information; and the display control section may perform the normal display control process that controls the image based on the first designation position, and controls the image based on each of the two or more designation positions, may perform the special display control process that controls the image based on the first designation position and the two or more designation positions, and may control at least one of start and finish of the special display control process and start and finish of the normal display control process based on the number of the designation positions.

According to the above configuration, the special display control process or the normal display control process can be performed based on a change in the number of designation positions.

(26) According to another embodiment of the invention, there is provided a non-transitory information storage medium storing a program for controlling an image, the program causing a computer to function as:
a designation position setting section that sets a first designation position based on first information that changes based on a first operation that designates a position within the image, and sets a second designation position based on second information that changes based on a second operation that designates a position within the image; and a display control section that displays a first gun sight that indicates a first attack position based on the first designation position, and displays a second gun sight that indicates a second attack position based on the second designation position, the display control section performing a special display control process that displays an attack effect based on a positional relationship between the first designation position and the second designation position.

According to the above embodiment, the special display control process that displays the attack effect can be performed as the special display control process based on the positional relationship between the first gun sight and the second gun sight.

Therefore, an attack effect image generated can be displayed when a plurality of operations are performed to designate a position within an image.

(27) According to another embodiment of the invention, there is provided an image control device that controls an image, the image control device comprising:
a designation position setting section that sets a first designation position based on first information that changes based on a first operation that designates a position within the image, and sets a second designation position based on second information that changes based on a second operation that designates a position within the image; and a display control section that performs a normal display control process that controls the image based on the first designation position, and controls the image based on the second designation position, the display control section performing a special display control process that controls the image based on the first designation position and the second designation position based on a given condition.

(28) According to another embodiment of the invention, there is provided an image control device that controls an image, the image control device comprising:
a designation position setting section that sets a first designation position based on first information that changes based on a first operation that designates a position within the image, and sets a second designation position based on second information that changes based on a second operation that designates a position within the image; and a display control section that displays a first gun sight that indicates a first attack position based on the first designation position, and displays a second gun sight that indicates a second attack position based on the second designation position, the display control section performing a special display control process that displays an attack effect based on a positional relationship between the first designation position and the second designation position.

(29) According to another embodiment of the invention, there is provided an image control method that controls an image, the image control method comprising:
setting a first designation position based on first information that changes based on a first operation that designates a position within the image, and setting a second designation position based on second information that changes based on a second operation that designates a position within the image;

performing a normal display control process that controls the image based on the first designation position, and controls the image based on the second designation position; and performing a special display control process that controls the image based on the first designation position and the second designation position based on a given condition.

(30) According to a further embodiment of the invention, there is provided an image control method that controls an image, the image control method comprising:
setting a first designation position based on first information that changes based on a first operation that designates a position within the image, and setting a second designation position based on second information that changes based on a second operation that designates a position within the image;

displaying a first gun sight that indicates a first attack position based on the first designation position, and displaying a second gun sight that indicates a second attack position based on the second designation position; and performing a special display control process that displays an attack effect based on a positional relationship between the first designation position and the second designation position.

Embodiments of the invention are described below. Note that the following embodiments do not in any way limit the scope of the invention defined by the claims laid out herein. Note that all elements described in connection with the following embodiments should not be necessarily taken as essential elements for the invention.

A. First embodiment

1. External Configuration of Image Control Device

FIG. 1A is a perspective view showing the external configuration of an image control device 10 to which an image control device according to one embodiment of the invention is applied. As shown in FIG. 1A, the image control device 10 according to this embodiment includes a display 12 that displays an image, a pedestal 14 that is provided in front of a display screen 13 of the display 12, a first controller 16 (i.e., first operation section or first indicator) that is provided on the upper side of the pedestal 14 and imitates the shape of a machine gun, and a second controller 18 (i.e., second operation section or second indicator) that is provided on the upper side of the pedestal 14 and imitates the shape of a machine gun. The image control device 10 thus allows two players (i.e., operators) to play the game at the same time.

The first controller 16 is secured on the pedestal 14 so that the first controller 16 is rotatable around a first axis 20 that is provided perpendicularly and a second axis 22 that is provided horizontally. A left grip 24 held by the player with the left hand, and a right grip 26 held by the player with the right hand are provided on the rear end of the first controller 16. The player rotates the first controller 16 around the first axis 20 and the second axis 22 (i.e., performs an operation that designates a position) while holding the left grip 24 and the right grip 26 to arbitrarily change the direction of the end (muzzle) of the first controller 16 (i.e., changes the indication position of an indicator). The movable range of the first controller 16 is set so that the end of the first controller 16 can indicate (i.e., designate) a given area of the display screen 13. For example, the movable range of the first controller 16 may be set so that the end of the first controller 16 can indicate the entire area of the display screen 13, or may be set so that the end of the first controller 16 can indicate only a given area of the display screen 13. The first controller 16 includes a first variable resistor 28 that detects the rotation amount of the first controller 16 around the first axis 20, and a second variable resistor 30 that detects the rotation amount of the first controller 16 around the second axis 22.

The image control device 10 calculates a first indication position 31 (i.e., first designation position) that is the position within the display screen 13 (i.e., a position within an image or a position within a display area)) indicated by the end of the first controller 16 as coordinate values (i.e., first information) in a two-dimensional coordinate system (i.e., virtual space) based on the detection result of the first variable resistor 28 and the detection result of the second variable resistor 30 of the first controller 16. The image control device 10 displays a first mark 32 (i.e., first designation position display or first display) that indicates the position indicated by the first controller 16 in the image displayed on the display screen 13 at a position corresponding to the first indication position 31 (i.e., normal display control process).

The image control device 10 displays a first gun object 34 (i.e., display object) that indicates the end of the first controller 16 on the lower side of the image displayed on the display screen 13. The image control device 10 changes the direction of the first gun object 34 corresponding to a change in the direction of the first controller 16 based on the detection result of the first variable resistor 28 and the detection result of the second variable resistor 30 of the first controller 16. In this embodiment, the image control device 10 controls the first gun object 34 so that the first gun object 34 aims at the first indication position 31 (i.e., normal display control process).

When the player has pressed a left button 36 (i.e., first operating section) provided at the upper end of the left grip 24 or a right button 38 (i.e., first operating section) provided at the upper end of the right grip 26, the image control device 10 moves a first bullet object 40 (i.e., first moving object) that indicates a bullet fired from the first gun object 34 from the end of the first gun object 34 toward the center of the first mark 32 (i.e., normal display control process).

The image control device 10 displays a target object 42 (i.e., display object) that indicates a target within the image displayed on the display screen 13 while moving the target object 42. When the player has pressed the left button 36 or the right button 38 of the first controller 16 in a state in which the center of the first mark 32 is positioned within the target object 42, the image control device 10 determines that the first bullet object 40 has hit the target object 42. The image control device 10 then displays an indication (display) that the first bullet object 40 has hit the target object 42.

The second controller 18 includes a left grip 24, a right grip 26, a first variable resistor 28, a second variable resistor 30, a left button 36 (i.e., second operating section), and a right button 38 (i.e., second operating section) in the same manner as the first controller 16. The second controller 18 is secured on the pedestal 14 so that the second controller 18 is rotatable around a first axis 20 and a second axis 22 such that the second controller 18 does not come in contact with the first controller 16. The movable range of the second controller 18 is set so that the end of the second controller 18 can indicate a given area of the display screen 13.

The image control device 10 calculates a second indication position 43 (i.e., second designation position) that is the position within the display screen 13 indicated by the end of the second controller 18 as coordinate values (i.e., second information) in a two-dimensional coordinate system based on the detection result of the first variable resistor 28 and the detection result of the second variable resistor 30 of the second controller 18. The image control device 10 displays a second mark 44 (i.e., second designation position display or second display) that indicates the position indicated by the second controller 18 in the image displayed on the display screen 13 at a position corresponding to the second indication position 43 (i.e., normal display control process).

The image control device 10 displays a second gun object 46 (i.e., display object) that indicates the end of the second controller 18 on the lower side of the image displayed on the display screen 13. The image control device 10 changes the direction of the second gun object 46 corresponding to a change in the direction of the second controller 18 based on the detection result of the first variable resistor 28 and the detection result of the second variable resistor 30 of the second controller 18. In this embodiment, the image control device 10 controls the second gun object 46 so that the second gun object 46 aims at the second indication position 43 (i.e., normal display control process).

When the player has pressed the left button 36 or the right button 38 of the second controller 18, the image control device 10 moves a second bullet object 48 (i.e., second moving object) that indicates a bullet fired from the second gun object 46 from the end of the second gun object 46 toward the center of the second mark 44 (i.e., normal display control process).

When the player has pressed the left button 36 or the right button 38 of the second controller 18 in a state in which the center of the second mark 44 is positioned within the target object 42, the image control device 10 determines that the second bullet object 48 has hit the target object 42. The image control device 10 then displays an indication (display) that the second bullet object 48 has hit the target object 42.

The image control device 10 displays the first mark 32, the first gun object 34, and the first bullet object 40 in blue, and displays the second mark 44, the second gun object 46, and the second bullet object 48 in red. Specifically, the display object that is controlled based on an operation performed using the first controller 16 and the display object that is controlled based on an operation performed using the second controller 18 are identified by the difference in color.

The image control device 10 according to this embodiment is thus configured so that the first mark 32, the second mark 44, the first bullet object 40, and the second bullet object 48 move individually based on an arbitrary operation performed using the first controller 16 or the second controller 18. The image control device 10 determines whether or not the first bullet object 40 has hit the target object 42, and determines whether or not the second bullet object 48 has hit the target object 42.

Figure 1B:
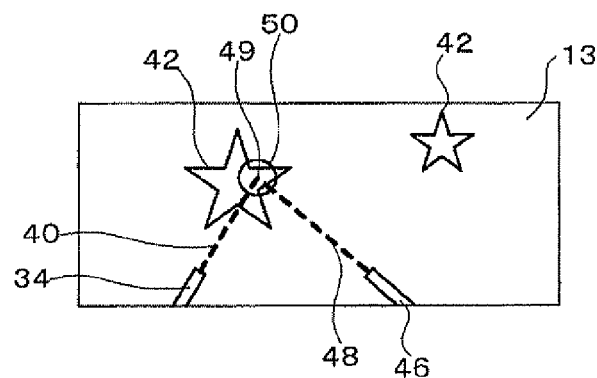

The image control device 10 calculates a midpoint 49 (i.e., special position) between the first indication position 31 and the second indication position 43 (see FIG. 1B) when the distance between the first indication position 31 and the second indication position 43 has become shorter than a given distance (i.e., based on a given condition), and displays a special mark 50 (i.e., special display) that indicates the position indicated by the first controller 16 and the second controller 18 at a position corresponding to the midpoint 49 (i.e., special display control process).

2. Functional Blocks

Figure 2:
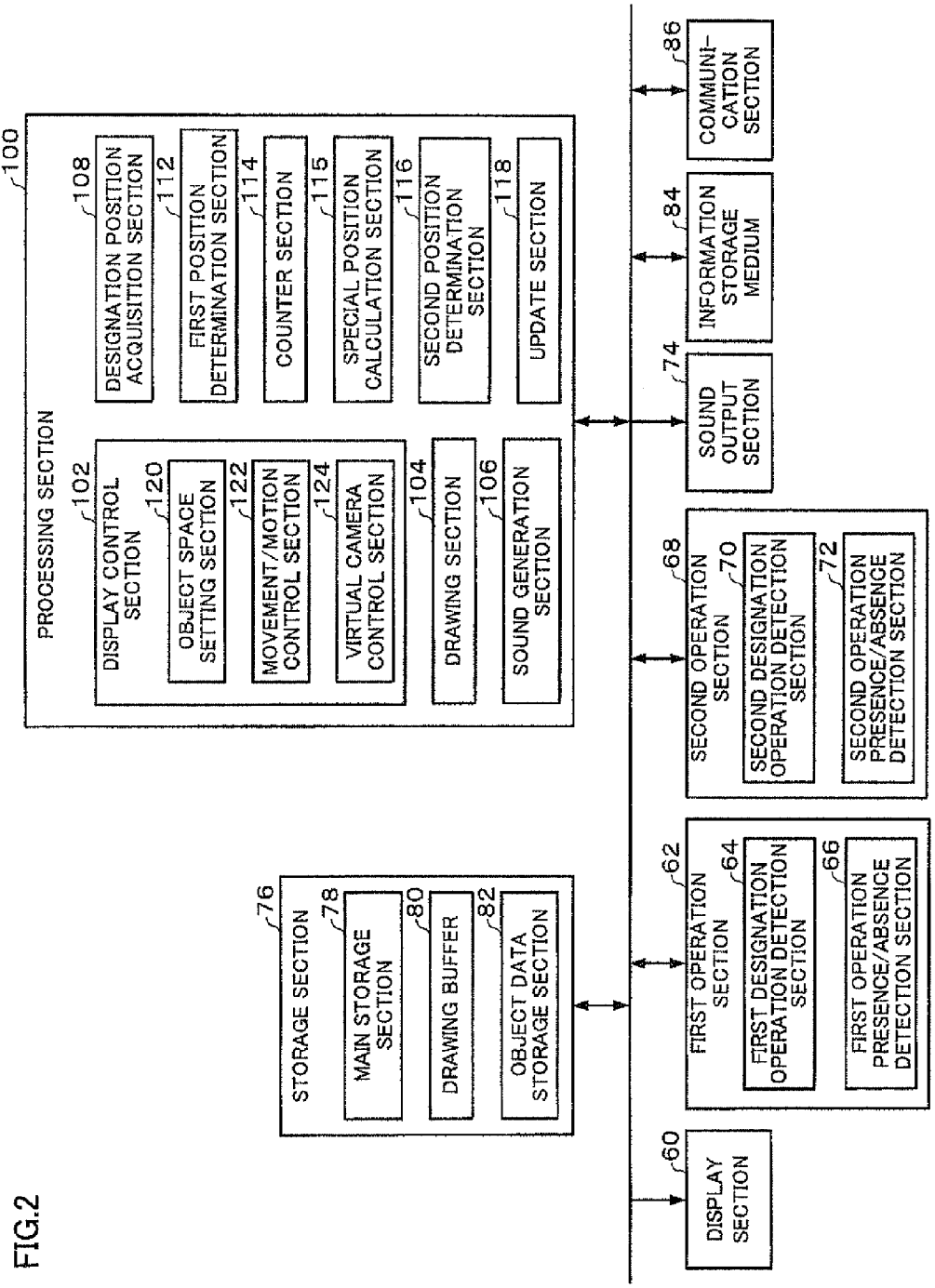
FIG. 2 is a functional block diagram showing the image control device according to the first embodiment of the invention.

FIG. 2 is a block diagram showing the functions of the image control device (game device) 10 according to this embodiment. Note that the image control device 10 may have a configuration in which some of the elements (sections) shown in FIG. 2 are omitted.

A display section 60 displays an image on a display screen. The function of the display section 60 may be implemented by a CRT display, a liquid crystal display, a plasma display, or the like.

A first operation section 62 allows the player to input operation data. The function of the first operation section 62 may be implemented by an operation body that can be arbitrarily changed in direction by the player (e.g., the first controller 16 shown in FIG. 1A that imitates the shape of a machine gun). The first operation section 62 includes a first designation operation detection section 64 and a first operation presence/absence detection section 66.

The first designation operation detection section 64 detects an operation that is performed using the first operation section 62 and designates a position within an image, and outputs first position designation operation information (i.e., first information) that changes based on the operation. The function of the first designation operation detection section 64 may be implemented by a variable resistor, a potentiometer, a rotary encoder, or the like. More specifically, when the first operation section 62 has been rotated around the first axis 20 and the second axis 22 that perpendicularly intersects the first axis 20, the first designation operation detection section 64 outputs a combination of resistance values (i.e., first information) based on the rotation (tilt) direction and the rotation amount of the first operation section 62.

The first operation presence/absence detection section 66 detects an operation performed using the first operating section of the first operation section 62 (e.g., left button 36 or right button 38 shown in FIG. 1A), and outputs specific operation information that changes based on the presence or absence of such an operation. The function of the first operation presence/absence detection section 66 may be implemented by a pressure sensor, a switch, or the like. More specifically, the first operation presence/absence detection section 66 outputs an ON signal (i.e., specific operation information) when the left button 36 or the right button 38 has been pressed, and outputs an OFF signal (i.e., specific operation information) (i.e., does not output the ON signal) when the left button 36 or the right button 38 has not been pressed.

The second operation section 68 includes a second designation operation detection section 70 and a second operation presence/absence detection section 72. The second operation section 68, the second designation operation detection section 70, and the second operation presence/absence detection section 72 have the same functions as those of the first operation section 62, the first designation operation detection section 64, and the first operation presence/absence detection section 66, respectively.

A sound output section 74 outputs sound. The function of the sound output section 74 may be implemented by a speaker, a headphone, or the like.

A storage section 76 serves as a work area for a processing section 100, a communication section 86, and the like. The function of the storage section 76 may be implemented by a RAM (main memory), a VRAM (video memory), or the like. The storage section 76 according to this embodiment includes a main storage section 78 that is used as a work area for the processing section 100, a drawing buffer 80 in which an image displayed on the display section 60 is drawn, and an object data storage section 82 that stores object data.

An information storage medium 84 (computer-readable medium) stores a program, data, and the like. The function of the information storage medium 84 may be implemented by an optical disk (CD or DVD), a magneto-optical disk (MO), a magnetic disk, a hard disk, a magnetic tape, a memory (ROM), or the like. The information storage medium 84 stores a program and data used for the processing section 100 to perform various processes. Specifically, the information storage medium 84 stores a program that causes a computer to function as each section according to this embodiment (i.e., a program that causes a computer to perform the process of each section).

The communication section 86 performs various types of control for communicating with the outside (e.g. host device or another image control device). The function of the communication section 86 may be implemented by hardware such as a processor or a communication ASIC, a program, or the like.

A program (data) that causes a computer to function as each section according to this embodiment may be distributed to the information storage medium 84 (or storage section 78) from an information storage medium included in a host device (server) via a network and the communication section 86. Use of the information storage medium included in the host device (server) is also included within the scope of the invention.

The processing section 100 (processor) performs a game process, an image generation process, a sound generation process, and the like based on operation data from the first operation section 62 and the second operation section 68, a program, and the like. The game process includes starting the game when game start conditions have been satisfied, proceeding with the game, generating an event when event generation conditions have been satisfied, disposing an object such as a character or a topography, displaying an object, calculating the game result, finishing the game when game end conditions have been satisfied, and the like. The processing section 100 performs various processes using the main storage section 78 as a work area. The function of the processing section 100 may be implemented by hardware such as a processor (e.g., CPU (main processor), GPU (drawing processor), or DSP)) or an ASIC (e.g., gate array), or a program.

The processing section 100 includes a display control section 102, a drawing section 104, a sound generation section 106, a designation position setting section 108, a first position determination section 112, a counter section 114, a special position calculation section 115, a second position determination section 116, and an update section 118. The processing section 100 may have a configuration in which some of these sections are omitted.

The display control section 102 controls an image (object image) displayed on the display screen 13 of the display section 60. Specifically, the display control section 102 generates a display target object (e.g., character, moving object, course, building, first gun object 34, second gun object 46, first bullet object 40, second bullet object 48, target object 42, topography, background, first mark 32, second mark 44, or special mark 50), instructs display of the object and the display position, or causes the object to disappear, based on the operation information from the first operation section 62 or the second operation section 68, a program, and the like. Specifically, the display control section 102 registers the generated object in an object list, transfers the object list to the drawing section 104 or the like, or deletes an object that has disappeared from the object list, for example.

The display control section 102 includes an object space setting section 120, a movement/motion processing section 122, and a virtual camera control section 124.

The object space setting section 120 disposes an object (i.e., an object formed by a primitive such as a polygon, free-form surface, or subdivision surface) that represents a display object (e.g., character, moving object, course, or building) or a light source that indicates the travel direction, intensity, and color of light in an object space based on the object data stored in the object data storage section 82. Specifically, the object space setting section 120 determines the position and the rotational angle (synonymous with orientation or direction) of the object in a world coordinate system, and disposes the object at the determined position (X, Y, Z) and the determined rotational angle (rotational angles around X, Y, and Z-axes).

The movement/motion control section 122 calculates the movement/motion of the object (movement/motion simulation). Specifically, the movement/motion processing section 122 causes the object to move or make a motion (animation) in the object space based on the operation information from the first operation section 62 and the second operation section 68, a program (movement/motion algorithm), various types of data (motion data), and the like. Specifically, the movement/motion processing section 122 performs a simulation process that sequentially calculates movement information (position, rotational angle, speed, or acceleration) and motion information (i.e., the position or the rotational angle of each part that forms the object) of the object every frame (1/60th of a second). Note that the term frame refers to a time unit when performing an object movement/motion process (simulation process) or an image generation process.

The virtual camera control section 124 controls a virtual camera (view point) for generating an image viewed from a given (arbitrary) viewpoint in the object space.

Specifically, the virtual camera control section 124 controls the position (X, Y, Z) or the rotational angle (rotational angles around X, Y, and Z-axes) of the virtual camera (i.e., controls the viewpoint position, the line-of-sight direction, or the angle of view).

For example, when photographing the object from behind using the virtual camera, the virtual camera control section 124 controls the position or the rotational angle (direction) of the virtual camera so that the virtual camera follows a change in position or rotation of the object. In this case, the virtual camera control section 124 may control the virtual camera based on information (e.g., position, rotation angle, speed, or acceleration) about the object obtained by the movement/motion processing section 122. Alternatively, the virtual camera control section 124 may rotate the virtual camera by a predetermined rotational angle, or may move the virtual camera along a predetermined path. In this case, the virtual camera control section 124 controls the virtual camera based on virtual camera data that specifies the position (moving path) or the rotational angle of the virtual camera. When a plurality of virtual cameras are provided, the virtual camera control section 124 performs the above control process on each virtual camera.

The drawing section 104 performs a drawing process based on the results of various processes (game process) performed by the processing section 100 to generate an image, and outputs the generated image to the display section 60. When generating a three-dimensional game image, the drawing section 104 receives object data (model data) including vertex data (e.g., vertex position coordinates, texture coordinates, color data, normal vector, or alpha value) of each vertex of the object (model) from the object data storage section 82, and performs a vertex process (shading using a vertex shader) based on the vertex data included in the received object data. When performing the vertex process, the drawing section 104 may perform a vertex generation process (tessellation, surface division, or polygon division) for dividing the polygon, if necessary. In the vertex process, the drawing section 104 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results. The drawing section 104 then performs a rasterization process (scan conversion) based on the vertex data changed by the vertex process so that the surface of the polygon (primitive) is linked to pixels. The drawing section 104 then performs a pixel process (shading using a pixel shader or a fragment process) that draws the pixels that form the image (fragments that form the display screen). In the pixel process, the drawing section 104 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to the rendering target (i.e., the drawing buffer 80 that can store image information corresponding to each pixel). Specifically, the pixel process includes a per-pixel process that sets or changes the image information (e.g., color (color value and luminance value), normal, and alpha value) corresponding to each pixel. The drawing section 104 thus generates an image viewed from the virtual camera (given viewpoint) in the object space. When a plurality of virtual cameras (viewpoints) are provided, the drawing section 104 may generate an image so that images (divided images) viewed from the respective virtual cameras are displayed on a single screen.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process to increase the degree of freedom of the drawing process so that the representation capability can be significantly improved as compared with a fixed drawing process using hardware.

The drawing section 104 performs a geometric process, texture mapping, hidden surface removal, alpha blending, and the like when drawing the object.

In the geometric process, the drawing section 104 subjects the object to coordinate transformation, clipping, perspective projection transformation, light source calculation, and the like. The object data (e.g., object vertex position coordinates, texture coordinates, color data (luminance data), normal vector, or alpha value) after the geometric process (after perspective transformation) is stored in the object data storage section 82.

In texture mapping, a texture (texel value or UV coordinate values) stored in a texture storage section 76 of the video memory is mapped onto the object. Specifically, the drawing section 104 reads a texture (surface properties such as color (RGB) and alpha value) from the texture storage section 76 using the texture coordinates set (assigned) to the vertices of the object, and the like. The drawing section 104 maps the texture (two-dimensional image) onto the object. In this case, the drawing section 104 performs a pixel-texel linking process, a bilinear interpolation process or a trilinear interpolation process (texel interpolation process), and the like.

The sound generation section 106 performs a sound generation process based on the results of various processes performed by the processing section 100 to generate game sound such as background music (BGM), effect sound, or voice, and outputs the generated game sound to the sound output section 74.

The designation position setting section 108 sets the first designation position in the virtual space based on the first information that changes based on an operation that is performed using the first operation section 62 and designates a position within the image. Specifically, the designation position setting section 108 acquires a combination of resistance values (i.e., first information) input from the first operation section 62 each time the frame is updated, calculates coordinate values (i.e., first information) in the virtual plane (i.e., virtual space) specified by a two-dimensional coordinate system based on the combination of resistance values, and sets the coordinate values as the first designation position. The virtual plane corresponds to the entire area (i.e., given area) of the screen (i.e., two-dimensional space) obtained by perspective projection transformation of the object space by the geometric process. For example, the virtual plane may be a plane disposed in a near plane (i.e., a plane nearest to the virtual camera) within a view volume that specifies an object space drawing range.

The designation position setting section 108 sets the second designation position in the virtual space based on the second information that changes based on an operation that is performed using the second operation section 68 and designates a position within the image. Specifically, the designation position setting section 108 acquires a combination of resistance values (i.e., second information) input from the second operation section 68 each time the frame is updated, calculates coordinate values (i.e., second information) in the virtual plane based on the combination of resistance values, and sets the coordinate values as the second designation position.

The display control section 102 then performs the normal display control process that controls the image based on the first designation position, and controls the image based on the second designation position. Specifically, the display control section 102 performs the normal display control process that displays the first mark 32 based on the first designation position independently of the second designation position, and displays the second mark 44 based on the second designation position independently of the second designation position (see FIG. 1A). More specifically, the display control section 102 disposes a transparent polygon for the first mark 32 at a position corresponding to the first designation position in the virtual plane specified by the two-dimensional coordinate system, and disposes a transparent polygon for the second mark 44 at a position corresponding to the second designation position in the virtual plane specified by the two-dimensional coordinate system.

The drawing section 104 maps a texture having a color distribution that indicates the first mark 32 onto the transparent polygon for the first mark 32, and draws the polygon to display the first mark 32. The drawing section 104 also maps a texture having a color distribution that indicates the second mark 44 onto the transparent polygon for the second mark 44, and draws the polygon to display the second mark 44. Since the virtual plane in which the transparent polygon for the first mark 32 and the transparent polygon for the second mark 44 are disposed, is disposed in the near plane, the first mark 32 and the second mark 44 are displayed on the front side as compared with other objects disposed in the object space. Note that the drawing section 104 may draw the virtual plane in which the first mark 32 and the second mark 44 are disposed in a drawing area differing from the drawing area in which the image viewed from the virtual camera is drawn, and superimpose the drawn image on the image viewed from the virtual camera.

The first position determination section 112 determines the positional relationship between the first designation position and the second designation position each time the frame is updated. Specifically, the first position determination section 112 determines whether or not the distance (i.e., positional relationship) between the first designation position and the second designation position in the virtual plane is longer than a zeroth distance, whether or not the distance (i.e., positional relationship) between the first designation position and the second designation position in the virtual plane is longer than a first distance shorter than the zeroth distance, or whether or not the distance (i.e., positional relationship) between the first designation position and the second designation position in the virtual plane is longer than a second distance shorter than the first distance. Alternatively, the first position determination section 112 may determine whether or not the second designation position is included within a zeroth range that is formed around the first designation position (i.e., positional relationship), whether or not the second designation position is included within a first range that is formed around the first designation position and is smaller than the zeroth range (i.e., positional relationship), or whether or not the second designation position is included within a second range that is formed around the first designation position and is smaller than the first range (i.e., positional relationship).

The counter section 114 counts a given time. Specifically, the counter section 114 starts to count a first count value when the left button 36 or the right button 38 of the first controller 16 shown in FIG. 1A has been pressed, and the left button 36 or the right button 38 of the second controller 18 has been pressed. The counter section 114 resets the first count value when the first count value has reached a given count value (i.e., when a given time has elapsed), or when the left button 36 or the right button 38 of the first controller 16 has been released, or when the left button 36 or the right button 38 of the second controller 18 has been released.

The counter section 114 starts to count a second count value when the left button 36 or the right button 38 of the first controller 16 has been released, and the left button 36 or the right button 38 of the second controller 18 has been released.

The counter section 114 resets the second count value when the second count value has reached a given count value (i.e., when a given time has elapsed), or when the left button 36 or the right button 38 of the first controller 16 has been pressed, or when the left button 36 or the right button 38 of the second controller 18 has been pressed.

The special position calculation section 115 calculates the special position in the virtual space based on the first designation position and the second designation position each time the frame is updated. Specifically, the special position calculation section 115 calculates the coordinates of the midpoint between the first designation position and the second designation position in the virtual plane specified by the two-dimensional coordinate system. The special position calculation section 115 may calculate the special position when the determination result of the first position determination section 112 or the count value of the counter section 114 has satisfied a given condition (i.e., based on a given condition or when a first condition has been satisfied), or may calculate the special position irrespective of a given condition.

When the determination result of the first position determination section 112 or the count value of the counter section 114 has satisfied a given condition (i.e., based on a given condition or when a first condition has been satisfied), the display control section 102 starts the special display control process that controls the image based on the special position.

Specifically, the display control section 102 performs the special display control process that controls the image based on the first designation position and the second designation position based on a given condition. More specifically, the display control section 102 displays the special mark 50 that indicates the position designated by the first controller 16 and the second controller 18 based on the special position (see FIG. 113). The display control section 102 disposes a transparent polygon for the special mark 50 at a position corresponding to the special position in the virtual plane specified by the two-dimensional coordinate system.

The drawing section 104 maps a texture having a color distribution that indicates the special mark 50 onto the transparent polygon for the special mark 50, and draws the polygon to display the special mark 50. Since the virtual plane in which the transparent polygon for the special mark 50 is disposed, is disposed in the near plane, the special mark 50 is displayed on the front side as compared with other objects disposed in the object space. Note that the drawing section 104 may draw the virtual plane in which the special mark 50 is disposed in a drawing area differing from the drawing area in which the image viewed from the virtual camera is drawn, and superimpose the drawn image on the image viewed from the virtual camera.

When the determination result of the first position determination section 112 or the count value of the counter section 114 has not satisfied a given condition (i.e., based on a given condition or when a second condition has been satisfied), the display control section 102 finishes the special display control process, and starts the normal display control process that controls the image based on the first designation position, and controls the image based on the second designation position. Specifically, the display control section 102 controls at least one of start and finish of the special display control process and start and finish of the normal display control process based on a given condition taking account of the positional relationship between the first designation position and the second designation position or whether or not a given time has elapsed. The display control section 102 may perform the special display control process and the normal display control process at the same time, or may selectively perform the special display control process or the normal display control process.

The second position determination section 116 performs a normal position determination process that determines the positional relationship between the target object 42 and the first designation position, and determines the positional relationship between the target object 42 and the second designation position each time the frame is updated, when the first mark 32 and the second mark 44 are displayed (i.e., based on a given condition when the normal display control process is performed). The second position determination section 116 alternately performs the process that determines the positional relationship between the target object 42 and the first designation position and the process that determines the positional relationship between the target object 42 and the second designation position every frame when the first mark 32 and the second mark 44 are displayed. This reduces the processing load that occurs within one frame due to the positional relationship determination process. The second position determination section 116 performs a special position determination process that determines the positional relationship between the target object 42 and the special position when the special mark 50 is displayed (i.e., when the special display control process is performed). The second position determination section 116 may perform the normal position determination process and the special position determination process at the same time based on a given condition, or may selectively perform the normal position determination process or the special position determination process. The positional relationship determination method according to this embodiment is described below with reference to FIGS. 3A and 3B.

Figure 3A:
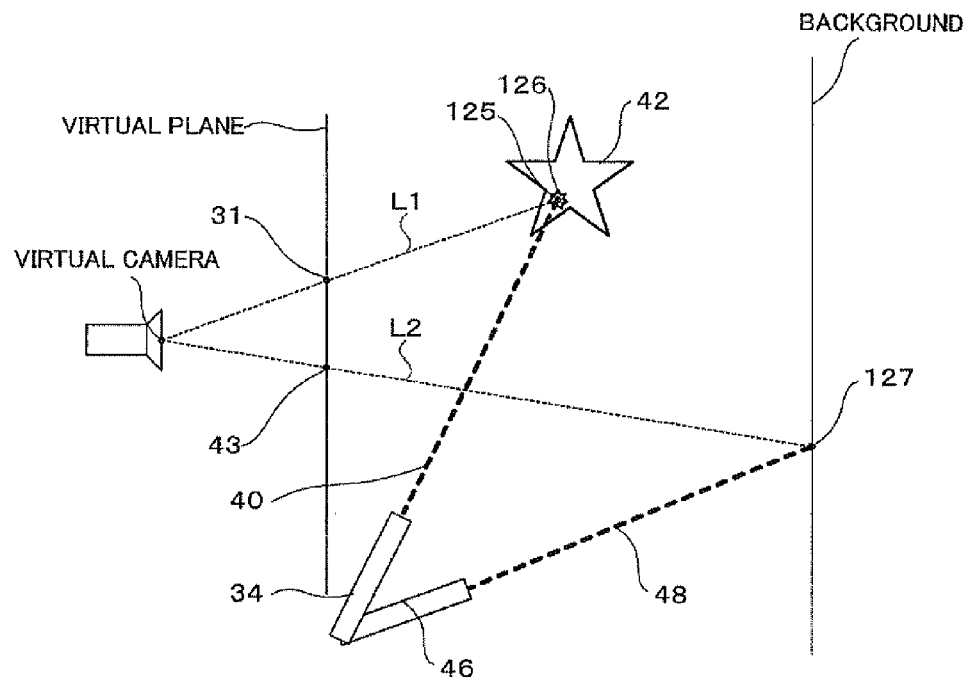
FIGS. 3A and 3B are views illustrative of a method employed in the image control device according to the first embodiment of the invention.
Figure 3B:
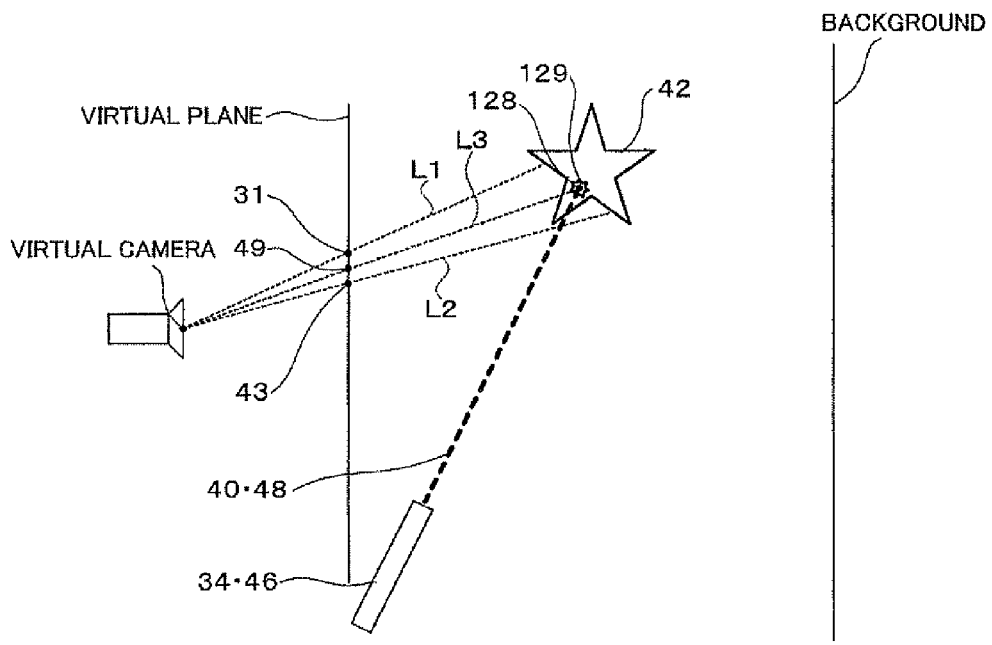

FIGS. 3A and 3B are views showing the object space along the virtual plane specified by the two-dimensional coordinate system. In FIGS. 3A and 3B, the virtual plane is indicated by a line. When the first mark 32 and the second mark 44 are displayed, the second position determination section 116 determines whether or not a first straight line L1 that passes through the position of the virtual camera (viewpoint) and the first indication position 31 disposed in the virtual plane intersects the target object 42 (i.e., the positional relationship between the display object and the first designation position), and determines whether or not a second straight line L2 that passes through the position of the virtual camera and the second indication position 43 disposed in the virtual plane intersects the target object 42 (i.e., the positional relationship between the display object and the second designation position), as shown in FIG. 3A. The second position determination section 116 thus determines whether or not the target object 42 overlaps the first mark 32 on the display screen 13, and determines whether or not the target object 42 overlaps the second mark 44 on the display screen 13.

When the first straight line L1 intersects the target object 42 (see FIG. 3A), the display control section 102 moves the first bullet object 40 from the first gun object 34 toward an intersection point 125 of the first straight line L1 and the target object 42, and displays a normal bullet mark display 126 (i.e., first movement result display) that indicates that the first bullet object 40 has hit the intersection point 125 (i.e., normal display control process). When the second straight line L2 does not intersect the target object 42, and intersects the background object that is positioned in the deepest area of the object space, the display control section 102 moves the second bullet object 48 from the second gun object 46 toward an intersection point 127 of the second straight line L2 and the background object. The display control section 102 does not display the normal bullet mark display 126 (i.e., second movement result display) that indicates that the second bullet object 48 has hit the background object at the intersection point 127 of the second straight line L2 and the background object.

When the special mark 50 is displayed, the second position determination section 116 determines whether or not a third straight line L3 that connects the position of the virtual camera and the midpoint 49 between the first indication position 31 and the second indication position 43 in the virtual plane intersects the target object 42 (i.e., the positional relationship between the display object and the special position) (see FIG. 3B). The second position determination section 116 thus determines whether or not the target object 42 overlaps the special mark 50 on the display screen 13.

When the third straight line L3 intersects the target object 42 (see FIG. 3B), the display control section 102 moves the first bullet object 40 from the first gun object 34 toward an intersection point 128 of the third straight line L3 and the target object 42, moves the second bullet object 48 from the second gun object 46 toward the intersection point 128 of the third straight line L3 and the target object 42 (i.e., special display control process), and displays a special bullet mark display 129 (i.e., special movement result display) that indicates that the first bullet object 40 and the second bullet object 48 have hit the intersection point 128 (i.e., special display control process). In FIG. 3B (i.e., a view showing the object space along the virtual plane), the first gun object 34 coincides with the second gun object 46 in the direction in the virtual plane, and the first bullet object 40 coincides with the second bullet object 48 in the direction in the virtual plane.

When the third straight line L3 does not intersect the target object 42, and intersects the background object that is positioned in the deepest area of the object space, the display control section 102 moves the first bullet object 40 from the first gun object 34 toward the intersection point of the third straight line L3 and the background object and moves the second bullet object 48 from the second gun object 46 toward the intersection point of the third straight line L3 and the background object (not shown). The display control section 102 does not display the special bullet mark display 129 (i.e., special movement result display) that indicates that the first bullet object 40 and the second bullet object 48 have hit the background object at the intersection point of the third straight line L3 and the background object.

When the first mark 32 and the second mark 44 are displayed, the second position determination section 116 determines the positional relationship between the target object 42 and the first designation position based on a third range, and determines the positional relationship between the target object 42 and the second designation position based on a third range. When the special mark 50 is displayed, the second position determination section 116 determines the positional relationship between the target object 42 and the special position based on a fourth range.

Specifically, the object space setting section 120 sets a hit determination volume having the third range to the target object 42 when the normal position determination process is performed (i.e., when the first mark 32 and the second mark 44 are displayed), and sets a hit determination volume having a fourth range larger than the third range to the target object 42 when the special position determination process is performed (i.e., when the special mark 50 is displayed). The second position determination section 116 determines whether or not the first straight line L1 or the second straight line L2 shown in FIG. 3A intersects the hit determination volume having the third range when the normal position determination process is performed, and determines whether or not the third straight line L3 shown in FIG. 3B intersects the hit determination volume having the fourth range when the special position determination process is performed.

The update section 118 updates a given parameter with a first update parameter when the first mark 32 and the second mark 44 are displayed, and updates a given parameter with a second update parameter when the special mark 50 is displayed. Specifically, the update section 118 updates a destruction parameter set to the target object 42 each time the first bullet object 40 or the second bullet object 48 hits the target object 42. The target object 42 is destroyed when the destruction parameter has been updated and reached a given value. The update section 118 updates the destruction parameter so that the update amount (i.e., first update parameter) when updating the destruction parameter when the first mark 32 and the second mark 44 are displayed (i.e., when the normal position determination process is performed) is smaller than the update amount (i.e., second update parameter) when updating the destruction parameter when the special mark 50 is displayed (i.e., when the special position determination process is performed).

The display control section 102 displays a state in which the target object 42 is destroyed when the destruction parameter set to the target object 42 has reached a given value.

Figure 4A:
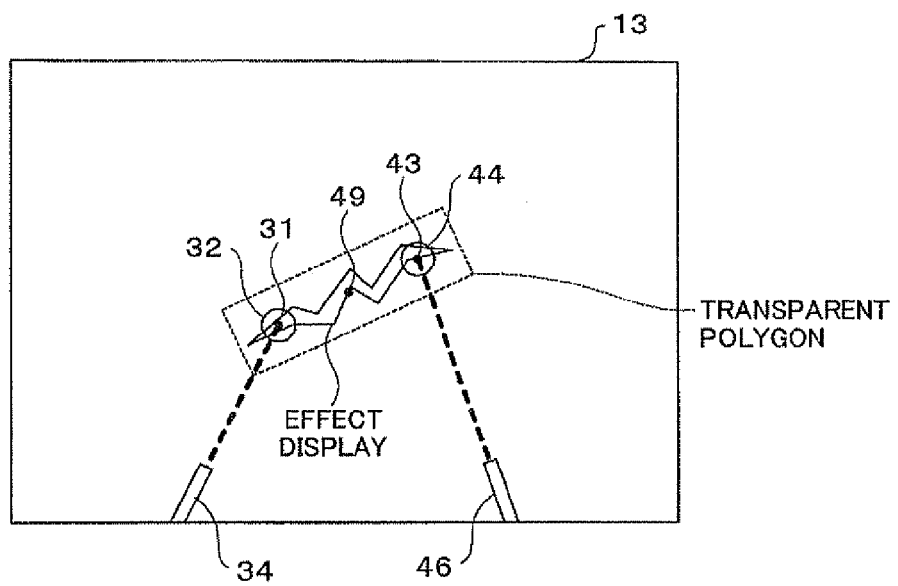
FIGS. 4A and 4B are views showing examples of an image displayed on the image control device according to the first embodiment of the invention.
Figure 4B:
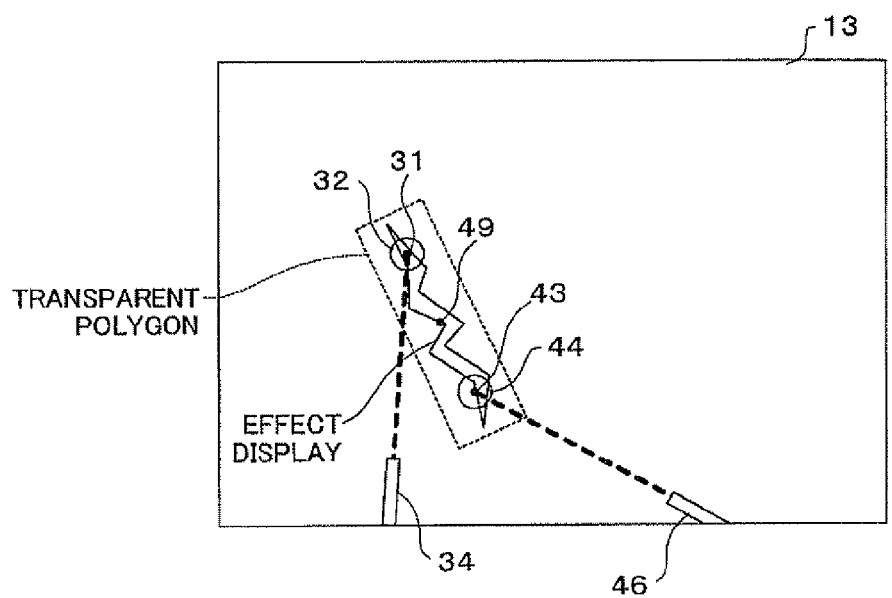

3. Method According to this Embodiment 3-1. Display of First Mark and Second Mark FIGS. 4A and 4B are views showing examples of an image displayed on the display screen 13 of the image control device 10 according to this embodiment. In this embodiment, when the distance between the first indication position 31 and the second indication position 43 in the virtual plane is longer than the first distance (i.e., outside the first range), the first mark 32 is displayed at a position corresponding to the first indication position 31, and the second mark 44 is displayed at a position corresponding to the second indication position 43 (i.e., normal display control process), as shown in FIG. 1A.

As shown in FIG. 4A, when the distance between the first indication position 31 and the second indication position 43 is longer than the first distance and is equal to or shorter than the zeroth distance (i.e., within the zeroth range and outside the first range) due to a decrease in the distance between the first indication position 31 and the second indication position 43, an effect display that imitates lightning is displayed to connect the first mark 32 that is displayed at a position corresponding to the first indication position 31 and the second mark 44 that is displayed at a position corresponding to the second indication position 43 (i.e., special display control process). The effect display is implemented by mapping an effect display texture having a color distribution that indicates lightning onto a transparent polygon that is disposed in the virtual plane around the midpoint 49 between the first indication position 31 and the second indication position 43.

The transparent polygon is fixed to a line segment that connects the first indication position 31 and the second indication position 43. As shown in FIG. 4B, when the positional relationship between the first indication position 31 and the second indication position 43 has changed due to the movement of the first indication position 31 or the second indication position 43, the position and the direction of the transparent polygon change based on the change in the positional relationship between the first indication position 31 and the second indication position 43. Therefore, when the distance between the first indication position 31 and the second indication position 43 is longer than the first distance and is equal to or shorter than the zeroth distance, an effect display that imitates lightning is displayed to connect the first mark 32 and the second mark 44 even if the positional relationship between the first indication position 31 and the second indication position 43 has changed.

In this embodiment, a plurality of effect display textures are provided. The effect display textures differ in the shape of lightning by degrees. The effect display textures are successively mapped onto the transparent polygon with the lapse of time. An animation of lightning (effect display) is thus displayed.

Figure 5A:
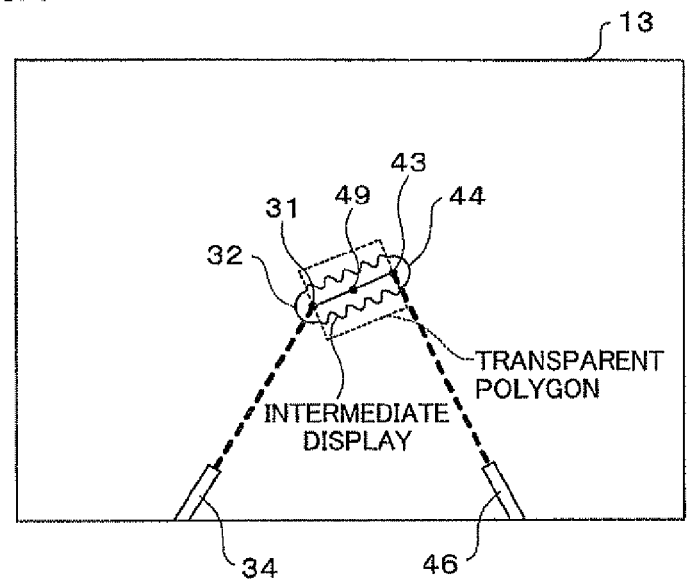
FIGS. 5A and 5B are views showing examples of an image displayed on the image control device according to the first embodiment of the invention.
Figure 5B:
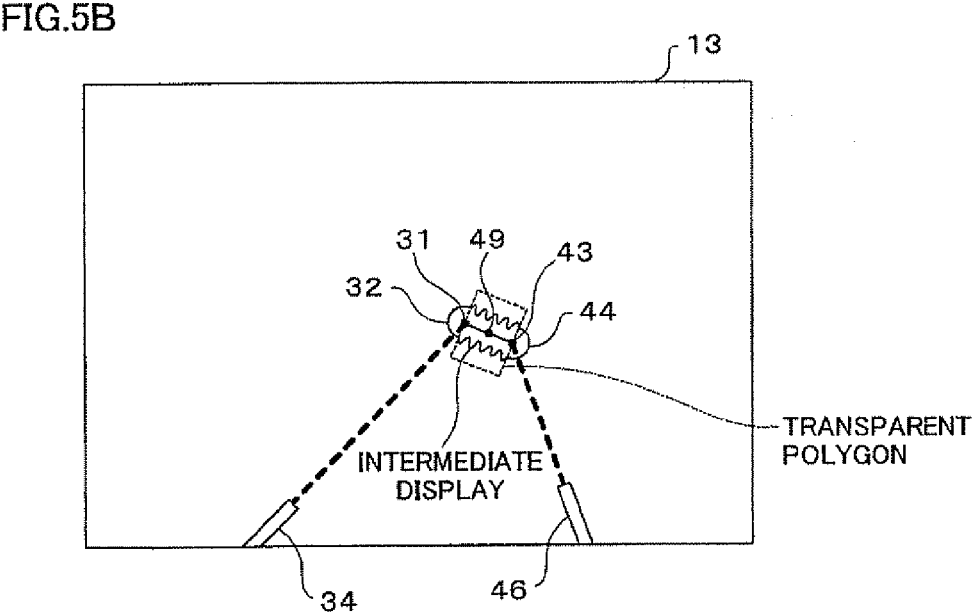

FIGS. 5A and 5B are views showing examples of an image displayed on the display screen 13 of the image control device 10 according to this embodiment. As shown in FIG. 5A, when the distance between the first indication position 31 and the second indication position 43 is longer than the second distance and is equal to or shorter than the first distance (i.e., within the first range and outside the second range) due to a further decrease in the distance between the first indication position 31 and the second indication position 43, an intermediate display is displayed to connect the first mark 32 that is displayed at a position corresponding to the first indication position 31 and the second mark 44 that is displayed at a position corresponding to the second indication position 43 (i.e., special display control process). The intermediate display is implemented by mapping an intermediate display texture having a color distribution that indicates the intermediate display onto a transparent polygon that is disposed in the virtual plane around the midpoint 49 between the first indication position 31 and the second indication position 43 in the same manner as the effect display.

The transparent polygon is fixed to a line segment that connects the first indication position 31 and the second indication position 43 in the same manner as the effect display. As shown in FIG. 5B, when the positional relationship between the first indication position 31 and the second indication position 43 has changed due to the movement of the first indication position 31 or the second indication position 43, the position and the direction of the transparent polygon change based on the change in the positional relationship between the first indication position 31 and the second indication position 43. When the intermediate display is displayed, the length of the sides of the transparent polygon that are parallel to the line segment that connects the first indication position 31 and the second indication position 43 changes when the length of the line segment that connects the first indication position 31 and the second indication position 43 has changed due to a change in the positional relationship between the first indication position 31 and the second indication position 43 (see FIG. 5B).

In this embodiment, a plurality of effect display textures are provided corresponding to the length of the side of the transparent polygon. The effect display textures differ in the shape of the intermediate display by degrees corresponding to the distance between the first indication position 31 and the second indication position 43. One of the intermediate display textures is mapped onto the transparent polygon corresponding to the distance between the first indication position 31 and the second indication position 43. Therefore, when the distance between the first indication position 31 and the second indication position 43 is longer than the second distance and is equal to or shorter than the first distance, the intermediate display that connects the first mark 32 and the second mark 44 is displayed even if the distance between the first indication position 31 and the second indication position 43 has changed.

In this embodiment, a plurality of intermediate display textures are provided respectively corresponding to a plurality of transparent polygons that differ in side length. The intermediate display textures differ in the shape of the intermediate display by degrees corresponding to the transparent polygons that differ in length. The intermediate display textures are successively mapped onto the transparent polygon with the lapse of time. An animation of the intermediate display is thus displayed even if the distance between the first indication position 31 and the second indication position 43 does not change.

Figure 6A:
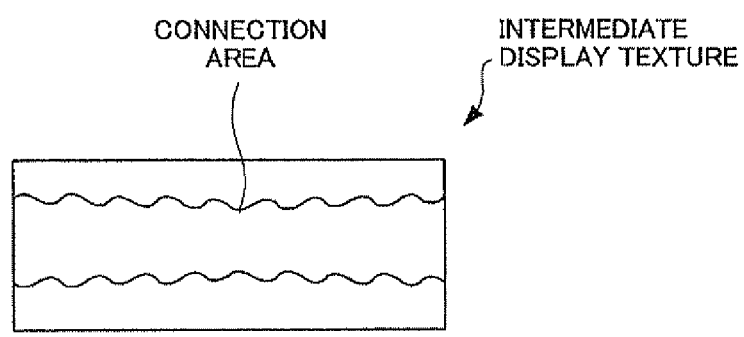
FIGS. 6A and 6B are views showing examples of a texture used in the image control device according to the first embodiment of the invention.
Figure 6B:
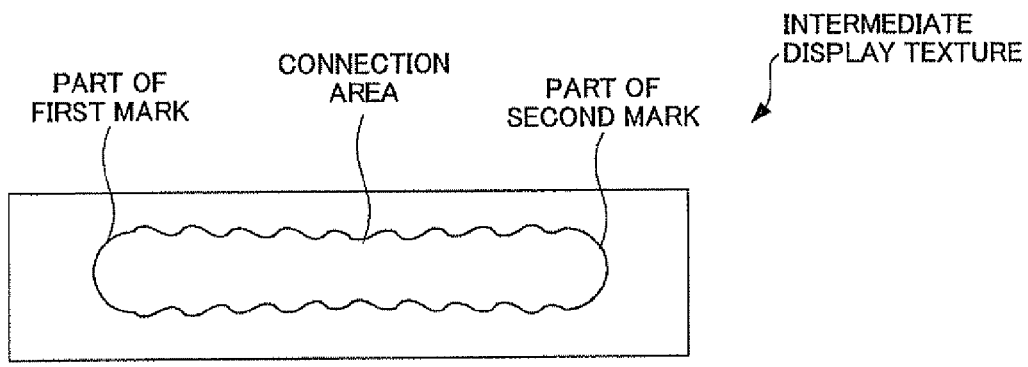

FIGS. 6A and 6B are views showing examples of the color distribution of the intermediate display texture used in this embodiment. As shown in FIG. 6A, the intermediate display texture may have a color distribution that indicates the connection area excluding the first mark 32 and the second mark 44. In this case, the first mark 32 is displayed using the transparent polygon for the first mark 32, and the second mark 44 is displayed using the transparent polygon for the second mark 44 (i.e., the normal display control process and the special display control process are performed at the same time) even when the intermediate display is displayed. However, the first mark 32 and the second mark 44 are not displayed in the connection area. An image shown in FIG. 5A or 5B is thus displayed. As shown in FIG. 6B, the intermediate display texture may have a color distribution that indicates part of the first mark 32, part of the second mark 44, and the connection area. In this case, the transparent polygon for the first mark 32 and the transparent polygon for the second mark 44 are not used (i.e., the normal display control process or the special display control process is selectively performed). An image shown in FIG. 5A or 58 is thus displayed.

3-2. Display of Special Mark

Figure 7A:
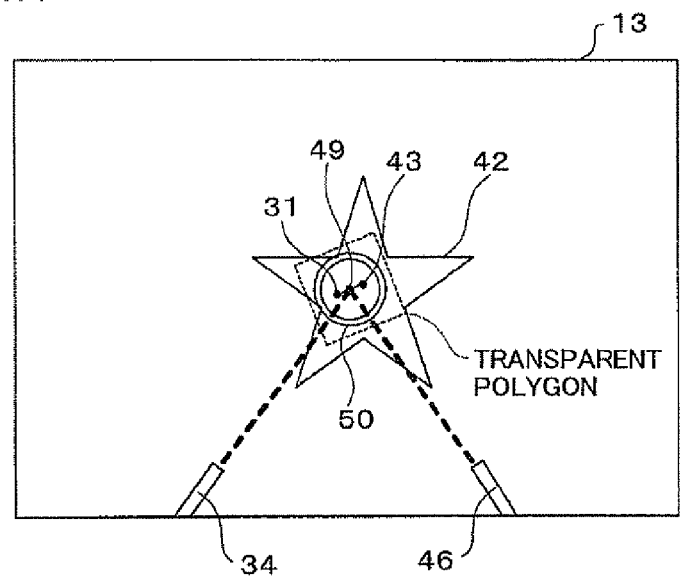
FIGS. 7A and 7B are views showing examples of an image displayed on the image control device according to the first embodiment of the invention.
Figure 7B:
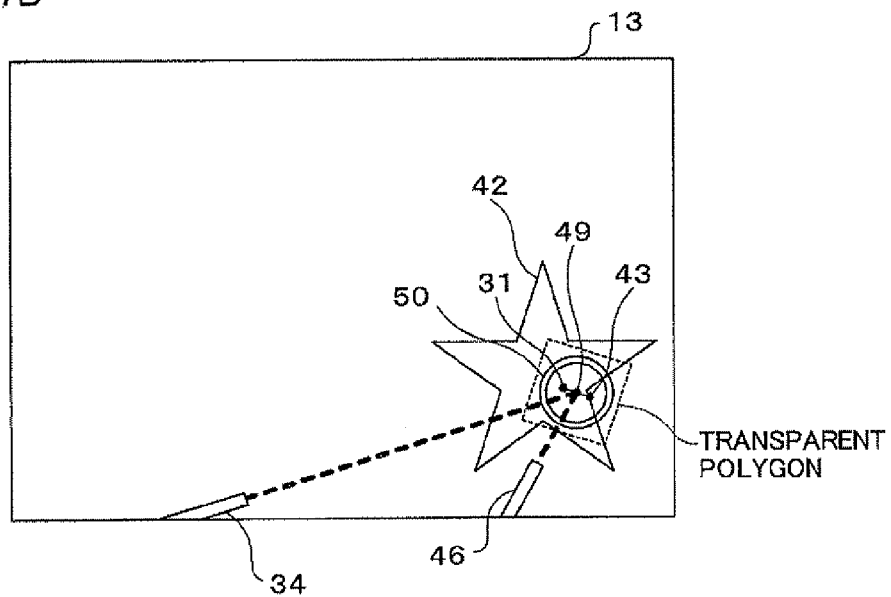

FIGS. 7A and 7B are views showing examples of an image displayed on the display screen 13 of the image control device 10 according to this embodiment. In this embodiment, when the left button 36 or the right button 38 of the first controller 16 and the left button 36 or the right button 38 of the second controller 18 have been continuously pressed for one second (i.e., when a given time has elapsed) in a state in which the distance between the first indication position 31 and the second indication position 43 is equal to or shorter than the second distance (i.e., within the second range) due to a further decrease in the distance between the first indication position 31 and the second indication position 43, one special mark 50 (i.e., special position display) is displayed around the midpoint 49 (i.e., special position) between the first indication position 31 and the second indication position 43 instead of the first mark 32 and the second mark 44 (see FIG. 7A) (i.e., special display control process) (i.e., the normal display control process or the special display control process is selectively performed). The second distance is a short distance that is included within the size (display range) of the target object 42. The special mark 50 has such a size (display range) that the special mark 50 can include the first indication position 31 and the second indication position 43 that are positioned within the second distance. The special mark 50 thus indicates the position indicated by the first controller 16 and the second controller 18. The special mark 50 is displayed by mapping a special mark texture having a color distribution that indicates the special mark 50 onto a transparent polygon that is disposed in the virtual plane around the midpoint 49 between the first indication position 31 and the second indication position 43 in the same manner as the effect display and the like.

When the first controller 16 and the second controller 18 have been operated so that the left button 36 or the right button 38 of the first controller 16 and the left button 36 or the right button 38 of the second controller 18 are continuously pressed in a state in which the distance between the first indication position 31 and the second indication position 43 is equal to or shorter than the second distance, the special mark 50 is continuously displayed. For example, when the left button 36 or the right button 38 of the first controller 16 and the left button 36 or the right button 38 of the second controller 18 have been continuously pressed while the direction of each of the first controller 16 and the second controller 18 is adjusted aimed at a specific area of the target object 42 along with the movement of the target object 42, the special mark 50 is continuously displayed (see FIG. 7B).

When the special mark 50 is displayed, the first bullet object 40 fired from the first gun object 34 moves toward the midpoint 49 instead of the first indication position 31 (i.e., special display control process), and the second bullet object 48 fired from the second gun object 46 moves toward the midpoint 49 instead of the second indication position 43 (i.e., special display control process). When the special mark 50 is displayed, the first gun object 34 and the second gun object 46 are controlled to aim at the midpoint 49 (i.e., special display control process).

In this embodiment, whether or not the target object 42 overlaps the special mark 50 on the display screen 13 is determined by determining the positional relationship between the target object 42 and the midpoint 49 when the special mark 50 is displayed (i.e., special display control process).

In this embodiment, the first bullet object 40 or the second bullet object 48 easily hits the target object 42 when the special mark 50 is displayed as compared with the case where the first mark 32 and the second mark 44 are displayed. In this embodiment, the hit determination volume is set to the target object 42 in order to determine whether or not the first bullet object 40 or the second bullet object 48 has hit the target object 42 so that a second hit determination volume (i.e., fourth range) that is used when the special mark 50 is displayed is larger than a first hit determination volume (i.e., third range) that is used when the special mark 50 is not displayed.

In this embodiment, when the special mark 50 is not displayed, the target object 42 is not destroyed unless the first bullet object 40 or the second bullet object 48 hits the target object 42 five times. On the other hand, when the special mark 50 is displayed, the target object 42 is destroyed when the first bullet object 40 or the second bullet object 48 has hit the target object 42 once. In this embodiment, the destruction parameter set to the target object 42 is updated each time the first bullet object 40 or the second bullet object 48 hits the target object 42, and the update amount (i.e., first update parameter) of the destruction parameter set to the target object 42 due to one hit when the special mark 50 is displayed is larger than the update amount (i.e., second update parameter) of the destruction parameter set to the target object 42 due to one hit when the special mark 50 is not displayed.

When the distance between the first indication position 31 and the second indication position 43 has exceeded the second distance, or when the left button 36 or the right button 38 of the first controller 16 and the left button 36 or the right button 38 of the second controller 18 have not been pressed for one second, the first mark 32 is displayed at a position corresponding to the first indication position 31, and the second mark 44 is displayed at a position corresponding to the second indication position 43, instead of the special mark 50. As a result, the display control process, the position determination process, the parameter update process, and the like are performed under conditions where the first mark 32 and the second mark 44 are displayed instead of the conditions where the special mark 50 is displayed.

The image control device 10 according to this embodiment thus allows two players to arbitrarily operate the first controller 16 and the second controller 18, or cooperate to operate the first controller 16 and the second controller 18, respectively.

Specifically, the image control device 10 according to this embodiment sets the first designation position based on the first information that changes based on the first operation that designates the position within an image, sets the second designation position based on the second information that changes based on the second operation that designates the position within the image, displays a first gun sight that indicates a first attack position based on the first designation position, displays a second gun sight that indicates a second attack position based on the second designation position, and performs the special display control process that displays an attack effect based on the positional relationship between the first designation position and the second designation position.

More specifically, the image control device 10 according to this embodiment utilizes the first mark 31 as the first gun sight, utilizes the second mark 43 as the second gun sight, and performs the special display control process that displays an attack effect based on the positional relationship between the first indication position (i.e., the position of the first gun sight) and the second indication position (i.e., the position of the second gun sight).

For example, the image control device 10 performs a process that displays a special gun sight (special mark 50) at the special position (e.g., midpoint 49), a process that displays an effect display that imitates lightning to connect the first gun sight and the second gun sight, and an intermediate display process that combines the first gun sight and the second gun sight as a special display control process that implements an attack effect. The image control device 10 also performs a display process that moves the first bullet object 40 toward the special position when the special gun sight is displayed, a display process that moves the second bullet object 48 toward the special position, and a process that causes the first gun object 34 and the second gun object 46 to be aimed at the special position as a special display control process that implements an attack effect.

4. Process According to this Embodiment

Figure 8:
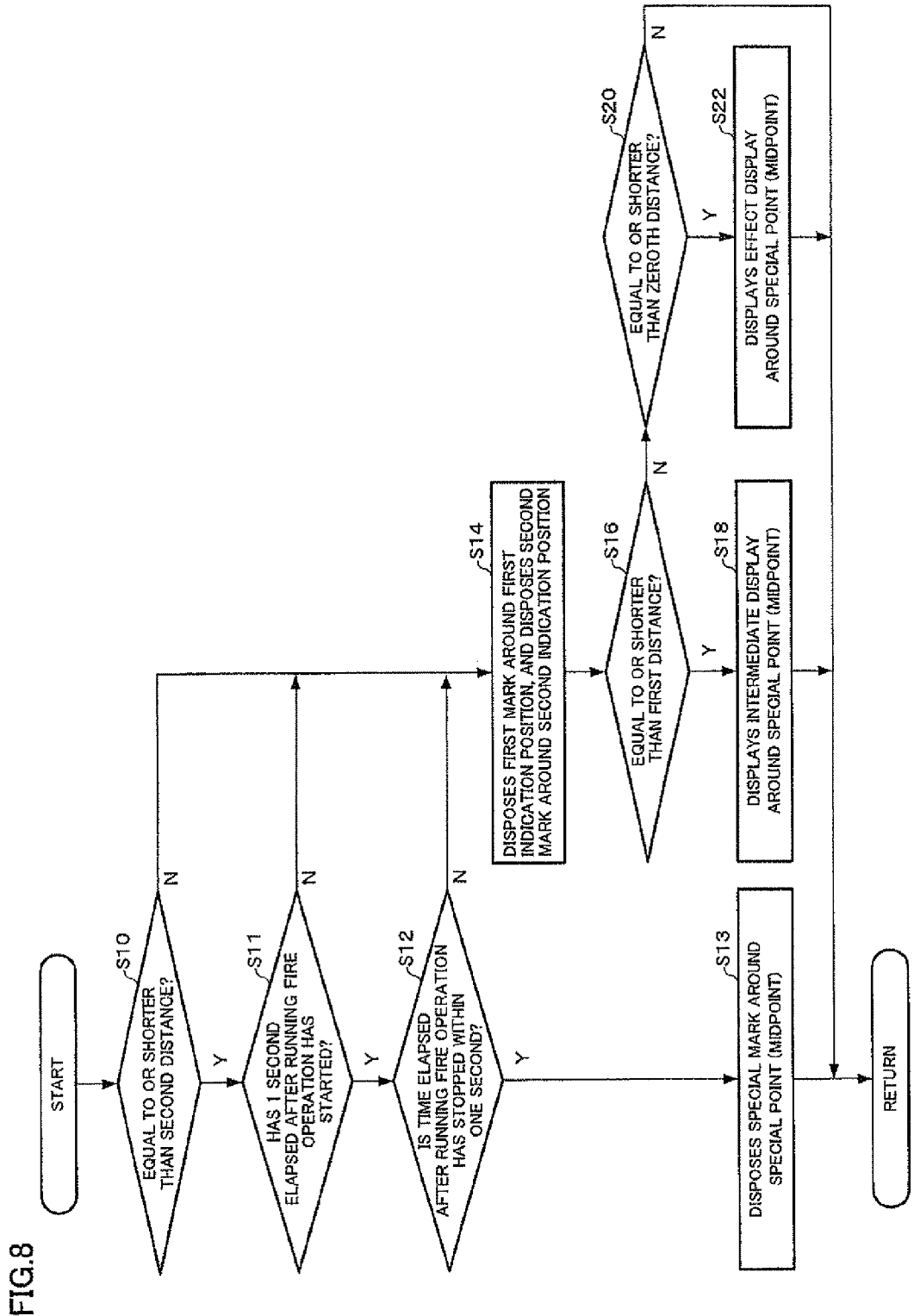
FIG. 8 is a flowchart showing an example of a process performed by the image control device according to the first embodiment of the invention.

An example of the process according to this embodiment is described below using a flowchart shown in FIG. 8. The process shown in FIG. 8 is performed each time the frame is updated. As shown in FIG. 8, the image control device 10 determines whether or not the distance between the first indication position 31 and the second indication position 43 is equal to or shorter than the second distance (step S10). When the distance between the first indication position 31 and the second indication position 43 is equal to or shorter than the second distance (Y in step S10), the image control device 10 determines whether or not one second has elapsed after the left button 36 or the right button 38 of the first controller 16 and the left button 36 or the right button 38 of the second controller 18 have been pressed for one second (i.e., a running fire operation has started) based on the first count value (step S11). When one second has elapsed after the running fire operation has started (Y in step S11), the image control device 10 determines whether or not the time elapsed after the running fire operation has stopped is within one second based on the second count value (step S12). When the time elapsed after the running fire operation has stopped is within one second (Y in step S12), the image control device 10 disposes the special mark 50 around the special point (the midpoint 49) between the first indication position 31 and the second indication position 43 (step S13), and returns to the step S10.

Even if the distance between the first indication position 31 and the second indication position 43 is not equal to or shorter than the second distance (N in step S10), or the distance between the first indication position 31 and the second indication position 43 is equal to or shorter than the second distance (Y in step S10), the image control device 10 disposes the first mark 32 around the first indication position 31, and disposes the second mark 44 around the second indication position 43 when one second has not elapsed after the running fire operation has started (N in step S11), and the time elapsed after the running fire operation has stopped is not within one second (N in step S12) (step S14). The image control device 10 then determines whether or not the distance between the first indication position 31 and the second indication position 43 is shorter than the first distance (step S16). When the distance between the first indication position 31 and the second indication position 43 is equal to or shorter than the first distance (Y in step S16), the image control device 10 displays the intermediate display around the special point (the midpoint 49) between the first indication position 31 and the second indication position 43 (see FIGS. 5A and 5B) (step S18), and returns to the step S10.

When the distance between the first indication position 31 and the second indication position 43 is not equal to or shorter than the first distance (N in step S16), the image control device 10 determines whether or not the distance between the first indication position 31 and the second indication position 43 is shorter than the zeroth distance (step S20). When the distance between the first indication position 31 and the second indication position 43 is equal to or shorter than the zeroth distance (Y in step S20), the image control device 10 displays the effect display around the special point (the midpoint 49) between the first indication position 31 and the second indication position 43 (see FIGS. 6A and 6B) (step S22), and returns to the step S10.

When the distance between the first indication position 31 and the second indication position 43 is not equal to or shorter than the zeroth distance (N in step S20), the image control device 10 returns to the step S10.

5. Modification

The method described above in connection with the above embodiment is only an example. The scope of the invention also includes a case of employing a method that achieves effects similar to those of the method described above in connection with the above embodiment. The invention is not limited to the above embodiment. Various modifications and variations may be made. Various methods described above in connection with the above embodiment and various methods described below as modifications may be appropriately used in combination as a method that implements the invention.

5-1. First Modification

The above embodiment has been described taking an example that utilizes the first controller 16 and the second controller 18 shown in FIG. 1A that imitate the shape of a machine gun as the first operation section 62 and the second operation section 68. Note that an analog stick, an arrow key, a button, a mouse, a trackball, a touch panel display, a housing (operation body or indicator), or a combination thereof may be used as the first operation section 62 and the second operation section 68. The positions of the first operation section 62 and the second operation section 68 with respect to the display section 60 need not necessarily be fixed. The image control device 10 may be configured so that the positions of the first operation section 62 and the second operation section 68 with respect to the display section 60 can be arbitrarily changed by the operator.

FIG. 9 is a view showing an example in which a first controller 200 and a second controller 202 that include a plurality of operating sections are used as the first operation section 62 and the second operation section 68. In the example shown in FIG. 9, an operation that designates a position within the image is performed by operating the operating sections (e.g., analog stick 204 and arrow key 206) that are included in each of the first controller 200 and the second controller 202 and allow the operator to arbitrarily designate one of a plurality of directions. In this case, the first designation operation detection section 64 and the second designation operation detection section 70 may be implemented by a pressure sensor that detects an operation signal of the analog stick 204 or the arrow key 206, a plurality of switches, or the like. The first designation operation detection section 64 outputs first operation information (i.e., first information) based on the operation performed using the analog stick 204 or the arrow key 206 included in the first controller 200, and the second designation operation detection section 70 outputs second operation information (i.e., second information) based on an operation performed using the analog stick 204 or the arrow key 206 included in the second controller 202.

Each of the first controller 200 and the second controller 202 also includes a button 208 (i.e., first operating section or second operating section) that detects the presence or absence of an operation. The operation information based on an operation performed using the analog stick 204, the arrow key 206, or the button 208 is output to the processing section 100 via wireless or cable communication.

Figure 10:
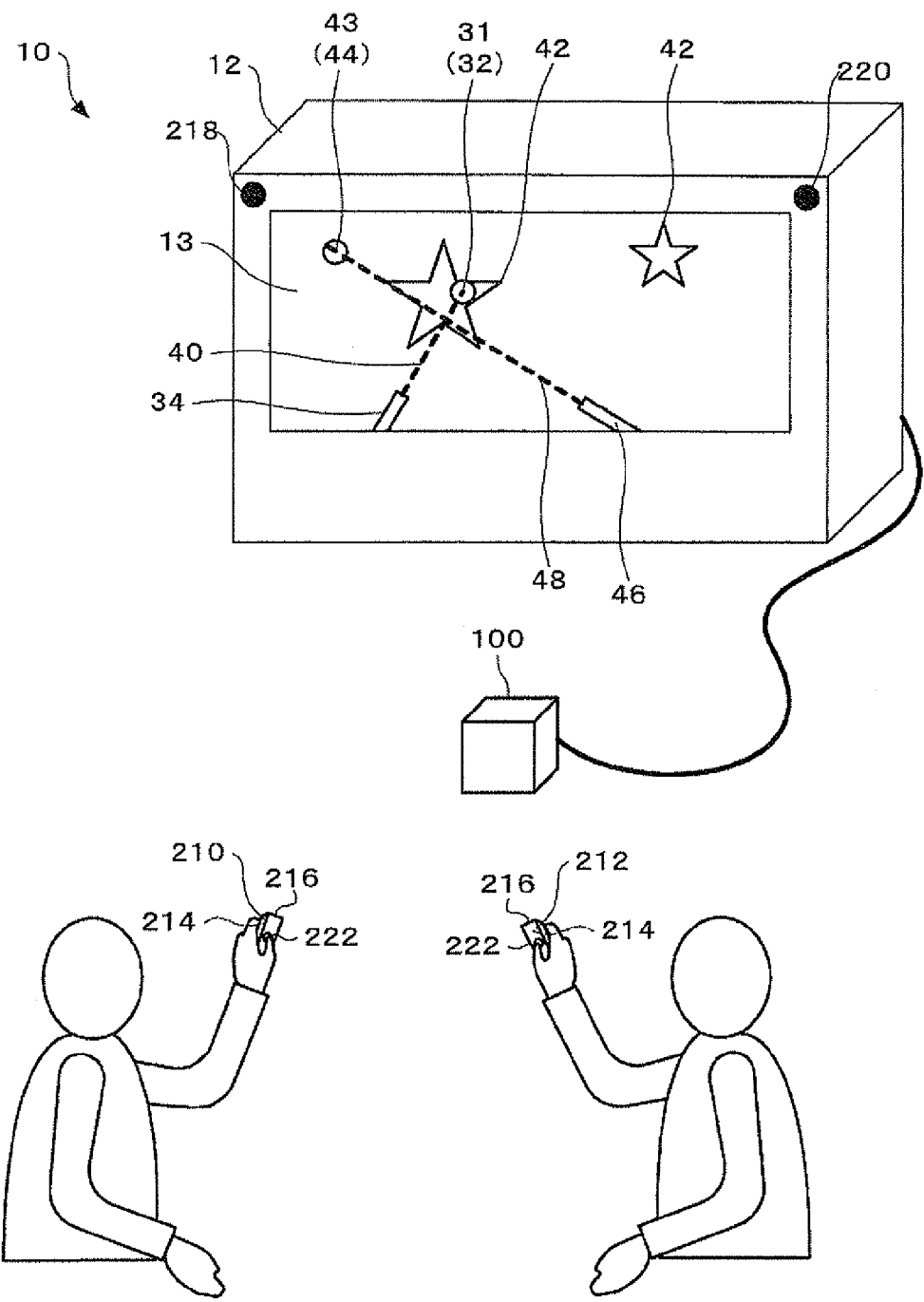
FIG. 10 is a perspective view showing an image control device according to a modification of the first embodiment of the invention.

FIG. 10 is a view showing an example in which a first controller 210 (i.e., first indicator) and second controller 212 (i.e., second indicator) that are held or worn by the player and can be arbitrarily changed in position and direction are used as the first operation section 62 and the second operation section 68. In the example shown in FIG. 10, an operation that designates a position within the image is performed by changing the direction of the end of the first controller 210 or the direction of the end of the second controller 212 by moving the first controller 210 or the second controller 212. In this case, the first designation operation detection section 64 and the second designation operation detection section 70 may be implemented by an acceleration sensor 214, a camera 216, or the like included in each of the first controller 210 and the second controller 212.

When using the acceleration sensor 214, the first designation operation detection section 64 detects the accelerations of the first controller 210 in three orthogonal axial directions, and outputs accelerations (i.e., first information) corresponding to the moving direction, the moving amount, the rotation (tilt) direction, and the rotation amount of the first controller 210. When using the camera 216, the first designation operation detection section 64 receives infrared light emitted from an infrared LED 218 and an infrared LED 220 provided to have a given positional relationship with the display 12, analyzes the relative positional relationship between the display 12 and the first controller 210, and outputs first coordinate values (i.e., first information) of the indication position of the first controller 210 on the display screen 13 of the display 12.

The second designation operation detection section 70 included in the second controller 212 may be configured in the same manner as the first designation operation detection section 64. For example, when using the acceleration sensor 214, the second designation operation detection section 70 outputs accelerations (i.e., second information) corresponding to the moving direction, the moving amount, the rotation (tilt) direction, and the rotation amount of the second controller 212. When using the camera 216, the second designation operation detection section 70 outputs second coordinate values (i.e., second information) of the indication position of the second controller 212 on the display screen 13 of the display 12.

Each of the first controller 210 and the second controller 212 also includes a button 222 (i.e., first operating section or second operating section) that detects the presence or absence of an operation. The operation information based on an operation performed using the first controller 210, the second controller 212, or the button 222 is output to the processing section 100 via wireless or cable communication.

The above embodiment has been described taking an example that utilizes two operation sections (i.e., first operation section 62 and second operation section 68). Note that the number of operation sections is not limited insofar as the first designation position is set based on the first information that changes based on the first operation, and the second designation position is set based on the second information that changes based on the second operation. For example, a single touch panel display may be provided as the operation section. The first designation position may be set based on the first operation performed using the touch panel display, and the second designation position may be set based on the second operation performed using the touch panel display.

Figure 11:
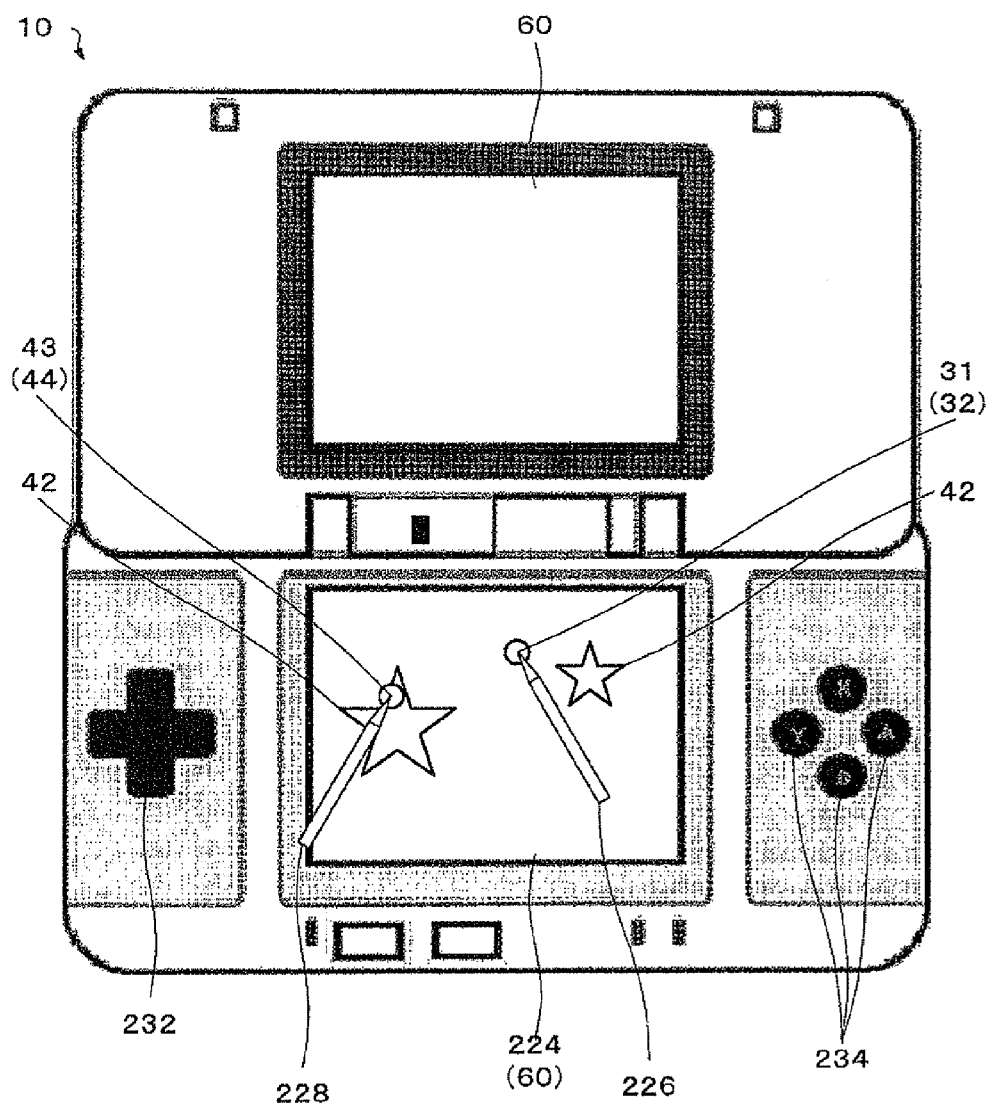
FIG. 11 is a plan view showing an image control device according to a modification of the first embodiment of the invention.

FIG. 11 is a view showing an image control device 225 that utilizes a touch panel display 224 that has a structure in which a liquid crystal display (display section 60) and a touch panel (designation operation detection section) are stacked, and detects the position of a touch operation performed by the player on the display area of the liquid crystal display. The image control device 225 has the same functions as those of the image control device 10. When using the image control device 225, a first operation that designates a position within the image and a second operation that designates a position within the image may be performed by touching the touch panel display 224 using a first touch pen 226 and a second touch pen 228. In this case, the designation operation detection section may be implemented by a touch panel. The touch panel is formed using a material having a high light transmittance so that the visibility of an image is maintained even when the touch panel is stacked on the liquid crystal display. The touch panel electrically detects a contact position using a resistive method (e.g., four-wire resistive method or five-wire resistive method), a capacitance method, or the like. The touch panel detects a contact operation using an input instrument (e.g., first touch pen 226 or second touch pen 228) and a contact operation with the fingertip of the player.

The image control device 225 also includes an arrow key 232 that allows the player to arbitrarily designate one of a plurality of directions, and a button 234 (i.e., first operating section or second operating section) that detects the presence or absence of an operation. When using the image control device 230, a first operation that designates a position within the image may be performed by operating an operating section (e.g., arrow key 206) that allows the player to designate a direction, and a second operation that designates a position within the image may be performed by touching the touch panel display 224 using the first touch pen 226.

5-2. Second Modification

The above embodiment has been described taking an example in which the designation position setting section 108 sets the first designation position or the second designation position. Note that the designation position setting section 108 may set three or more designation positions based on three or more pieces of information that respectively change based on three or more operations that designates a position within the image. The display control section 102 may perform the normal display control process that controls the image based on each of the three or more designation positions, and may perform the special display control process that controls the image based on each of the three or more designation positions.

For example, the designation position setting section 108 sets a first designation position based on first information that changes based on a first operation performed using a first operation section, sets a second designation position based on second information that changes based on a second operation performed using a second operation section, and sets an Nth designation position based on Nth information that changes based on an Nth operation performed using an Nth operation section. The display control section 102 may perform the normal display control process that displays a first display based on the first designation position, displays a second display based on the second designation position, and displays an Nth display based on the Nth designation position, and may perform the special display control process that displays the special display based on the first designation position, the second designation position, . . . , and the Nth designation position. In this case, the special position calculation section 115 may calculate the center-of-gravity coordinates of three or more designation positions as the special position.

In this case, the image control device may further include a condition determination section that determines whether or not each of the designation positions satisfies a fourth condition, and a counter section that counts the number of designation positions that satisfy the fourth condition. The display control section 102 may control at least one of start and finish of the special display control process and start and finish of the normal display control process based on the number of designation positions that satisfy the fourth condition.

For example, the condition determination section may determine whether or not each of the designation positions has been set, and the counter section may count the number of designation positions that have been set. The display control section 102 may not perform the special display control process even if the positional relationship between two indication positions satisfies a given condition when two designation positions have been set, and may perform the special display control process when the positional relationship between two indication positions satisfies a given condition when three designation positions have been set.

The condition determination section may determine whether or not the positional relationship of each of a plurality of designation positions satisfies the fourth condition, and the counter section may count the number of designation positions for which the positional relationship satisfies the fourth condition. The display control section 102 may not perform the special display control process even if the positional relationship of two indication positions satisfies the fourth condition, and may perform the special display control process when the positional relationship of three designation positions satisfies the fourth condition.

The above embodiment has been described taking an example in which the special position calculation section 115 calculates the coordinates of the midpoint between the first designation position and the second designation position as the special position. Note that the special position is not limited to the coordinates of the midpoint or the center of gravity. A different weighting may set to each of a plurality of designation positions, and the special position may be calculated based on each weighting. For example, a weighting may be set to each designation position based on an attribute or a parameter linked and set to each designation position. The attribute may determine the property or the ability of the player (character). Specifically, when an attribute fire is set to the first gun object 34, and an attribute water is set to the second gun object 46, the special position calculation section 115 may calculate a position that is closer to the second indication position 43 than the first indication position 31 as the special position from the coordinates of the line segment that connects the first indication position 31 and the second indication position 43.

5-3. Third Modification

The above embodiment has been described taking an example in which the first operation and the second operation are performed on the image displayed on one display section 60. Note that a plurality of image control devices 10 may communicate, and display a common (almost common) image on the display section. One or more operations that designate a position within the image may be performed on the image displayed on the display section of each image control device 10.

In this case, the designation position setting section 108 sets the first designation position based on the first information that changes based on the first operation that is performed using the first operation section 62 of the image control device 10 and designates a position within the image. The communication control section causes the communication section 86 to transmit the first information, and causes the communication section 86 to receive the second information that changes based on the second operation that is performed using the second operation section 68 of another image control device 10 and designates a position within the image. The designation position setting section 108 then sets the second designation position based on the second information. The first information and the second information may be the operation information output from the first designation operation detection section 64 or the second designation operation detection section 70, or may be virtual plane position information calculated based on the operation information.

The communication control section also causes the communication section 86 to transmit and receive destination information that indicates the destination of the information, sender information that indicates the sender of the information, identification information that identifies the image control device 10 that has generated the information, start information, progress information, or end information used to synchronize the progress of a program (progress of the game) or image display, and the like between the image control devices 10.

In this case, the image control devices 10 may communicate via a server device (e.g., client-server system), or may directly communicate (e.g., peer-to-peer system).

The image control device according to the above embodiment may be applied to a client-server communication device that includes a server device and a plurality of terminals that communicate with the server device and include an operation section and a display section. In this case, all or some of the functions of the processing section 100 may be implemented by the computer of the server device or the computer of the terminal.

For example, the communication control section of the server device may cause the communication section of the server device to receive the first information that changes based on the first operation that is performed using the first operation section of the first terminal and designates a position within the image, and the second information that changes based on the second operation that is performed using the second operation section of the second terminal and designates a position within the image, and the designation position setting section 108 of the server device may set the first designation position based on the first information, and set the second designation position based on the second information. The functions of the first position determination section 112, the counter section 114, the special position calculation section 115, the second position determination section 116, and the update section 118 may be implemented by the computer of the server device. In this case, the communication control section of the server device performs a process that transmits the processing results (or a command based on the processing results) of the first position determination section 112, the counter section 114, the special position calculation section 115, the second position determination section 116, and the update section 118 to each terminal. The functions of the display control section 102, the drawing section 104, and the sound generation section 106 may be implemented by the computer of each terminal.

For example, the normal display control process and the special display control process of the display control section 102 may be implemented by the computer of the server device, and the functions of the object space setting section 120, the movement/motion processing section 122, and the virtual camera control section 124 may be implemented by the computer of each terminal.

This makes it possible to implement the special display control process based on an operation of a remote operator. The special display control process based on operations of a number of remote operators can be performed by applying this configuration in combination with the second modification.

5-4. Fourth Modification

Various conditions may be set as the start condition or the finish condition of the special display control process, or the start condition or the finish condition of the normal display control process.

For example, when the distance between the first mark 32 and the second mark 44 is equal to or shorter than the second distance, one special mark 50 may be continuously displayed irrespective of whether or not the left button 36 or the right button 38 of the first controller 16 and the left button 36 or the right button 38 of the second controller 18 have been pressed.

The above embodiment has been described taking an example in which the first mark 32 and the second mark 44 are displayed instead of the special mark 50 when the distance between the first indication position 31 and the second indication position 43 has become longer than the second distance. Note that the special mark 50 may be continuously displayed until a given period (e.g., 2 sec) has elapsed after the distance between the first indication position 31 and the second indication position 43 has become longer than the second distance. In this case, the counter section 114 starts to count the third count value on condition that a transition has occurred from a state in which the distance between the first indication position 31 and the second indication position 43 is equal to or shorter than the second distance to a state in which the distance between the first indication position 31 and the second indication position 43 is longer than the second distance. The counter section 114 resets the third count value when the distance between the first indication position 31 and the second indication position 43 has become equal to or shorter than the second distance before the third count value reaches a given value (e.g., a count value corresponding to 2 sec). When the third count value has reached a given value in a state in which the distance between the first indication position 31 and the second indication position 43 has become equal to or shorter than the second distance, the display control section 102 displays the first mark 32 and the second mark 44 instead of the special mark 50 (i.e., special display control process).

The display control section 102 controls at least one of start and finish of the special display control process and start and finish of the normal display control process based on the positional relationship between the first designation position and the second designation position. The display control section 102 may control at least one of start and finish of the special display control process and start and finish of the normal display control process based on whether or not a given time has elapsed.

The image control device may further include an event determination section that determines whether or not a given event has occurred, and the display control section 102 may control at least one of start and finish of the special display control process and start and finish of the normal display control process based on occurrence of a given event. For example, the display control section 102 may perform the special display control process when a given item has been acquired, or a given character has appeared.

The image control device may further include an attribute setting section that links one of a plurality of attributes to each of the first designation position and the second designation position. The display control section 102 may control at least one of start and finish of the special display control process and start and finish of the normal display control process based on the combination of the attributes linked to the first designation position and the second designation position.

For example, when an attribute fire is set to the first gun object 34, and an attribute water is set to the second gun object 46, the display control section 102 may not perform the special display control process, or may terminate the special display control process and perform the normal display control process even if the positional relationship between the first designation position and the second designation position satisfies a given condition. When an attribute fire is set to the first gun object 34, and an attribute fire is also set to the second gun object 46, the display control section 102 may terminate the special display control process and perform the normal display control process even if the positional relationship between the first designation position and the second designation position does not satisfy a given condition.

The display control section 102 may perform the special display control process when the first condition is satisfied, and may perform the normal display control process when the second condition is satisfied. If the second condition is set to be easily satisfied as compared with the first condition, the special display control process does not easily continue. If the first condition is set to be easily satisfied as compared with the second condition, the special display control process easily starts. Whether or not the condition is easily satisfied may be adjusted by changing the range within which the positional relationship satisfies the condition, the time required to satisfy the condition, the event occurrence frequency, the number of designation positions that should satisfy the fourth condition, or the number or combination of the conditions.

5-5. Fifth Modification

The above embodiment has been described taking an example in which the second position determination section 116 determines the positional relationship between the target object 42 and the first designation position based on the fourth range, and determines the positional relationship between the target object 42 and the second designation position based on the fourth range. Note that the image control device may further include an attribute setting section that links one of a plurality of attributes to each of the first designation position and the second designation position, and a range change section that changes the fourth range based on the combination of the attributes linked to the first designation position and the second designation position.

For example, the range change section may change the fourth range so that the fourth range increases when an attribute fire is set to the first gun object 34 and an attribute fire is also set to the second gun object 46 as compared with the case where an attribute fire is set to the first gun object 34 and an attribute water is set to the second gun object 46.

When an attribute fire is set to the first gun object 34, and an attribute water is set to the second gun object 46, the range change section may change the fourth range so that the fourth range is smaller than the third range used when the normal display control process is performed. When an attribute fire is set to the first gun object 34, and an attribute fire is also set to the second gun object 46, the range change section may change the fourth range so that the fourth range is larger than the third range used when the normal display control process is performed.

According to this configuration, the degree to which the first bullet object 40 or the second bullet object 48 hits the target object 42 can be changed depending on the combination of the attributes, for example.

Note that the range change section may change the fourth range without changing the third range, or may change the third range and the fourth range based on the combination of the attributes linked to the first designation position and the second designation position.

5-6. Sixth Modification

The above embodiment has been described taking an example in which the update section 118 updates a given parameter with the first update parameter when the normal display control process is performed, and updates a given parameter with the second update parameter when the special display control process is performed. Note that the image control device may further include an attribute setting section that links one of a plurality of attributes to each of the first designation position and the second designation position, and an update parameter change section that changes at least one of the first update parameter and the second update parameter based on the combination of the attributes linked to the first designation position and the second designation position.

For example, the update parameter change section may change the first update parameter or the second update parameter so that the update amount or the update rate of the first update parameter or the second update parameter increases when an attribute fire is set to the first gun object 34 and an attribute fire is set to the second gun object 46 as compared with the case where an attribute fire is set to the first gun object 34 and an attribute water is set to the second gun object 46.

When an attribute fire is set to the first gun object 34, and an attribute water is set to the second gun object 46, the update parameter change section may change the second update parameter so that the update amount or the update rate of the second update parameter is smaller than that of the first update parameter. When an attribute fire is set to the first gun object 34, and an attribute fire is also set to the second gun object 46, the update parameter change section may change the second update parameter so that the update amount or the update rate of the second update parameter is larger than that of the first update parameter. According to this configuration, the degree to which the target object 42 is destroyed when the special display control process is performed can be changed depending on the combination of the attributes, for example.

Note that the update parameter change section may change the second update parameter without changing the first update parameter based on the combination of the attributes linked to the first designation position and the second designation position.

The above embodiment has been described taking an example in which the destruction parameter of the target object 42 is updated as the given parameter. Note that the update section 118 may update a remaining bullet parameter (the first gun object 34 or the second gun object 46 cannot fire a bullet when the remaining bullet parameter has reached a given value), or may update a destruction parameter (the first gun object 34 or the second gun object 46 is destroyed when the destruction parameter has reached a given value), for example.

5-7. Seventh Modification

The image control device may further include an attribute setting section that links one of a plurality of attributes to each of the first designation position and the second designation position, and the display control section 102 may control the image based on the combination of the attributes linked to the first designation position and the second designation position.

For example, the display control section 102 may increase the size of the bullet mark display 126 or the destruction display when an attribute fire is set to the first gun object 34 and an attribute fire is also set to the second gun object 46 as compared with the case where an attribute fire is set to the first gun object 34 and an attribute water is set to the second gun object 46.

The display control section 102 may control the image irrespective of the combination of the attributes linked to the first designation position and the second designation position when the normal display control process is performed, and may control the image based on the combination of the attributes linked to the first designation position and the second designation position when the special display control process is performed.

5-8. Eighth Modification

The above embodiment has been described taking an example in which the display control section 102 displays the first mark 32, the first gun object 34, the first bullet object 40, the bullet mark display 126, and the like based on the first designation position, and displays the second mark 44, the second gun object 46, the second bullet object 48, the bullet mark display 126, and the like based on the second designation position as the normal display control process. Note that the display control section 102 may display at least one of these displays based on the first designation position and the second designation position. Specifically, the display control section 102 may perform at least one of a process that displays a first designation position display that indicates the position designated by the first operation based on the first designation position, and displays a second designation position display that indicates the position designated by the second operation based on the second designation position, a process that displays a first moving path display that indicates the moving path of the first moving object based on the first designation position, and displays a second moving path display that indicates the moving path of the second moving object based on the second designation position, and a process that displays a first movement result display that indicates the movement result of the first moving object based on the first designation position, and displays a second movement result display that indicates the movement result of the second moving object based on the second designation position, as the normal display control process.

The first moving path display may be displayed from the muzzle of the first gun object 34 to the first designation position, and the second moving path display may be displayed from the muzzle of the second gun object 46 to the second designation position. The first moving path display may be displayed from the muzzle of the first gun object 34 to the intersection point of the object, and the second moving path display may be displayed from the muzzle of the second gun object 46 to the intersection point of the object.

5-9. Ninth Modification

The above embodiment has been described taking an example in which the display control section 102 displays the special mark 50, the first gun object 34, the second gun object 46, the first bullet object 40, the second bullet object 48, and the bullet mark display 126 based on the midpoint 49 as the special display control process. Note that the display control section 102 may display at least one of these displays based on the special position. Specifically, the display control section 102 may perform at least one of a process that displays a special position display that indicates the positions designated by the first operation and the second operation based on the special position, a process that displays a first moving path display that indicates the moving path of the first moving object and a second moving path display that indicates the moving path of the second moving object based on the special position, and a process that displays a special movement result display that indicates the movement result of the first moving object and the movement result of the second moving object based on the special position, as the special display control process.

For example, the display control section 102 may display the first gun object 34, the first bullet object 40, and the bullet mark display 126 based on the first indication position 31, and may display the second gun object 46, the second bullet object 48, and the bullet mark display 126 based on the second indication position 43 even if the special mark 50 is displayed based on the midpoint 49.

5-10. Tenth Modification

The above embodiment has been described taking an example in which the second position determination section 116 performs the normal position determination process that determines the positional relationship between the target object 42 and the first designation position, and determines the positional relationship between the target object 42 and the second designation position when the first mark 32 and the second mark 44 are displayed, and performs the special position determination process that determines the positional relationship between the target object 42 and the special position when the special mark 50 is displayed. Note that the second position determination section 116 may determine the positional relationship between the target object 42 and the first designation position, and determine the positional relationship between the target object 42 and the second designation position even when the special mark 50 is displayed.

5-11. Eleventh Modification

The virtual camera control section 124 may control at least one of the position, the direction, and the angle of view of the virtual camera when a transition has occurred between the normal display control process and the special display control process. For example, the virtual camera control section 124 may move the position or the direction of the virtual camera when the special display control process starts or ends, or the normal display control process starts or ends. The virtual camera control section 124 may move the virtual camera closer to the display object that overlaps the special position, or zoom the virtual camera when the special display control process starts, and may return the virtual camera to a reference position or return the angle of view of the virtual camera to a reference value when the normal display control process starts.

5-12. Twelfth Modification

The above embodiment has been described taking an example in which the special position calculation section 115 calculates the special position based on the first designation position and the second designation position, and the display control section 102 controls the image based on the special position when performing the special display control process. Note that the display control section 102 may perform the normal display control process that controls the image based on the first designation position independently of the second designation position, and controls the image based on the second designation position independently of the first designation position when the positional relationship between the first designation position and the second designation position is outside a given range, and may perform the special display control process that controls the image based on at least one of the first designation position and the second designation position when the positional relationship between the first designation position and the second designation position is within a given range.

For example, the display control section 102 may perform the special display control process that displays the special mark 50 around a position corresponding to the first designation position or the second designation position instead of displaying the special mark 50 around a position corresponding to the midpoint between the first designation position and the second designation position.

5-13. Thirteenth Modification

Figure 12A:
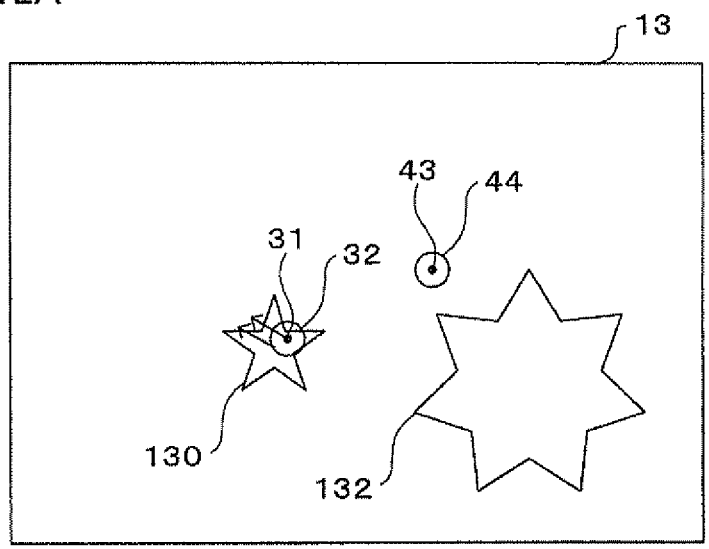
FIGS. 12A and 12B are views showing examples of an image displayed on an image control device according to a modification of the first embodiment of the invention.

The above embodiment has been described taking an example of executing a game in which the target object 42 can be destroyed when the first operating section provided in the first operation section 62 has been operated in a state in which the target object 42 overlaps the first mark 32 (i.e., the positional relationship between the display object and the first designation position satisfies the third condition), or when the second operating section provided in the second operation section 68 has been operated in a state in which the target object 42 overlaps the second mark 44 (i.e., the positional relationship between the display object and the second designation position satisfies the third condition). As shown in FIG. 12A, a first object 130 may be moved to follow the movement of the first mark 32 or the second mark 44, or the moving target object 42 may be stopped when the first operating section provided in the first operation section 62 is continuously operated in a state in which the first object 130 (i.e., first display object) overlaps the first mark 32 (i.e., the positional relationship between the display object and the first designation position satisfies the third condition), or when the second operating section provided in the second operation section 68 is continuously operated in a state in which the first object 130 overlaps the second mark 44 (i.e., the positional relationship between the display object and the second designation position satisfies the third condition).

In this example, the display control section 102 performs a normal movement control process (i.e., normal display control process) that controls the movement of the first object 130 (i.e., first display object) (i.e., controls the image) based on the first designation position independently of the second designation position, and controls the movement of the first object 130 (i.e., controls the image) based on the second designation position independently of the first designation position. The display control section 102 performs a special movement control process (i.e., special display control process) that controls the movement of the first object 130 (i.e., controls the image) based on the positional relationship between the first object 130 and the first designation position and the positional relationship between the first object 130 and the second designation position based on a given condition.

In this example, a relatively small first object 130 and a relatively large second object 132 (i.e., second display object) are displayed, as shown in FIG. 12A. A relatively small weight parameter is set to the first object 130, and a relatively large weight parameter is set to the second object 132. The display control section 102 moves the first object 130 to follow the movement of the first mark 32 when the first operating section provided in the first operation section 62 is continuously operated in a state in which the first object 130 overlaps the first mark 32. Alternatively, the display control section 102 moves the second object 132 to follow the movement of the second mark 44 (i.e., performs the normal display control process) when the second operating section provided in the second operation section 68 is continuously operated in a state in which the first object 130 overlaps the second mark 44.

However, the display control section 102 does not move the second object 132 to follow the movement of the first mark 32 even when the first operating section provided in the first operation section 62 is continuously operated in a state in which the second object 132 overlaps the first mark 32. The display control section 102 does not move the second object 132 to follow the movement of the second mark 44 (i.e., does not perform the normal display control process) even when the second operating section provided in the second operation section 68 is continuously operated in a state in which the second object 132 overlaps the second mark 44.

Figure 12B:
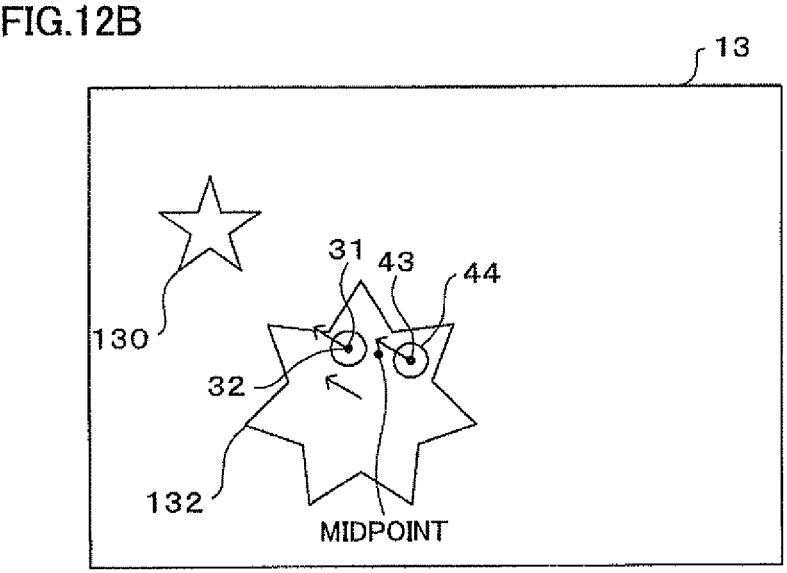

As shown in FIG. 12B, the display control section 102 moves the second object 132 to follow the movement of at least one of the first mark 32 and the second mark 44 (i.e., performs the special display control process) when the first operating section provided in the first operation section 62 is continuously operated in a state in which the second object 132 overlaps the first mark 32, and the second operating section provided in the second operation section 68 is continuously operated in a state in which the second object 132 overlaps the second mark 44.

In this case, the second position determination section 116 determines whether or not the positional relationship between the first object 130 and the first designation position satisfies the third condition, determines whether or not the positional relationship between the second object 132 and the first designation position satisfies the third condition, determines whether or not the positional relationship between the first object 130 and the second designation position satisfies the third condition, and determines whether or not the positional relationship between the second object 132 and the second designation position satisfies the third condition. The display control section 102 performs the normal display control process that moves the first object 130 based on the first designation position when the positional relationship between the first object 130 and the first designation position satisfies the third condition independently of the positional relationship between the first object 130 and the second designation position, and performs the normal display control process that moves the first object 130 based on the second designation position when the positional relationship between the first object 130 and the second designation position satisfies the third condition independently of the positional relationship between the first object 130 and the first designation position. The display control section 102 does not move the second object 132 based on the first designation position when the positional relationship between the second object 132 and the second designation position does not satisfy the third condition even when the positional relationship between the second object 132 and the first designation position satisfies the third condition, and does not move the second object 132 based on the second designation position when the positional relationship between the second object 132 and the first designation position does not satisfy the third condition even when the positional relationship between the second object 132 and the second designation position satisfies the third condition. The display control section 102 performs the special display control process that moves the second object 132 based on at least one of the first designation position and the second designation position when the positional relationship between the second object 132 and the first designation position and the positional relationship between the second object 132 and the second designation position satisfy the third condition.

When the display control section 102 performs the special movement control process, the display control section 102 may move the second object 132 based on the resultant vector of the moving vector of the first designation position and the moving vector of the second designation position, or may move the second object 132 to follow the midpoint (i.e., special position) between the first designation position and the second designation position when moving the second object 132 based on the first designation position and the second designation position.

The display control section 102 performs the special display control process that moves the first object 130 based on at least one of the first designation position and the second designation position when the positional relationship between the first object 130 and the first designation position and the positional relationship between the first object 130 and the second designation position satisfy the third condition.

5-14. Fourteenth Modification

The above embodiment has been described taking an example in which the first mark 32, the second mark 44, the special mark 50, and the like are expressed using two-dimensional image data, and the first gun object 34, the first bullet object 40, the target object 46, and the like are expressed using three-dimensional image data. Note that the first mark 32, the second mark 44, the special mark 50, and the like may be expressed using three-dimensional image data, and the first gun object 34, the first bullet object 40, the target object 46, and the like may be expressed using two-dimensional image data. The first mark 32, the second mark 44, the special mark 50, the first gun object 34, the first bullet object 40, and the target object 46 may be expressed using two-dimensional image data or three-dimensional image data.

The positional relationship between various displays may be determined in the two-dimensional space or the three-dimensional space. The positional relationship between various displays may be determined by converting two-dimensional data into three-dimensional data, or converting three-dimensional data into two-dimensional data, if necessary.

For example, the image control device 10 calculates the first indication position (i.e., first designation position) and the second indication position (i.e., second designation position) in the three-dimensional space, and controls the image based on the first indication position and the second indication position.

Specifically, the image control device 10 calculates the three-dimensional first indication position, disposes the first mark at the calculated three-dimensional first indication position, and controls the direction of the first mark so that the direction of the first mark is necessarily normal to the virtual camera. The image control device 10 generates an image of the three-dimensional space viewed from the virtual camera, and displays the generated image (i.e., normal display control process).

For example, the image control device 10 converts the coordinate values of the two-dimensional first indication position 31 into three-dimensional coordinate values to determine the three-dimensional first indication position. Specifically, the image control device 10 determines the three-dimensional first indication position as follows.

The image control device 10 calculates (x1, y1) of the three-dimensional first indication position (x1, y1, z1) in the three-dimensional space based on the two-dimensional first indication position 31. The image control device 10 sets the value z1 of the three-dimensional first indication position to a value at a given distance from the previous position with respect to the viewpoint position of the virtual camera. Specifically, the image control device 10 sets the value z1 of the three-dimensional first indication position to a given depth value ZP in the virtual camera coordinate system.

Note that the image control device 10 may determine a plurality of given depth values in advance based on the viewpoint position of the virtual camera, and may set the value z1 of the three-dimensional first indication position to one of the given depth values.

The image control device 10 may set the three-dimensional first indication position so that the first indication position is necessarily disposed at a position closer to the virtual camera than other objects. For example, when another object is disposed at the first indication position, the image control device 10 sets the three-dimensional first indication position at a position that is located within a given range around the other object so that the first mark is closer to the virtual camera than the other object.

For example, the image control device 10 sets the depth value of the intersection point of a ray (first straight line L1) that passes through the position of the virtual camera and the three-dimensional first indication position and the other object (or the hit determination volume of the other object) to be the depth value (value z1) of the three-dimensional first indication position. When the ray (first straight line L1) that passes through the position of the virtual camera and the three-dimensional first indication position does not intersect the other object, the image control device 10 sets the depth value (value z1) of the three-dimensional first indication position to a default value (e.g., ZP).

The image control device 10 calculates the three-dimensional second indication position, disposes the second mark at the calculated three-dimensional second indication position, and controls the direction of the second mark so that the direction of the second mark is necessarily normal to the virtual camera. The image control device 10 generates an image of the three-dimensional space viewed from the virtual camera, and displays the generated image (i.e., normal display control process).

For example, the image control device 10 converts the coordinate values of the two-dimensional second indication position 43 into three-dimensional coordinate values to determine the three-dimensional second indication position. Specifically, the image control device 10 determines the three-dimensional second indication position as follows.

The image control device 10 calculates (x2, y2) of the three-dimensional second indication position (x2, y2, z2) in the three-dimensional space based on the two-dimensional second indication position 43. The image control device 10 sets the value z2 of the three-dimensional second indication position to a value at a given distance from the previous position with respect to the viewpoint position of the virtual camera. Specifically, the image control device 10 sets the value z2 of the three-dimensional second indication position to a given depth value ZP in the virtual camera coordinate system.

Note that the image control device 10 may determine a plurality of given depth values in advance based on the viewpoint position of the virtual camera, and may set the value z2 of the three-dimensional second indication position to one of the given depth values.

The image control device 10 may set the three-dimensional second indication position so that the second indication position is necessarily disposed at a position closer to the virtual camera than other objects. For example, when another object is disposed at the second indication position, the image control device 10 sets the three-dimensional second indication position at a position that is located within a given range around the other object so that the second mark is closer to the virtual camera than the other object.

For example, the image control device 10 sets the depth value of the intersection point of a ray (second straight line L2) that passes through the position of the virtual camera and the three-dimensional second indication position and the other object (or the hit determination volume of the other object) to be the depth value (value z2) of the three-dimensional second indication position. When the ray (second straight line L2) that passes through the position of the virtual camera and the three-dimensional second indication position does not intersect the other object, the image control device 10 sets the depth value (value z2) of the three-dimensional second indication position to a default value (e.g., ZP).

The image control section 10 calculates the three-dimensional special position based on the three-dimensional first indication position and the three-dimensional second indication position based on a given condition.

For example, the image control section 10 determines that a given condition is satisfied when the distance between the three-dimensional first indication position and the three-dimensional second indication position in the three-dimensional space is shorter than a given distance. The image control section 10 may determine that a given condition is satisfied when the three-dimensional first indication position and the three-dimensional second indication position indicate an identical object. Specifically, the image control section 10 may determine that a given condition is satisfied when an object that intersects the ray (first straight line L1) that passes through the position of the virtual camera and the three-dimensional first indication position is the same as an object that intersects the ray (second straight line L2) that passes through the position of the virtual camera and the three-dimensional second indication position.

The image control section 10 calculates the three-dimensional special position as follows.

The image control section 10 may calculate the midpoint between the three-dimensional first indication position and the three-dimensional second indication position as the special position.

The image control device 10 calculates the two-dimensional midpoint 49 based on the two-dimensional first indication position 31 and the two-dimensional second indication position 43. The image control section 10 may convert the coordinate values of the two-dimensional midpoint 49 into three-dimensional coordinate values, and may set the three-dimensional coordinate values to be the special position. In this case, the image control device 10 may set the value z3 of the three-dimensional special position (x3, y3, z3) to a value at a given distance from the previous position with respect to the viewpoint position of the virtual camera. Specifically, the image control device 10 sets the value z3 of the three-dimensional first indication position to a given depth value ZP in the virtual camera coordinate system.

The image control device 10 may correct the three-dimensional special position. For example, the image control device 10 may correct the value z3 of the three-dimensional special position to the value z1 of the three-dimensional first indication position or the value z2 of the three-dimensional second indication position.

The image control device 10 may correct the special position so that the special position is necessarily disposed at a position closer to the virtual camera than other objects. For example, when another object is disposed at the special position, the image control device 10 may correct the special position to a position that is located within a given range around the other object so that the special mark is closer to the virtual camera than the other object.

When the three-dimensional first indication position and the three-dimensional second indication position indicate an identical object, the image control section 10 may set the special position around the identical object. Specifically, when an object that intersects the ray (first straight line L1) that passes through the position of the virtual camera and the three-dimensional first indication position is the same as an object that intersects the ray (second straight line L2) that passes through the position of the virtual camera and the three-dimensional second indication position, the image control section 10 sets a position that is located within a given range around the object at a position closer to the virtual camera than the object to be the three-dimensional special position.

The image control device 10 disposes the special mark at the calculated three-dimensional special position, and controls the direction of the special mark so that the direction of the special mark is necessarily normal to the virtual camera. The image control device 10 generates an image of the three-dimensional space (in which the special mark is disposed) viewed from the virtual camera, and displays the generated image (i.e., special display control process).

When the distance between the three-dimensional first indication position and the three-dimensional second indication position is longer than the first distance (i.e., outside the first range), the image control device 10 disposes the first mark at the three-dimensional first indication position, and disposes the second mark at the three-dimensional second indication position. The image control device 10 generates an image of the three-dimensional space (in which the first mark and the second mark are disposed) viewed from the virtual camera, and displays the generated image (i.e., normal display control process).

When the distance between the three-dimensional first indication position and the three-dimensional second indication position is longer than the second distance and is equal to or shorter than the first distance (i.e., within the first range and outside the second range), the image control device 10 may dispose an intermediate object that connects the first mark disposed at the three-dimensional first indication position and the second mark disposed at the three-dimensional second indication position. The image control device 10 generates an image of the three-dimensional space (in which the first mark, the second mark, and the intermediate object are disposed) viewed from the virtual camera, and displays the generated image (i.e., special display control process).

When the left button 36 or the right button 38 of the first controller 16 and the left button 36 or the right button 38 of the second controller 18 have been pressed for one second (i.e., a given time has elapsed) in a state in which the distance between the three-dimensional first indication position and the three-dimensional second indication position is equal to or shorter than the second distance (i.e., within the second range) due to a further decrease in the distance between the three-dimensional first indication position and the three-dimensional second indication position, the image control device 10 may dispose the special mark (i.e., special position display) at the special position calculated based on the three-dimensional first indication position and the three-dimensional second indication position instead of the first mark and the second mark, and may control the direction of the special mark so that the direction of the special mark is necessarily normal to the virtual camera. The image control device 10 may then generate an image of the three-dimensional space (in which the special mark is disposed) viewed from the virtual camera, and display the generated image. The second distance is included within the size (three-dimensional range) of the target object 42. The special mark has such a size (three-dimensional range) that the special mark can include the three-dimensional first indication position and the three-dimensional second indication position. The special mark thus indicates the three-dimensional position indicated by the first controller 16 and the second controller 18. The image of the special mark is generated by mapping a special mark texture having a color distribution that indicates the special mark onto a transparent polygon that is disposed at the special position in the three-dimensional space.

When the distance between the three-dimensional first indication position and the three-dimensional second indication position has exceeded the second distance, or when the left button 36 or the right button 38 of the first controller 16 and the left button 36 or the right button 38 of the second controller 18 have not been pressed for one second, the image control device 10 disposes the first mark at the three-dimensional first indication position instead of the special mark, and disposes the second mark at the three-dimensional second indication position.

When disposing the special mark at the special position in the three-dimensional space, and generating an image, the first bullet object fired from the first gun object 34 moves toward the three-dimensional special position instead of the three-dimensional first indication position (i.e., special display control process), and the second bullet object fired from the second gun object 46 moves toward the three-dimensional special position instead of the three-dimensional second indication position (i.e., special display control process). When the special mark is displayed, the first gun object 34 and the second gun object 46 are controlled to aim at the special position (i.e., special display control process).

When the image control device 10 disposes the special mark at the three-dimensional special position, and generates an image, the image control device 10 may determine whether or not the three-dimensional target object overlaps the special position by determining the positional relationship between the three-dimensional target object and the special position (i.e., special position determination process).

The image control device 10 sets the hit determination volume to the target object 42 in order to determine whether or not the first bullet object 40 or the second bullet object 48 has hit the target object 42 in the three-dimensional space. In this case, a second hit determination volume (i.e., fourth range) used when the special mark 50 is disposed may be larger than a first hit determination volume (i.e., third range) used when the special mark is not disposed.

5-15. Fifteenth Modification

The above embodiment has been described taking an example in which the display object controlled based on an operation performed using the first controller 16 differs in color from the display object controlled based on an operation performed using the second controller 18. Note that it may be possible to allow the player to distinguish an operation performed using the first controller 16 from an operation performed using the second controller 18 by causing an effect sound output based on an operation performed using the first controller 16 to differ from an effect sound output based on an operation performed using the second controller 18.

5-16. Sixteenth Modification

The above embodiment has been described taking an example in which the second position determination section 116 determines whether or not the first straight line or the second straight line intersects the hit determination volume having the relatively narrow third range set to the target object 42 when the normal display control process is performed, and determines whether or not the first straight line or the second straight line intersects the hit determination volume having the relatively wide fourth range set to the target object 42 when the special display control process is performed. Note that the hit determination range set to the first straight line and the second straight line may be changed without causing the hit determination volume set to the target object 42 to differ between the normal display control process and the special display control process. For example, the second position determination section 116 may determine whether or not the relatively narrow third range formed around the first straight line or the relatively narrow third range formed around the second straight line intersects the hit determination volume having a given range set to the target object 42 when the normal display control process is performed, and may determine whether or not the relatively narrow fourth range formed around the first straight line or the relatively narrow fourth range formed around the second straight line intersects the hit determination volume having a given range set to the target object 42 when the special display control process is performed.

5-17. Seventeenth Modification

The invention may be applied to various games. The invention may be applied to various image control devices such as an arcade game system, a consumer game system, a large-scale attraction system in which a number of players participate, a simulator, a multimedia terminal, a system board which generates a game image, and a mobile phone.

B. Second Embodiment

1. Configuration of Image Control Device for Communication

Figure 25:
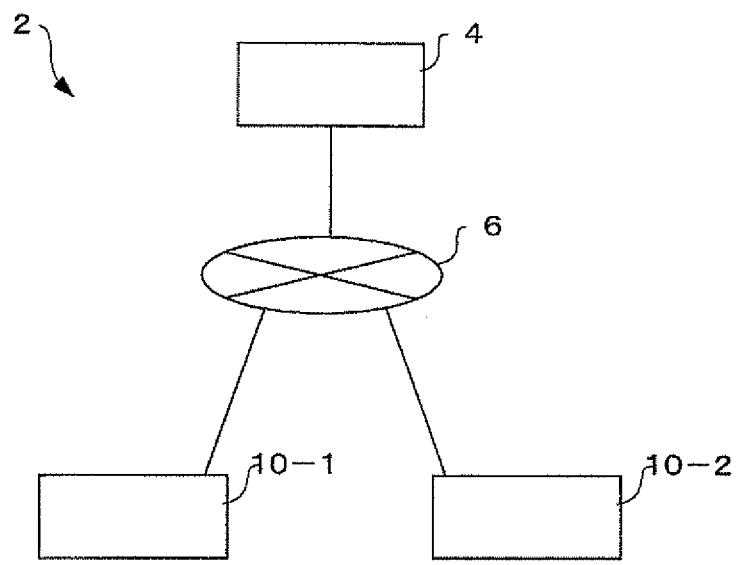
FIG. 25 is a view showing an example of an image control system according to the second embodiment of the invention.

FIG. 25 is a perspective view showing the configuration of an image control system 2 that includes a plurality of image control devices 10 to which an image control device according to one embodiment of the invention is applied. As shown in FIG. 25, the image control system 2 is configured so that a server device 4, a first image control device (first game device) 10-1, and a second image control device (second game device) 10-2 are connected via a network 6 (e.g., Internet, LAN, or WAN). The image control system 2 implements a client-server communication system. The first image control device 10-1 and the second image control device 10-2 have an identical configuration. The first image control device 10-1 and the second image control device 10-2 communicate via the server device 4, and exchange information. The first image control device 10-1 and the second image control device 10-2 perform various game processes (e.g., control an image using generated or received information). The image control system 2 according to this embodiment is thus configured so that an image displayed on a display screen 13 of the first image control device 10-1 is consistent with an image displayed on a display screen 13 of the second image control device 10-2, and the first image control device 10-1 and the second image control device 10-2 execute the same game.

2. External Configuration of Image Control Device

Figure 13A:
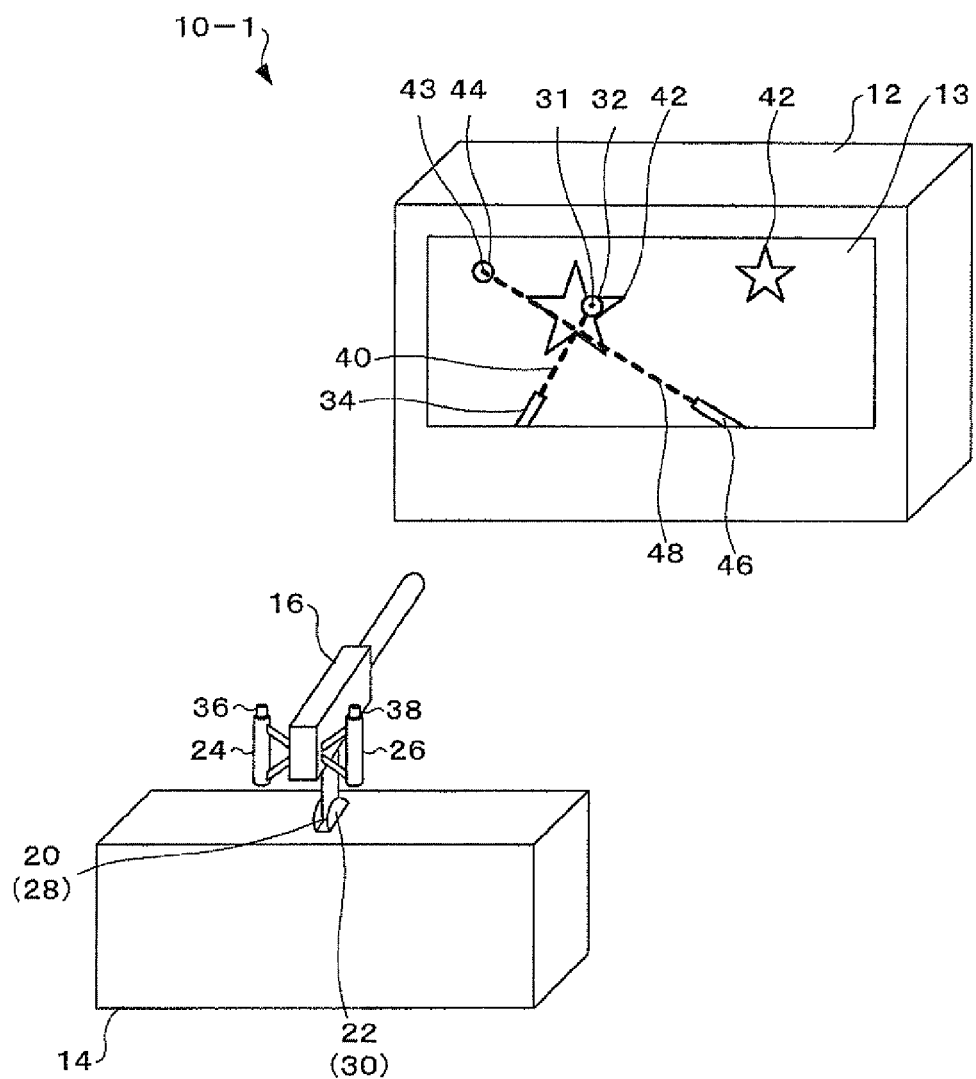
FIGS. 13A and 13B are perspective views showing an image control device according to a second embodiment of the invention.

FIG. 13A is a perspective view showing the external configuration of the first image control device 10-1 according to one embodiment of the invention. The external configuration of the second image control device 10-2 is the same as that of the first image control device 10-1. As shown in FIG. 13A, the image control device 10-1 according to this embodiment includes a display 12 that displays an image, a pedestal 14 that is provided in front of a display screen 13 of the display 12, and a first controller 16 (i.e., first operation section or first indicator) that is provided on the upper side of the pedestal 14 and imitates the shape of a machine gun.

The controller 16 is secured on the pedestal 14 so that the first controller 16 is rotatable around a first axis 20 that is provided perpendicularly and a second axis 22 that is provided horizontally. A left grip 24 that is held by the player with the left hand, and a right grip 26 that is held by the player with the right hand are provided on the rear end of the controller 16. The player rotates the controller 16 around the first axis 20 and the second axis 22 (i.e., performs an operation that designates a position within the image) while holding the left grip 24 and the right grip 26 to arbitrarily change the direction of the end (muzzle) of the controller 16 (i.e., changes the indication position of an indicator). The movable range of the controller 16 is set so that the end of the controller 16 can indicate (i.e., designate) a given area of the display screen 13. For example, the movable range of the controller 16 may be set so that the end of the controller 16 can indicate the entire area of the display screen 13, or may be set so that the end of the controller 16 can indicate only a given area of the display screen 13. The controller 16 includes a first variable resistor 28 that detects the rotation amount of the controller 16 around the first axis 20, and a second variable resistor 30 that detects the rotation amount of the controller 16 around the second axis 22.

The first image control device 10-8 calculates a first indication position 31 (i.e., first designation position) that is the position within the display screen 13 (i.e., a position within an image or a position within a display area)) indicated by the end of the controller 16 as coordinate values (i.e., first information) in a two-dimensional coordinate system (i.e., virtual space). The first image control device 10-1 displays a first mark 32 (i.e., first designation position display or first display) that indicates the position indicated by the controller 16 in the image displayed on the display screen 13 at a position corresponding to the first indication position 31 (i.e., normal display control process).

The first image control device 10-1 displays a first gun object 34 (i.e., display object) that indicates the end of the controller 16 on the lower side of the image displayed on the display screen 13. The image control device 10-1 changes the direction of the first gun object 34 corresponding to a change in the direction of the controller 16 based on the detection result of the first variable resistor 28 and the detection result of the second variable resistor 30 of the controller 16. In this embodiment, the image control device 10 controls the first gun object 34 so that the first gun object 34 aims at the first indication position 31 (i.e., normal display control process).

When the player has pressed a left button 36 (i.e., first operating section) provided at the upper end of the left grip 24 or a right button 38 (i.e., first operating section) provided at the upper end of the right grip 26, the image control device 10 moves a first bullet object 40 (i.e., first moving object) that indicates a bullet fired from the first gun object 34 from the end of the first gun object 34 toward the center of the first mark 32 (i.e., normal display control process).

The first image control device 10-1 displays a target object 42 (i.e., display object) that indicates a target within the image displayed on the display screen 13 while moving the target object 42. When the player has pressed the left button 36 or the right button 38 of the controller 16 in a state in which the center of the first mark 32 is positioned within the target object 42, the image control device 10-1 determines that the first bullet object 40 has hit the target object 42. The first image control device 10-1 then displays an indication (display) that the first bullet object 40 has hit the target object 42.

As shown in FIG. 25, the first image control device 10-1 receives coordinate values (i.e., second information) that indicate a second indication position 43 (i.e., second designation position) that is the position within a display screen 13 of a second image control device 10-2 indicated by the end of a controller 16 (i.e., second operation section or second indicator) of the second image control device 10-2 from the second image control device 10-2 via the server device 4. The first image control device 10-1 displays a second mark 44 (i.e., second designation position display or second display) that indicates the position indicated by the controller 16 of the second image control device 10-2 in the image displayed on the display screen 13 at a position corresponding to the second indication position 43 (i.e., normal display control process).

The first image control device 10-1 displays a second gun object 46 (i.e., display object) that indicates the end of the second controller 18 of the second image control device 10-2 on the lower side of the image displayed on the display screen 13. The first image control device 10-1 changes the direction of the second gun object 46 corresponding to a change in the direction of the second controller 18 of the second image control device 10-2 based on the coordinate values that indicate the second indication position 43. In this embodiment, the first image control device 10-1 controls the second gun object 46 so that the second gun object 46 aims at the second indication position 43 (i.e., normal display control process).

When the first image control device 10-1 has received operation information that indicates that the player has pressed the left button 36 or the right button 38 of the controller 16 of the second image control device 10-2 from the second image control device 10-2 via the server device 4, the first image control device 10-1 moves a second bullet object 48 (i.e., second moving object) that indicates a bullet fired from the second gun object 46 from the end of the second gun object 46 toward the center of the second mark 44 displayed on the display screen 13 of the first image control device 10-1 (i.e., normal display control process).

When the first image control device 10-1 has received determination information that indicates that the second image control device 10-2 has determined that the second bullet object 48 has hit the target object 42 from the second image control device 10-2 via the server device 4, the first image control device 10-1 displays an indication (display) that the second bullet object 48 has hit the target object 42.

The first image control device 10-1 displays the first mark 32, the first gun object 34, and the first bullet object 40 in blue, and displays the second mark 44, the second gun object 46, and the second bullet object 48 in red. Specifically, the display object that is controlled based on an operation performed using the controller 16 of the first image control device 10-1 and the display object that is controlled based on an operation performed using the controller 16 of the second image control device 10-2 are identified by the difference in color.

The first image control device 10-1 according to this embodiment is thus configured so that the first mark 32, the second mark 44, the first bullet object 40, and the second bullet object 48 move individually in the image displayed on the display screen 13 of the first image control device 10-1 based on an arbitrary operation performed using the controller 16 of the first image control device 10-1 and the controller 16 of the second image control device 10-2. The first image control device 10-1 determines whether or not the first bullet object 40 has hit the target object 42, and determines whether or not the second bullet object 48 has hit the target object 42.

Figure 13B:
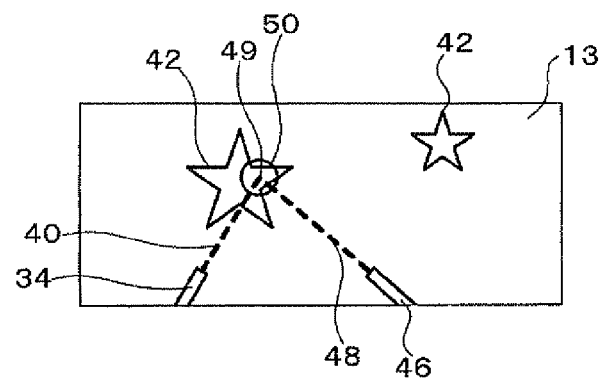

The first image control device 10-1 calculates a midpoint 49 (i.e., special position) between the first indication position 31 and the second indication position 43 (see FIG. 13B) when the distance between the first indication position 31 and the second indication position 43 has become shorter than a given distance (i.e., based on a given condition), and displays a special mark 50 (i.e., special display) that indicates the position indicated by the controller 16 of the first image control device 10-1 and the controller 16 of the second image control device 10-2 at a position corresponding to the midpoint 49 (i.e., special display control process).

The second image control device 10-2 also performs a process similar to the process performed by the first image control device 10-1. Each of the first image control device 10-1 and the second image control device 10-2 according to this embodiment can thus display an image generated when a plurality of operations that designate a position within the image are performed, even if the first image control device 10-1 and the second image control device 10-2 are installed in different remote locations.

3. Functional Blocks

Figure 14:
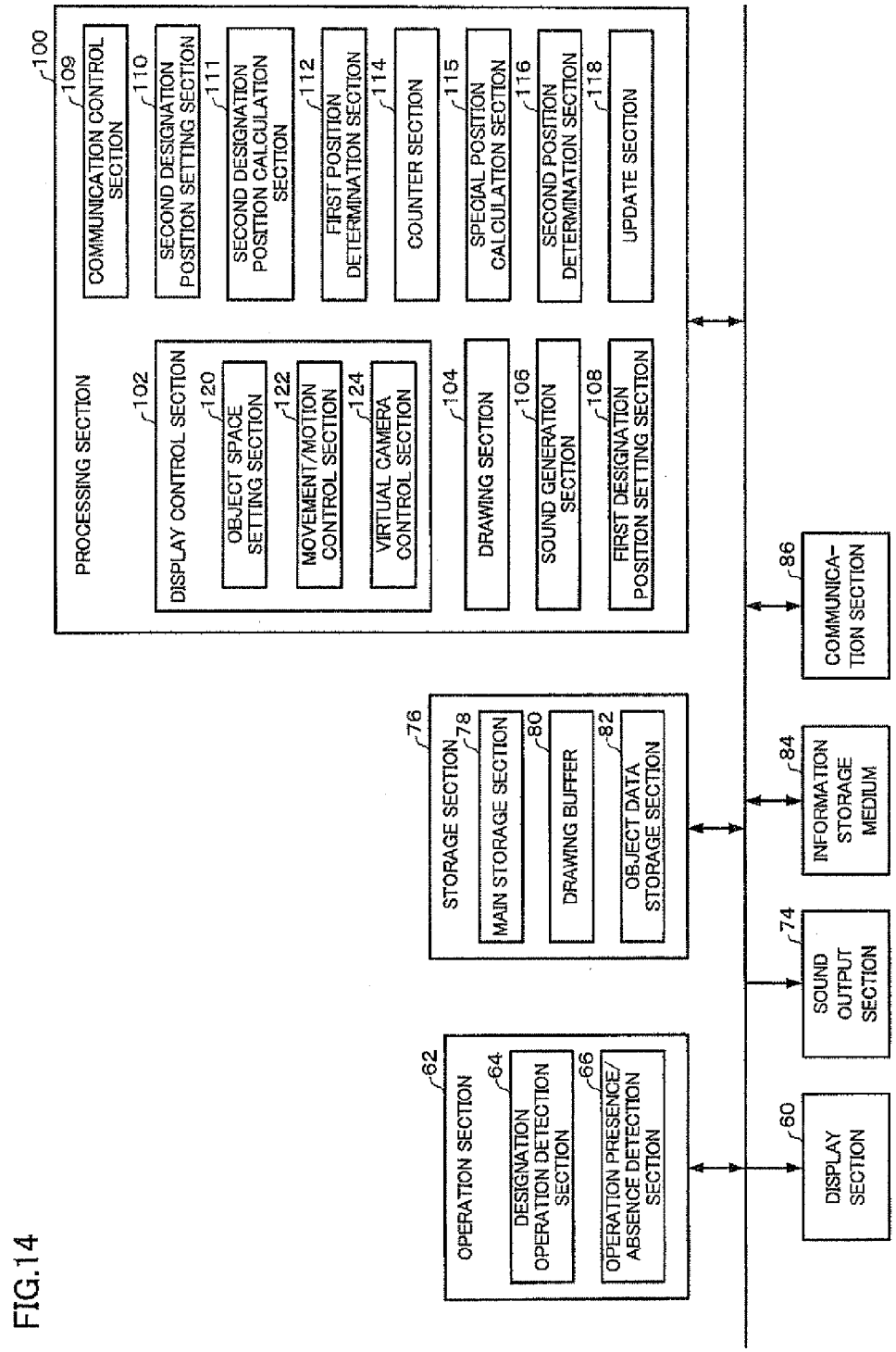
FIG. 14 is a functional block diagram showing the image control device according to the second embodiment of the invention.

FIG. 14 is a block diagram showing the functions of the first image control device (game device) 10-1 according to this embodiment. Note that the first image control device 10-1 may have a configuration in which some of the elements (sections) shown in FIG. 14 are omitted.

A display section 60 displays an image on a display screen. The function of the display section 60 may be implemented by a CRT display, a liquid crystal display, a plasma display, or the like.

An operation section 62 allows the player to input operation data. The function of the operation section 62 may be implemented by an operation body that can be arbitrarily changed in direction by the player (e.g., the controller 16 shown in FIG. 13A that imitates the shape of a machine gun). The operation section 62 includes a designation operation detection section 64 and an operation presence/absence detection section 66.

The designation operation detection section 64 detects an operation that is performed using the operation section 62 and designates a position within an image, and outputs first position designation operation information (i.e., first information) that changes based on the operation. The function of the designation operation detection section 64 may be implemented by a variable resistor, a potentiometer, a rotary encoder, or the like. More specifically, when the operation section 62 has been rotated around the first axis 20 and the second axis 22 that perpendicularly intersects the first axis 20, the designation operation detection section 64 outputs a combination of resistance values (i.e., first information) based on the rotation (tilt) direction and the rotation amount of the operation section 62.

The operation presence/absence detection section 66 detects an operation performed using the first operating section of the operation section 62 (e.g., left button 36 or right button 38 shown in FIG. 13A), and outputs specific operation information that changes based on the presence or absence of such an operation. The function of the operation presence/absence detection section 66 may be implemented by a pressure sensor, a switch, or the like. More specifically, the operation presence/absence detection section 66 outputs an ON signal (i.e., specific operation information) when the left button 36 or the right button 38 has been pressed, and outputs an OFF signal (i.e., specific operation information) (i.e., does not output the ON signal) when the left button 36 or the right button 38 has not been pressed.

A sound output section 74 outputs sound. The function of the sound output section 74 may be implemented by a speaker, a headphone, or the like.

A storage section 76 serves as a work area for a processing section 100, a communication section 86, and the like. The function of the storage section 76 may be implemented by a RAM (main memory), a VRAM (video memory), or the like. The storage section 76 according to this embodiment includes a main storage section 78 that is used as a work area for the processing section 100, a drawing buffer 80 in which an image displayed on the display section 60 is drawn, and an object data storage section 82 that stores object data.

An information storage medium 84 (computer-readable medium) stores a program, data, and the like. The function of the information storage medium 84 may be implemented by an optical disk (CD or DVD), a magneto-optical disk (MO), a magnetic disk, a hard disk, a magnetic tape, a memory (ROM), or the like. The information storage medium 84 stores a program and data used for the processing section 100 to perform various processes. Specifically, the information storage medium 84 stores a program that causes a computer to function as each section according to this embodiment (i.e., a program that causes a computer to perform the process of each section).

The communication section 86 performs various types of control for communicating with the outside (e.g. host device or another image control device). The function of the communication section 86 may be implemented by hardware such as a processor or a communication ASIC, a program, or the like.

A program (data) that causes a computer to function as each section according to this embodiment may be distributed to the information storage medium 84 (or storage section 78) from an information storage medium included in a host device (server) via a network and the communication section 86. Use of the information storage medium included in the host device (server) is also included within the scope of the invention.

The processing section 100 (processor) performs a game process, an image generation process, a sound generation process, and the like based on operation data from the operation section 62, data received via the communication section 86, a program, and the like. The game process includes starting the game when game start conditions have been satisfied, proceeding with the game, generating an event when event generation conditions have been satisfied, disposing an object such as a character or a topography, displaying an object, calculating the game result, finishing the game when game end conditions have been satisfied, and the like. The processing section 100 performs various processes using the main storage section 78 as a work area. The function of the processing section 100 may be implemented by hardware such as a processor (e.g., CPU (main processor), GPU (drawing processor), or DSP)) or an ASIC (e.g., gate array), or a program.

The processing section 100 includes a display control section 102, a drawing section 104, a sound generation section 106, a first designation position setting section 108, a second designation position setting section 110, a first position determination section 112, a counter section 114, a special position calculation section 115, a second position determination section 116, and an update section 118. The processing section 100 may have a configuration in which some of these sections are omitted.

The display control section 102 controls an image (object image) displayed on the display screen 13 of the display section 60. Specifically, the display control section 102 generates a display target object (e.g., character, moving object, course, building, first gun object 34, second gun object 46, first bullet object 40, second bullet object 48, target object 42, topography, background, first mark 32, second mark 44, or special mark 50), instructs display of the object and the display position, or causes the object to disappear, based on the operation information from the operation section 62, data received via the communication section 86, a program, and the like. Specifically, the display control section 102 registers the generated object in an object list, transfers the object list to the drawing section 104 or the like, or deletes an object that has disappeared from the object list, for example.

The display control section 102 includes an object space setting section 120, a movement/motion processing section 122, and a virtual camera control section 124.

The object space setting section 120 disposes an object (i.e., an object formed by a primitive such as a polygon, free-form surface, or subdivision surface) that represents a display object (e.g., character, moving object, course, or building) or a light source that indicates the travel direction, intensity, and color of light in an object space based on the object data stored in the object data storage section 82. Specifically, the object space setting section 120 determines the position and the rotational angle (synonymous with orientation or direction) of the object in a world coordinate system, and disposes the object at the determined position (X, Y, Z) and the determined rotational angle (rotational angles around X, Y, and Z-axes).

The movement/motion control section 122 calculates the movement/motion of the object (movement/motion simulation). The movement/motion processing section 122 causes the object to move or make a motion (animation) in the object space based on the operation information from the operation section 62, data received via the communication section 86, a program (movement/motion algorithm), various types of data (motion data), and the like. Specifically, the movement/motion processing section 122 performs a simulation process that sequentially calculates movement information (position, rotational angle, speed, or acceleration) and motion information (i.e., the position or the rotational angle of each part that forms the object) of the object every frame (1/60th of a second). Note that the term frame refers to a time unit when performing an object movement/motion process (simulation process) or an image generation process.

The virtual camera control section 124 controls a virtual camera (view point) for generating an image viewed from a given (arbitrary) viewpoint in the object space. Specifically, the virtual camera control section 124 controls the position (X, Y, Z) or the rotational angle (rotational angles around X, Y, and Z-axes) of the virtual camera (i.e., controls the viewpoint position, the line-of-sight direction, or the angle of view).

For example, when photographing the object from behind using the virtual camera, the virtual camera control section 124 controls the position or the rotational angle (direction) of the virtual camera so that the virtual camera follows a change in position or rotation of the object. In this case, the virtual camera control section 124 may control the virtual camera based on information (e.g., position, rotation angle, speed, or acceleration) about the object obtained by the movement/motion processing section 122. Alternatively, the virtual camera control section 124 may rotate the virtual camera by a predetermined rotational angle, or may move the virtual camera along a predetermined path. In this case, the virtual camera control section 124 controls the virtual camera based on virtual camera data that specifies the position (moving path) or the rotational angle of the virtual camera. When a plurality of virtual cameras are provided, the virtual camera control section 124 performs the above control process on each virtual camera.

The drawing section 104 performs a drawing process based on the results of various processes (game process) performed by the processing section 100 to generate an image, and outputs the generated image to the display section 60. When generating a three-dimensional game image, the drawing section 104 receives object data (model data) including vertex data (e.g., vertex position coordinates, texture coordinates, color data, normal vector, or alpha value) of each vertex of the object (model) from the object data storage section 82, and performs a vertex process (shading using a vertex shader) based on the vertex data included in the received object data. When performing the vertex process, the drawing section 104 may perform a vertex generation process (tessellation, surface division, or polygon division) for dividing the polygon, if necessary. In the vertex process, the drawing section 104 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results. The drawing section 104 then performs a rasterization process (scan conversion) based on the vertex data changed by the vertex process so that the surface of the polygon (primitive) is linked to pixels. The drawing section 104 then performs a pixel process (shading using a pixel shader or a fragment process) that draws the pixels that form the image (fragments that form the display screen). In the pixel process, the drawing section 104 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to the rendering target (i.e., the drawing buffer 80 that can store image information corresponding to each pixel). Specifically, the pixel process includes a per-pixel process that sets or changes the image information (e.g., color (color value and luminance value), normal, and alpha value) corresponding to each pixel. The drawing section 104 thus generates an image viewed from the virtual camera (given viewpoint) in the object space. When a plurality of virtual cameras (viewpoints) are provided, the drawing section 104 may generate an image so that images (divided images) viewed from the respective virtual cameras are displayed on a single screen.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process to increase the degree of freedom of the drawing process so that the representation capability can be significantly improved as compared with a fixed drawing process using hardware.

The drawing section 104 performs a geometric process, texture mapping, hidden surface removal, alpha blending, and the like when drawing the object.

In the geometric process, the drawing section 104 subjects the object to coordinate transformation, clipping, perspective projection transformation, light source calculation, and the like. The object data (e.g., object vertex position coordinates, texture coordinates, color data (luminance data), normal vector, or alpha value) after the geometric process (after perspective transformation) is stored in the object data storage section 82.

In texture mapping, a texture (texel value or UV coordinate values) stored in a texture storage section 76 of the video memory is mapped onto the object. Specifically, the drawing section 104 reads a texture (surface properties such as color (RGB) and alpha value) from the texture storage section 76 using the texture coordinates set (assigned) to the vertices of the object, and the like. The drawing section 104 maps the texture (two-dimensional image) onto the object. In this case, the drawing section 104 performs a pixel-texel linking process, a bilinear interpolation process or a trilinear interpolation process (texel interpolation process), and the like.

The sound generation section 106 performs a sound generation process based on the results of various processes performed by the processing section 100 to generate game sound such as background music (BGM), effect sound, or voice, and outputs the generated game sound to the sound output section 74.

The first designation position setting section 108 sets the first designation position in the virtual space based on the first information that changes based on an operation that is performed using the operation section 62 of the first image control device 10-1 and designates a position within the image. Specifically, the first designation position setting section 108 acquires a combination of resistance values (i.e., first information) input from the operation section 62 each time the frame is updated, calculates coordinate values (i.e., first information) in the virtual plane (i.e., virtual space) specified by a two-dimensional coordinate system based on the combination of resistance values, and sets the coordinate values as the first designation position. The virtual plane corresponds to the entire area (i.e., given area) of the two-dimensional space (screen) obtained by perspective projection transformation of the object space by the geometric process. For example, the virtual plane may be a plane disposed in a near plane (i.e., a plane nearest to the virtual camera) within a view volume that specifies an object space drawing range.

A communication control section 109 causes the communication section 86 to communicate with another image control device 10, and transmit and receive information. Specifically, the communication control section 109 causes the communication section 86 to transmit the first information to the destination. The communication control section 109 also causes the communication section 86 to receive second information that changes based on a second operation that is performed using the operation section 62 of the second image control device 10-2 and designates a position within the image. The first information transmitted by the communication section 86 may be operation information output from the designation operation detection section 64 of the first image control device 10-1, or may be first coordinate values of the virtual plane calculated based on the operation information. Likewise, the second information may be operation information output from the designation operation detection section 64 of the second image control device 10-2, or may be second coordinate values of the virtual plane calculated based on the operation information.

The communication control section 109 causes the communication section 86 to transmit and receive information for executing an online game with another image control device 10. For example, the communication control section 109 causes the communication section 86 to transmit and receive information necessary for a process that registers the player in the image control system 2, information necessary for a process that allows the player to log in to the image control system 2, information necessary for a process that sets an opposing player who cooperates or fights with the player who has logged in, information necessary for a process that synchronizes the first image control device 10-1 and the second image control device 10-2, information necessary for a process that executes an identical game in the first image control device 10-1 and the second image control device 10-2, and the like. The communication control section 109 also causes the communication section 86 to transmit and receive destination information that indicates the destination of the information, sender information that indicates the sender of the information, identification information that identifies the image control device 10 that has generated the information, and the like.

The second designation position setting section 110 sets a second designation position in the virtual space based on the second information. Specifically, the second designation position setting section 110 acquires the second coordinate values (i.e., second information) from the communication section 86 each time the frame is updated, and sets the second coordinate values as the second designation position.

The second designation position calculation section 111 calculates the second information based on the second information that has been received when the communication section 86 cannot receive the second information. Specifically, when the communication section 86 cannot receive the second coordinate values corresponding to the current frame due to a communication delay or error, the second designation position calculation section 111 calculates the second coordinate values corresponding to the current frame based on the second coordinate values set as the second designation position in the preceding frame.

The second designation position setting section 110 sets the second coordinate values calculated by the second designation position calculation section 111 as the second designation position.

The display control section 102 then performs the normal display control process that controls the image based on the first designation position, and controls the image based on the second designation position. Specifically, the display control section 102 performs the normal display control process that displays the first mark 32 based on the first designation position independently of the second designation position, and displays the second mark 44 based on the second designation position independently of the second designation position (see FIG. 13A). More specifically, the display control section 102 disposes a transparent polygon for the first mark 32 at a position corresponding to the first designation position in the virtual plane specified by the two-dimensional coordinate system, and disposes a transparent polygon for the second mark 44 at a position corresponding to the second designation position in the virtual plane specified by the two-dimensional coordinate system.

The drawing section 104 maps a texture having a color distribution that indicates the first mark 32 onto the transparent polygon for the first mark 32, and draws the polygon to display the first mark 32. The drawing section 104 also maps a texture having a color distribution that indicates the second mark 44 onto the transparent polygon for the second mark 44, and draws the polygon to display the second mark 44. Since the virtual plane in which the transparent polygon for the first mark 32 and the transparent polygon for the second mark 44 are disposed, is disposed in the near plane, the first mark 32 and the second mark 44 are displayed on the front side as compared with other objects disposed in the object space. Note that the drawing section 104 may draw the virtual plane in which the first mark 32 and the second mark 44 are disposed in a drawing area differing from the drawing area in which the image viewed from the virtual camera is drawn, and superimpose the drawn image on the image viewed from the virtual camera.

The first position determination section 112 determines the positional relationship between the first designation position and the second designation position each time the frame is updated. Specifically, the first position determination section 112 determines whether or not the distance (i.e., positional relationship) between the first designation position and the second designation position in the virtual plane is longer than a zeroth distance, whether or not the distance (i.e., positional relationship) between the first designation position and the second designation position in the virtual plane is longer than a first distance shorter than the zeroth distance, or whether or not the distance (i.e., positional relationship) between the first designation position and the second designation position in the virtual plane is longer than a second distance shorter than the first distance. Alternatively, the first position determination section 112 may determine whether or not the second designation position is included within a zeroth range that is formed around the first designation position (i.e., positional relationship), whether or not the second designation position is included within a first range that is formed around the first designation position and is smaller than the zeroth range (i.e., positional relationship), or whether or not the second designation position is included within a second range that is formed around the first designation position and is smaller than the first range (i.e., positional relationship).

The counter section 114 counts a given count value. Specifically, the counter section 114 starts to count a first count value when the left button 36 or the right button 38 of the controller 16 of the first image control device 10-1 shown in FIG. 13A and the left button 36 or the right button 38 of the controller 16 of the second image control device 10-2 have been pressed. The counter section 114 resets the first count value when the first count value has reached a given count value (i.e., when a given time has elapsed), or when the left button 36 or the right button 38 of the controller 16 of the first image control device 10-1 has been released, or when the left button 36 or the right button 38 of the controller 16 of the second image control device 10-2 has been released.

The counter section 114 starts to count a second count value when the left button 36 or the right button 38 of the controller 16 of the first image control device 10-1 has been released, and the left button 36 or the right button 38 of the controller 16 of the second image control device 10-2 has been released. The counter section 114 resets the second count value when the second count value has reached a given count value (i.e., when a given time has elapsed), or when the left button 36 or the right button 38 of the controller 16 of the first image control device 10-1 has been pressed, or when the left button 36 or the right button 38 of the controller 16 of the second image control device 10-2 has been pressed.

The special position calculation section 115 calculates the special position in the virtual space based on the first designation position and the second designation position each time the frame is updated. Specifically, the special position calculation section 115 calculates the coordinates of the midpoint between the first designation position and the second designation position in the virtual plane specified by the two-dimensional coordinate system. The special position calculation section 115 may calculate the special position when the determination result of the first position determination section 112 or the count value of the counter section 114 has satisfied a given condition (i.e., based on a given condition or when a first condition has been satisfied), or may calculate the special position irrespective of a given condition.

When the determination result of the first position determination section 112 or the count value of the counter section 114 has satisfied a given condition (i.e., based on a given condition or when a first condition has been satisfied), the display control section 102 starts the special display control process that controls the image based on the special position.

Specifically, the display control section 102 performs the special display control process that controls the image based on the first designation position and the second designation position based on a given condition. More specifically, the display control section 102 performs the special display control process that displays the special mark 50 that indicates the position designated by the controller 16 of the first image control device 10-1 and the controller 16 of the second image control device 10-2 based on the special position (see FIG. 13B). The display control section 102 disposes a transparent polygon for the special mark 50 at a position corresponding to the special position in the virtual plane specified by the two-dimensional coordinate system.

The drawing section 104 maps a texture having a color distribution that indicates the special mark 50 onto the transparent polygon for the special mark 50, and draws the polygon to display the special mark 50. Since the virtual plane in which the transparent polygon for the special mark 50 is disposed, is disposed in the near plane, the special mark 50 is displayed on the front side as compared with other objects disposed in the object space. Note that the drawing section 104 may draw the virtual plane in which the special mark 50 is disposed in a drawing area differing from the drawing area in which the image viewed from the virtual camera is drawn, and superimpose the drawn image on the image viewed from the virtual camera.

When the determination result of the first position determination section 112 or the count value of the counter section 114 has not satisfied a given condition (i.e., based on a given condition or when a second condition has been satisfied), the display control section 102 finishes the special display control process, and starts the normal display control process that controls the image based on the first designation position, and controls the image based on the second designation position. Specifically, the display control section 102 controls at least one of start and finish of the special display control process and start and finish of the normal display control process based on a given condition taking account of the positional relationship between the first designation position and the second designation position or whether or not a given time has elapsed. The display control section 102 may perform the special display control process and the normal display control process at the same time, or may selectively perform the special display control process or the normal display control process.

The second position determination section 116 performs a normal position determination process that determines the positional relationship between the target object 42 and the first designation position, and determines the positional relationship between the target object 42 and the second designation position each time the frame is updated, when the first mark 32 and the second mark 44 are displayed (i.e., based on a given condition when the normal display control process is performed). The second position determination section 116 alternately performs the process that determines the positional relationship between the target object 42 and the first designation position and the process that determines the positional relationship between the target object 42 and the second designation position every frame when the first mark 32 and the second mark 44 are displayed. This reduces the processing load that occurs within one frame due to the positional relationship determination process. The second position determination section 116 performs a special position determination process that determines the positional relationship between the target object 42 and the special position when the special mark 50 is displayed (i.e., when the special display control process is performed). The second position determination section 116 may perform the normal position determination process and the special position determination process at the same time based on a given condition, or may selectively perform the normal position determination process or the special position determination process. The positional relationship determination method according to this embodiment is described below with reference to FIGS. 15A and 15B.

Figure 15A:
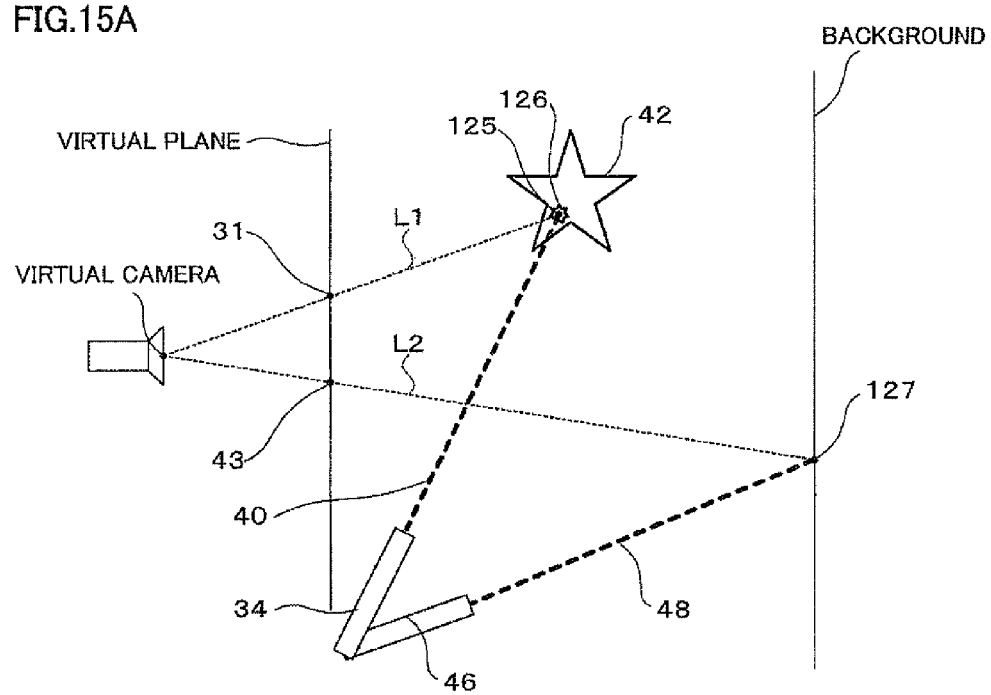
FIGS. 15A and 15B are views illustrative of a method employed in the image control device according to the second embodiment of the invention.
Figure 15B:
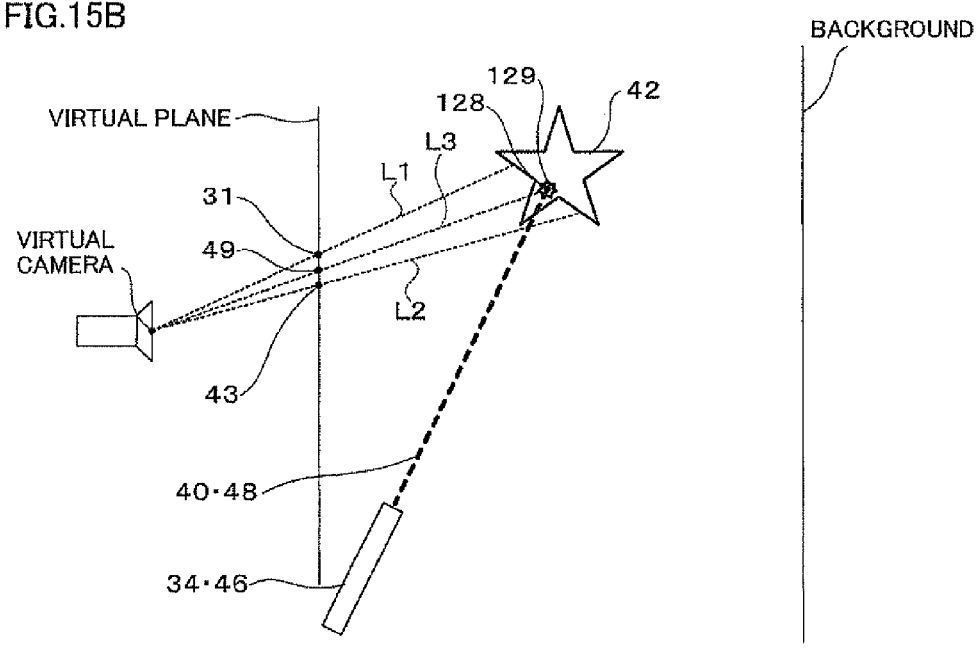

FIGS. 15A and 15B are views showing the object space along the virtual plane specified by the two-dimensional coordinate system. In FIGS. 15A and 15B, the virtual plane is indicated by a line. When the first mark 32 and the second mark 44 are displayed, the second position determination section 116 determines whether or not a first straight line L1 that passes through the position of the virtual camera (viewpoint) and the first indication position 31 disposed in the virtual plane intersects the target object 42 (i.e., the positional relationship between the display object and the first designation position), and determines whether or not a second straight line L2 that passes through the position of the virtual camera and the second indication position 43 disposed in the virtual plane intersects the target object 42 (i.e., the positional relationship between the display object and the second designation position), as shown in FIG. 15A. The second position determination section 116 thus determines whether or not the target object 42 overlaps the first mark 32 on the display screen 13, and determines whether or not the target object 42 overlaps the second mark 44 on the display screen 13.

When the first straight line L1 intersects the target object 42 (see FIG. 15A), the display control section 102 moves the first bullet object 40 from the first gun object 34 toward an intersection point 125 of the first straight line L1 and the target object 42, and displays a normal bullet mark display 126 (i.e., first movement result display) that indicates that the first bullet object 40 has hit the intersection point 125 (i.e., normal display control process). When the second straight line L2 does not intersect the target object 42, and intersects the background object that is positioned in the deepest area of the object space, the display control section 102 moves the second bullet object 48 from the second gun object 46 toward an intersection point 127 of the second straight line L2 and the background object. The display control section 102 does not display the normal bullet mark display 126 (i.e., second movement result display) that indicates that the second bullet object 48 has hit the background object at the intersection point 127 of the second straight line L2 and the background object.

When the special mark 50 is displayed, the second position determination section 116 determines whether or not a third straight line L3 that connects the position of the virtual camera and the midpoint 49 between the first indication position 31 and the second indication position 43 in the virtual plane intersects the target object 42 (i.e., the positional relationship between the display object and the special position) (see FIG. 15B). The second position determination section 116 thus determines whether or not the target object 42 overlaps the special mark 50 on the display screen 13.

When the third straight line L3 intersects the target object 42 (see FIG. 15B), the display control section 102 moves the first bullet object 40 from the first gun object 34 toward an intersection point 128 of the third straight line L3 and the target object 42, moves the second bullet object 48 from the second gun object 46 toward the intersection point 128 of the third straight line L3 and the target object 42 (i.e., special display control process), and displays a special bullet mark display 129 (i.e., special movement result display) that indicates that the first bullet object 40 and the second bullet object 48 have hit the intersection point 128 (i.e., special display control process). In FIG. 15B (i.e., a view showing the object space along the virtual plane), the first gun object 34 coincides with the second gun object 46 in the direction in the virtual plane, and the first bullet object 40 coincides with the second bullet object 48 in the direction in the virtual plane.

When the third straight line L3 does not intersect the target object 42, and intersects the background object that is positioned in the deepest area of the object space, the display control section 102 moves the first bullet object 40 from the first gun object 34 toward the intersection point of the third straight line L3 and the background object and moves the second bullet object 48 from the second gun object 46 toward the intersection point of the third straight line L3 and the background object (not shown). The display control section 102 does not display the special bullet mark display 129 (i.e., special movement result display) that indicates that the first bullet object 40 and the second bullet object 48 have hit the background object at the intersection point of the third straight line L3 and the background object.

When the first mark 32 and the second mark 44 are displayed, the second position determination section 116 determines the positional relationship between the target object 42 and the first designation position based on a third range, and determines the positional relationship between the target object 42 and the second designation position based on a third range. When the special mark 50 is displayed, the second position determination section 116 determines the positional relationship between the target object 42 and the special position based on a fourth range.

Specifically, the object space setting section 120 sets a hit determination volume having the third range to the target object 42 when the normal position determination process is performed (i.e., when the first mark 32 and the second mark 44 are displayed), and sets a hit determination volume having a fourth range larger than the third range to the target object 42 when the special position determination process is performed (i.e., when the special mark 50 is displayed). The second position determination section 116 determines whether or not the first straight line L1 or the second straight line L2 shown in FIG. 15A intersects the hit determination volume having the third range when the normal position determination process is performed, and determines whether or not the third straight line L3 shown in FIG. 15B intersects the hit determination volume having the fourth range when the special position determination process is performed.

The update section 118 updates a given parameter with a first update parameter when the first mark 32 and the second mark 44 are displayed, and updates a given parameter with a second update parameter when the special mark 50 is displayed. Specifically, the update section 118 updates a destruction parameter set to the target object 42 each time the first bullet object 40 or the second bullet object 48 hits the target object 42. The target object 42 is destroyed when the destruction parameter has been updated and reached a given value. The update section 118 updates the destruction parameter so that the update amount (i.e., first update parameter) when updating the destruction parameter when the first mark 32 and the second mark 44 are displayed (i.e., when the normal position determination process is performed) is smaller than the update amount (i.e., second update parameter) when updating the destruction parameter when the special mark 50 is displayed (i.e., when the special position determination process is performed).

The display control section 102 displays a state in which the target object 42 is destroyed when the destruction parameter set to the target object 42 has reached a given value.

Figure 16A:
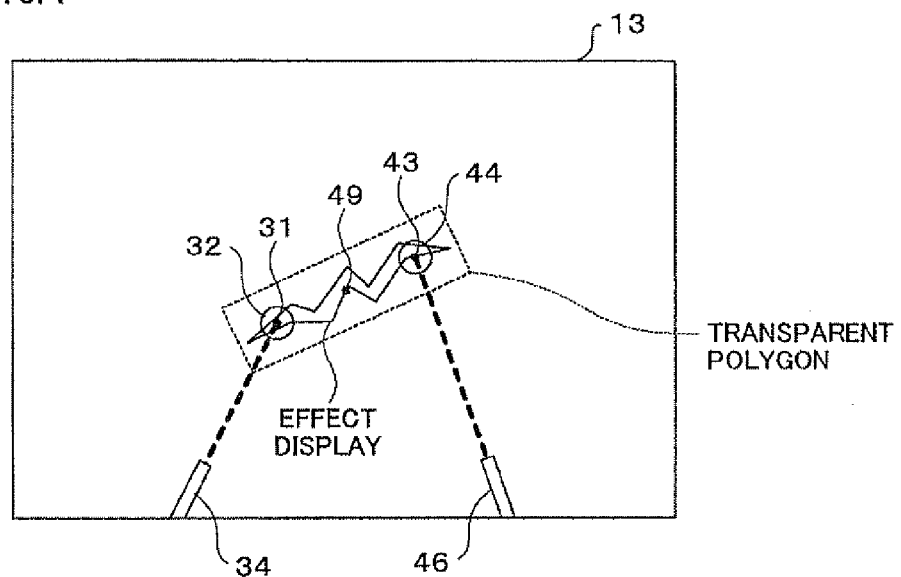
FIGS. 16A and 16B are views showing examples of an image displayed on the image control device according to the second embodiment of the invention.
Figure 16B:
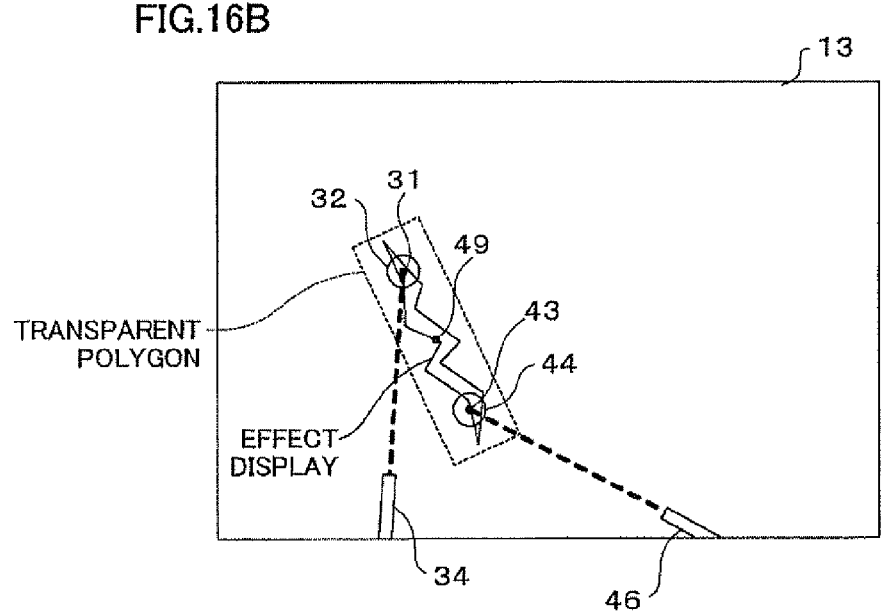

4. Method According to this Embodiment 4-1. Display of First Mark and Second Mark FIGS. 16A and 16B are views showing examples of an image displayed on the display screen 13 of the first image control device 10-1 according to this embodiment. In this embodiment, when the distance between the first indication position 31 and the second indication position 43 in the virtual plane set in the first image control device 10-1 is longer than the first distance (i.e., outside the first range), the first mark 32 is displayed at a position corresponding to the first indication position 31, and the second mark 44 is displayed at a position corresponding to the second indication position 43 (i.e., normal display control process), as shown in FIG. 13A.

As shown in FIG. 16A, when the distance between the first indication position 31 and the second indication position 43 is longer than the first distance and is equal to or shorter than the zeroth distance (i.e., within the zeroth range and outside the first range) due to a decrease in the distance between the first indication position 31 and the second indication position 43, an effect display that imitates lightning is displayed to connect the first mark 32 that is displayed at a position corresponding to the first indication position 31 and the second mark 44 that is displayed at a position corresponding to the second indication position 43 (i.e., special display control process). The effect display is implemented by mapping an effect display texture having a color distribution that indicates lightning onto a transparent polygon that is disposed in the virtual plane around the midpoint 49 between the first indication position 31 and the second indication position 43.

The transparent polygon is fixed to a line segment that connects the first indication position 31 and the second indication position 43. As shown in FIG. 16B, when the positional relationship between the first indication position 31 and the second indication position 43 has changed due to the movement of the first indication position 31 or the second indication position 43, the position and the direction of the transparent polygon change based on the change in the positional relationship between the first indication position 31 and the second indication position 43. Therefore, when the distance between the first indication position 31 and the second indication position 43 is longer than the first distance and is equal to or shorter than the zeroth distance, an effect display that imitates lightning is displayed to connect the first mark 32 and the second mark 44 even if the positional relationship between the first indication position 31 and the second indication position 43 has changed.

In this embodiment, a plurality of effect display textures are provided. The effect display textures differ in the shape of lightning by degrees. The effect display textures are successively mapped onto the transparent polygon with the lapse of time. An animation of lightning (effect display) is thus displayed.

Figure 17A:
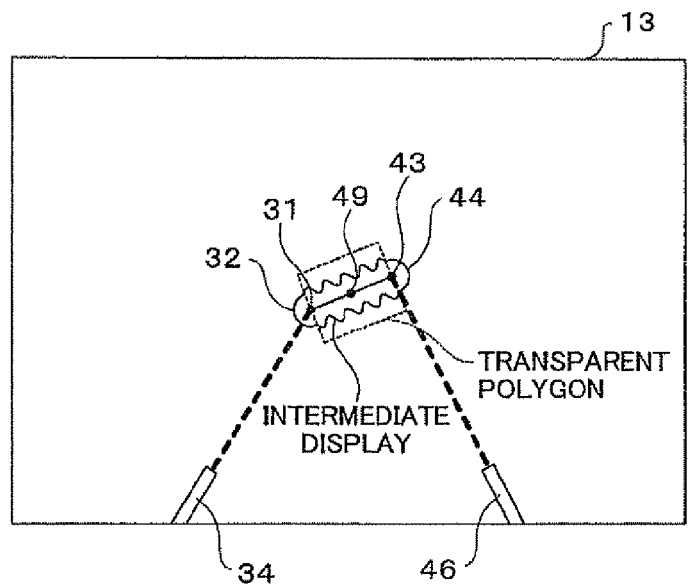
FIGS. 17A and 17B are views showing examples of an image displayed on the image control device according to the second embodiment of the invention.
Figure 17B:
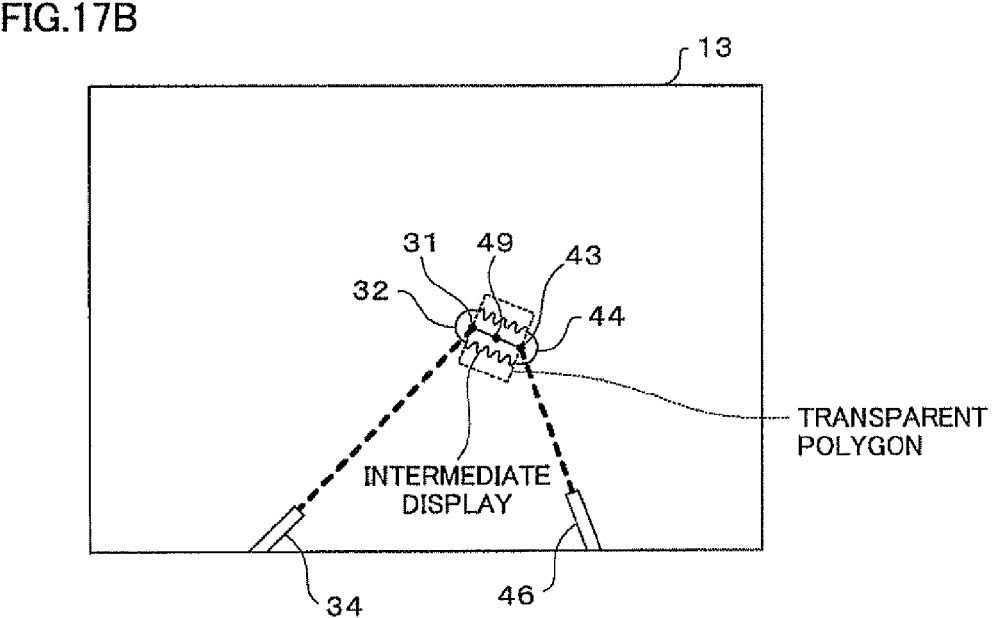

FIGS. 17A and 17B are views showing examples of an image displayed on the display screen 13 of the first image control device 10-1 according to this embodiment. As shown in FIG. 17A, when the distance between the first indication position 31 and the second indication position 43 is longer than the second distance and is equal to or shorter than the first distance (i.e., within the first range and outside the second range) due to a further decrease in the distance between the first indication position 31 and the second indication position 43, an intermediate display is displayed to connect the first mark 32 that is displayed at a position corresponding to the first indication position 31 and the second mark 44 that is displayed at a position corresponding to the second indication position 43 (i.e., special display control process). The intermediate display is implemented by mapping an intermediate display texture having a color distribution that indicates the intermediate display onto a transparent polygon that is disposed in the virtual plane around the midpoint 49 between the first indication position 31 and the second indication position 43 in the same manner as the effect display.

The transparent polygon is fixed to a line segment that connects the first indication position 31 and the second indication position 43 in the same manner as the effect display. As shown in FIG. 17B, when the positional relationship between the first indication position 31 and the second indication position 43 has changed due to the movement of the first indication position 31 or the second indication position 43, the position and the direction of the transparent polygon change based on the change in the positional relationship between the first indication position 31 and the second indication position 43. When the intermediate display is displayed, the length of the sides of the transparent polygon that are parallel to the line segment that connects the first indication position 31 and the second indication position 43 changes when the length of the line segment that connects the first indication position 31 and the second indication position 43 has changed due to a change in the positional relationship between the first indication position 31 and the second indication position 43 (see FIG. 17B).

In this embodiment, a plurality of effect display textures are provided corresponding to the length of the side of the transparent polygon. The effect display textures differ in the shape of the intermediate display by degrees corresponding to the distance between the first indication position 31 and the second indication position 43. One of the intermediate display textures is mapped onto the transparent polygon corresponding to the distance between the first indication position 31 and the second indication position 43. Therefore, when the distance between the first indication position 31 and the second indication position 43 is longer than the second distance and is equal to or shorter than the first distance, the intermediate display that connects the first mark 32 and the second mark 44 is displayed even if the distance between the first indication position 31 and the second indication position 43 has changed.

In this embodiment, a plurality of intermediate display textures are provided respectively corresponding to a plurality of transparent polygons that differ in side length. The intermediate display textures differ in the shape of the intermediate display by degrees corresponding to the transparent polygons that differ in length. The intermediate display textures are successively mapped onto the transparent polygon with the lapse of time. An animation of the intermediate display is thus displayed even if the distance between the first indication position 31 and the second indication position 43 does not change.

Figure 18A:
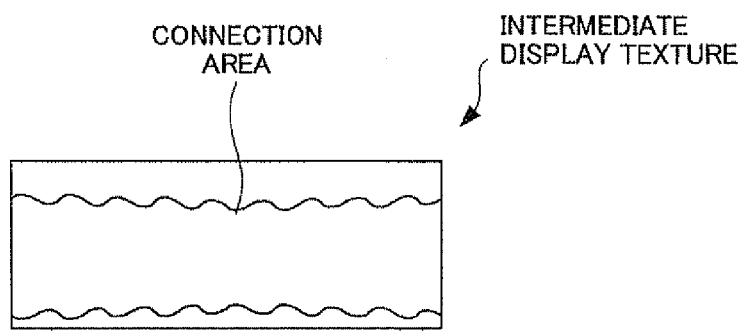
FIGS. 18A and 18B are views showing examples of a texture used in the image control device according to the second embodiment of the invention.
Figure 18B:
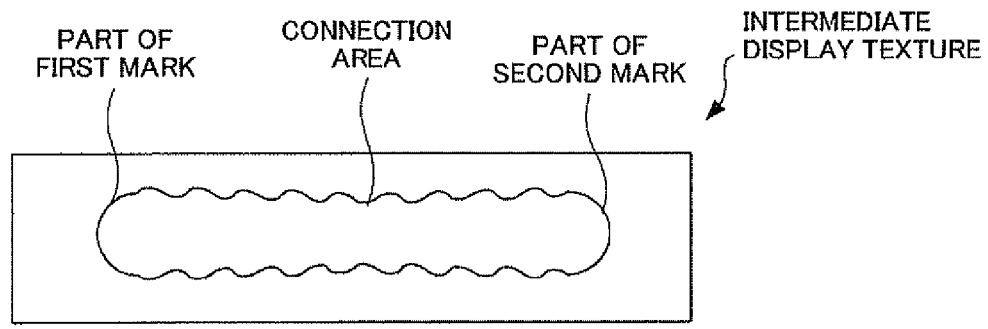

FIGS. 18A and 18B are views showing examples of the color distribution of the intermediate display texture used in this embodiment. As shown in FIG. 18A, the intermediate display texture may have a color distribution that indicates the connection area excluding the first mark 32 and the second mark 44. In this case, the first mark 32 is displayed using the transparent polygon for the first mark 32, and the second mark 44 is displayed using the transparent polygon for the second mark 44 (i.e., the normal display control process and the special display control process are performed at the same time) even when the intermediate display is displayed. However, the first mark 32 and the second mark 44 are not displayed in the connection area. An image shown in FIG. 17A or 17B is thus displayed. As shown in FIG. 18B, the intermediate display texture may have a color distribution that indicates part of the first mark 32, part of the second mark 44, and the connection area. In this case, the transparent polygon for the first mark 32 and the transparent polygon for the second mark 44 are not used (i.e., the normal display control process or the special display control process is selectively performed). An image shown in FIG. 17A or 17B is thus displayed.

4-2. Display of Special Mark

Figure 19A:
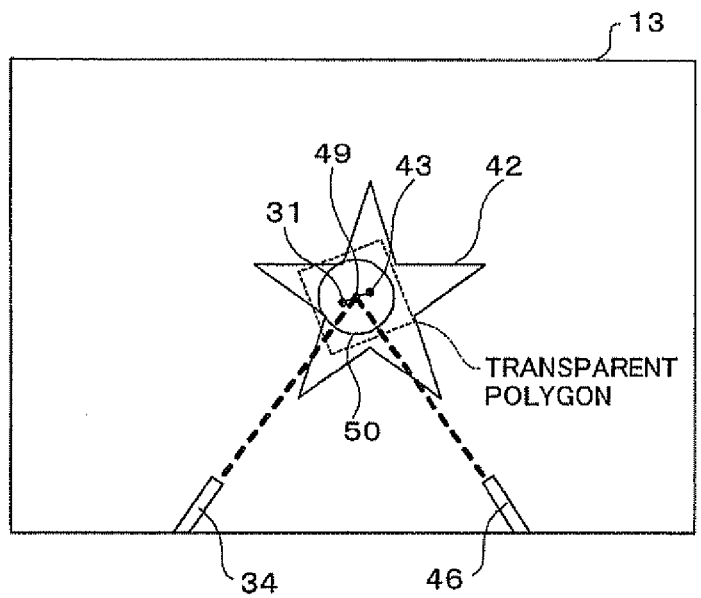
FIGS. 19A and 19B are views showing examples of an image displayed on the image control device according to the second embodiment of the invention.
Figure 19B:
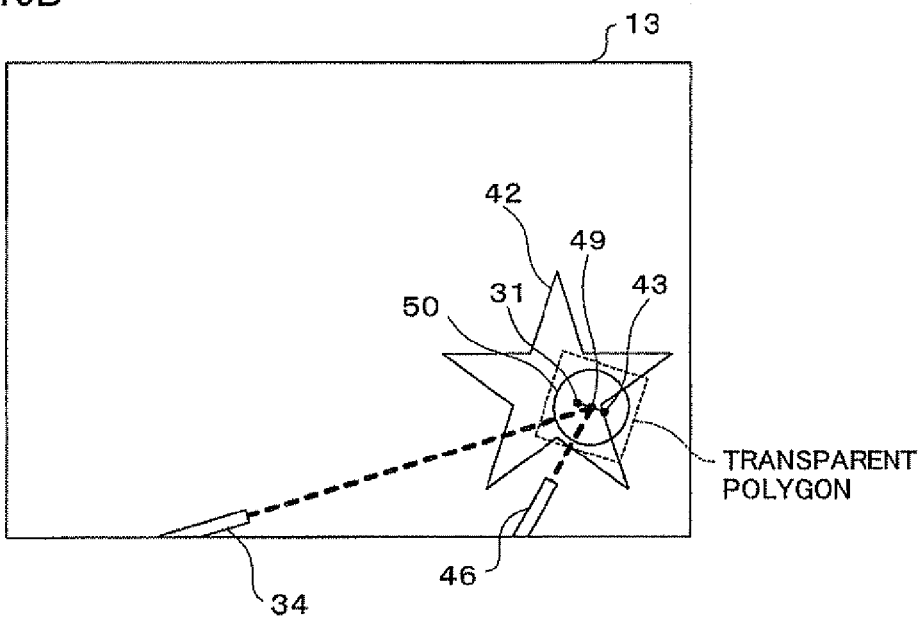

FIGS. 19A and 19B are views showing examples of an image displayed on the display screen 13 of the first image control device 10-1 according to this embodiment. In this embodiment, when the left button 36 or the right button 38 of the controller 16 of the first image control device 10-1 and the left button 36 or the right button 38 of the controller 16 of the second image control device 10-2 have been continuously pressed for one second (i.e., when a given time has elapsed) in a state in which the distance between the first indication position 31 and the second indication position 43 is equal to or shorter than the second distance (i.e., within the second range) due to a further decrease in the distance between the first indication position 31 and the second indication position 43, one special mark 50 (i.e., special position display) is displayed around the midpoint 49 (i.e., special position) between the first indication position 31 and the second indication position 43 instead of the first mark 32 and the second mark 44 (see FIG. 19A) (i.e., special display control process) (i.e., the normal display control process or the special display control process is selectively performed). The second distance is a short distance that is included within the size (display range) of the target object 42. The special mark 50 has such a size (display range) that the special mark 50 can include the first indication position 31 and the second indication position 43 that are positioned within the second distance. The special mark 50 thus indicates the position indicated by the controller 16 of the first image control device 10-1 and the controller 16 of the second image control device 10-2. The special mark 50 is displayed by mapping a special mark texture having a color distribution that indicates the special mark 50 onto a transparent polygon that is disposed in the virtual plane around the midpoint 49 between the first indication position 31 and the second indication position 43 in the same manner as the effect display and the like.

When the controller 16 of the first image control device 10-1 and the controller 16 of the second image control device 10-2 have been operated so that the left button 36 or the right button 38 of the controller 16 of the first image control device 10-1 and the left button 36 or the right button 38 of the controller 16 of the second image control device 10-2 are continuously pressed in a state in which the distance between the first indication position 31 and the second indication position 43 is equal to or shorter than the second distance, the special mark 50 is continuously displayed. For example, when the left button 36 or the right button 38 of the first controller 16 and the left button 36 or the right button 38 of the second controller 18 have been continuously pressed while the direction of each of the controller 16 of the first image control device 10-1 and the controller 16 of the second image control device 10-2 is adjusted aimed at a specific area of the target object 42 along with the movement of the target object 42, the special mark 50 is continuously displayed (see FIG. 19B).

When the special mark 50 is displayed, the first bullet object 40 fired from the first gun object 34 moves toward the midpoint 49 instead of the first indication position 31 (i.e., special display control process), and the second bullet object 48 fired from the second gun object 46 moves toward the midpoint 49 instead of the second indication position 43 (i.e., special display control process). When the special mark 50 is displayed, the first gun object 34 and the second gun object 46 are controlled to aim at the midpoint 49 (i.e., special display control process).

In this embodiment, whether or not the target object 42 overlaps the special mark 50 on the display screen 13 is determined by determining the positional relationship between the target object 42 and the midpoint 49 when the special mark 50 is displayed (i.e., special display control process).

In this embodiment, the first bullet object 40 or the second bullet object 48 easily hits the target object 42 when the special mark 50 is displayed as compared with the case where the first mark 32 and the second mark 44 are displayed. In this embodiment, the hit determination volume is set to the target object 42 in order to determine whether or not the first bullet object 40 or the second bullet object 48 has hit the target object 42 so that a second hit determination volume (i.e., fourth range) that is used when the special mark 50 is displayed is larger than a first hit determination volume (i.e., third range) that is used when the special mark 50 is not displayed.

In this embodiment, when the special mark 50 is not displayed, the target object 42 is not destroyed unless the first bullet object 40 or the second bullet object 48 hits the target object 42 five times. On the other hand, when the special mark 50 is displayed, the target object 42 is destroyed when the first bullet object 40 or the second bullet object 48 has hit the target object 42 once. In this embodiment, the destruction parameter set to the target object 42 is updated each time the first bullet object 40 or the second bullet object 48 hits the target object 42, and the update amount (i.e., first update parameter) of the destruction parameter set to the target object 42 due to one hit when the special mark 50 is displayed is larger than the update amount (i.e., second update parameter) of the destruction parameter set to the target object 42 due to one hit when the special mark 50 is not displayed.

When the distance between the first indication position 31 and the second indication position 43 has exceeded the second distance, or when the left button 36 or the right button 38 of the controller 16 of the first image control device 10-1 and the left button 36 or the right button 38 of the controller 16 of the second image control device 10-2 have not been pressed for one second, the first mark 32 is displayed at a position corresponding to the first indication position 31, and the second mark 44 is displayed at a position corresponding to the second indication position 43, instead of the special mark 50. As a result, the display control process, the position determination process, the parameter update process, and the like are performed under conditions where the first mark 32 and the second mark 44 are displayed instead of the conditions where the special mark 50 is displayed.

4-3. Process Performed by Another Image Control Device

The second image control device 10-2 also performs a process similar to the process performed by the first image control device 10-1. The first image control device 10-1 and the second image control device 10-2 according to this embodiment are thus configured so that the controller 16 of the first image control device 10-1 and the controller 16 of the second image control device 10-2 are arbitrarily operated, or are operated in connection with each other.

4-4. Initial Setting Process

The image control system 2 according to this embodiment performs an initial setting process before the game starts. The initial setting process includes a process that registers the player in the image control system 2, a process that allows the player to log in the image control system 2, a process that sets an opposing player who cooperate or fight with the player who has logged in, and the like.

Figure 26:
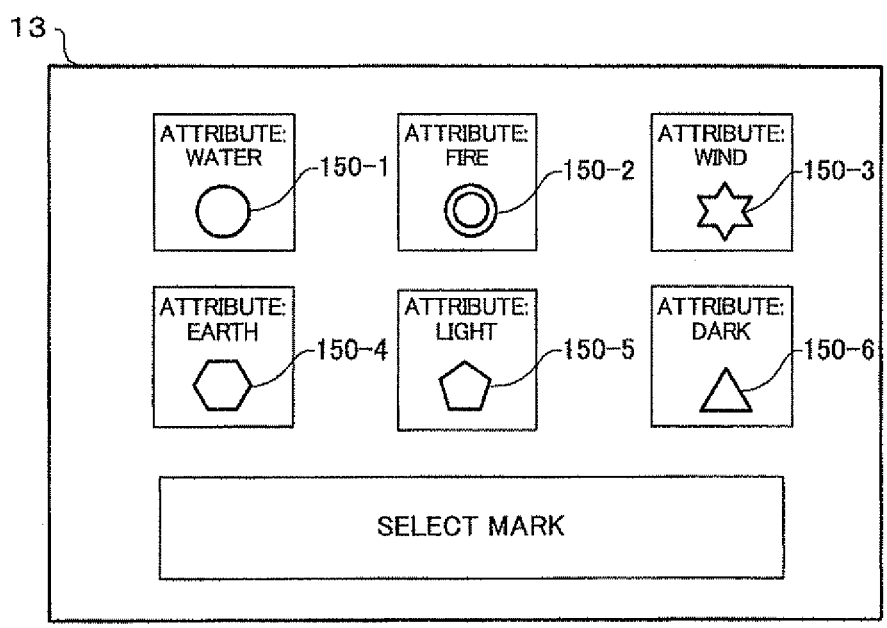
FIG. 26 is a view showing an example of an image displayed on the image control device according to the second embodiment of the invention.

FIG. 26 is a view showing an example of an image displayed on the display screen 13 of the first image control device 10-1 when the registration process has been performed. As shown in FIG. 26, the first image control device 10-1 displays a plurality of sample marks 150 (i.e., sample designation position display) that differ in design (e.g., shape and color) on the display screen 13. In the example shown in FIG. 26, sample marks 150-1 to 150-6 are displayed on the display screen 13. Each of the sample marks 150-1 to 150-6 has the same design as that of the mark (i.e., designation position display) that indicates the position indicated by the controller 16 during the game. The first image control device 10-1 allows the player to select one of the sample marks 150-1 to 150-6 to be the mark that indicates the position indicated by the controller 16 of the first image control device 10-1. The first image control device 10-1 and the server device 4 set a mark having the same design as that of the sample mark 150 selected by the player to be the mark of the player of the first image control device 10-1. An attribute that corresponds to the type of mark is displayed together with each of the sample marks 150-1 to 150-6. The attribute determines the property or the ability of the player (character). The attribute displayed together with the selected sample mark 150 is set to be the attribute of the player.

When the player of the first image control device 10-1 has logged in to the image control system 2, the first image control device 10-1 displays the players of other image control devices 10 that are currently logged in to the image control system 2 so that the player of the first image control device 10-1 can select the opposing player.

Figure 27A:
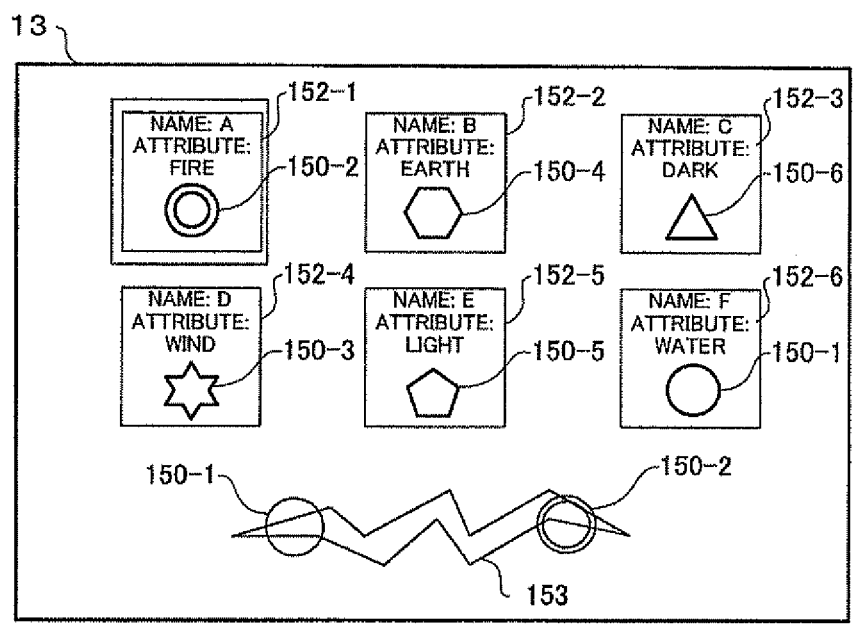
FIGS. 27A and 27B are views showing examples of an image displayed on the image control device according to the second embodiment of the invention.
Figure 27B:
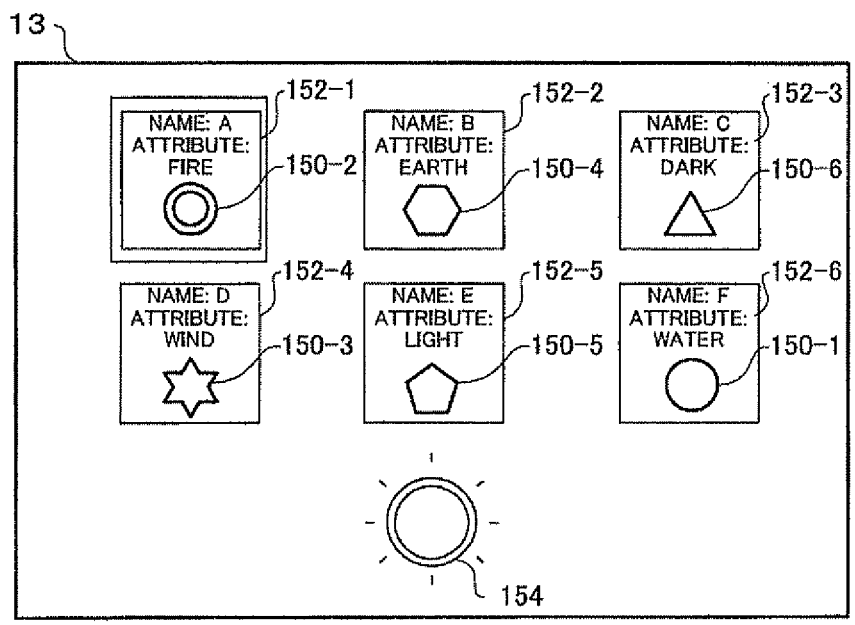

FIG. 27A is a view showing an example of a player display 152 displayed on the display screen 13 of the first image control device 10-1. As shown in FIG. 27A, each of a plurality of player displays 152 includes the name of the player, and the sample mark 150 corresponding to the mark set to the player. In the example shown in FIG. 27A, player displays 152-1 to 150-6 are displayed on the display screen 13. For example, when the player of the first image control device 10-1 has selected the player display 152-1 of the player who plays the game using the second image control device 10-2, the first image control device 10-1 displays a sample display under the player displays 152-1 to 150-6 so that the sample mark 150-1 corresponding to the first mark 32 (see FIG. 16A) set to the player of the first image control device 10-1 and the sample mark 150-2 corresponding to the second mark 44 (see FIG. 16A) set to the player of the second image control device 10-2 move closer to each other. A sample effect display 153 corresponding to the effect display shown in FIG. 16A is displayed as the sample mark 150-1 and the sample mark 150-2 move closer to each other, and a sample intermediate display corresponding to the intermediate display shown in FIG. 17A is then displayed. A sample special mark 154 corresponding to the special mark 50 shown in FIG. 19A is displayed after the sample intermediate display (see FIG. 17B).

A plurality of displays (marks) that differ in design depending on the combination of the marks are provided as the effect display, the intermediate display, and the special mark 50 displayed during the game. A plurality of displays (marks) that differ in design depending on the combination of the sample marks 150 are provided as the sample effect display, the sample intermediate display, and the sample special mark 154. Therefore, the player can check the effect display, the intermediate display, and the special mark 50 displayed during the game by the sample display before selecting the opposing player.

When the player of the first image control device 10-1 has selected the player of the second image control device 10-2 as the opposing player, and the player of the second image control device 10-2 has selected the player of the first image control device 10-1 as the opposing player, the first image control device 10-1, the second image control device 10-2, and the server device 4 set the player of the first image control device 10-1 and the player of the second image control device 10-2 to be opposing players. When the initial setting process has thus ended, the first image control device 10-1 and the second image control device 10-2 perform a process for executing an identical game in the first image control device 10-1 and the second image control device 10-2.

4-5. Synchronization Process

The first image control device 10-1 and the second image control device 10-2 according to this embodiment execute the process in synchronization in order to execute an identical game. Specifically, when the server device 4 has received information that indicates that the initial setting process has ended (i.e., the game can be executed) from the first image control device 10-1 and the second image control device 10-2, the server device 4 simultaneously or almost simultaneously instructs the first image control device 10-1 and the second image control device 10-2 to update a reference count value of a reference counter and start the game process. The reference count value and the frame are updated in synchronization. The first image control device 10-1 and the second image control device 10-2 thus simultaneously or almost simultaneously start the game process.

The first image control device 10-1 acquires (calculates) the first coordinate values that indicate the first indication position 31 indicated by the controller 16 of the first image control device 10-1 each time the frame is updated, and transmits the acquired first coordinate values and the reference count value when the first coordinate values were acquired to the second image control device 10-2. The first image control device 10-1 acquires (receives) the second coordinate values that indicate the second indication position 34 indicated by the controller 16 of the second image control device 10-2 and the reference count value of the second image control device 10-2 when the second image control device 10-2 acquired the second coordinate values from the server device 4.

Since the first image control device 10-1 acquires (calculates) the first coordinate values, and acquires the second coordinate values via communication with the second image control device 10-2 within one frame, the reference count values corresponding to the first coordinate values and the second coordinate values acquired by the first image control device 10-1 within one frame differ depending on the communication time. Specifically, the second coordinate values acquired by the first image control device 10-1 within one frame correspond to an operation performed before the time when the first coordinate values were acquired. Therefore, if the game process is performed using the first coordinate values and the second coordinate values acquired within one frame, the game process performed by the image control device 10-1 may be inconsistent with the game process performed by the second image control device 10-2.

The average communication time of the image control system 2 according to this embodiment is about 2 to 3 frames. When using the image control system 2 according to this embodiment, it is not inconvenient for the player if an image that reflects an operation performed by the player is displayed within about five frames after the player has performed the operation. When the first image control device 10-1 has acquired the second coordinate values corresponding to the same reference count value as that of the first coordinate values within five frames after the first image control device 10-1 has acquired the first coordinate values, the first image control device 10-1 performs the game process using the first coordinate values and the second coordinate values corresponding to the same reference count value.

Figure 28A:
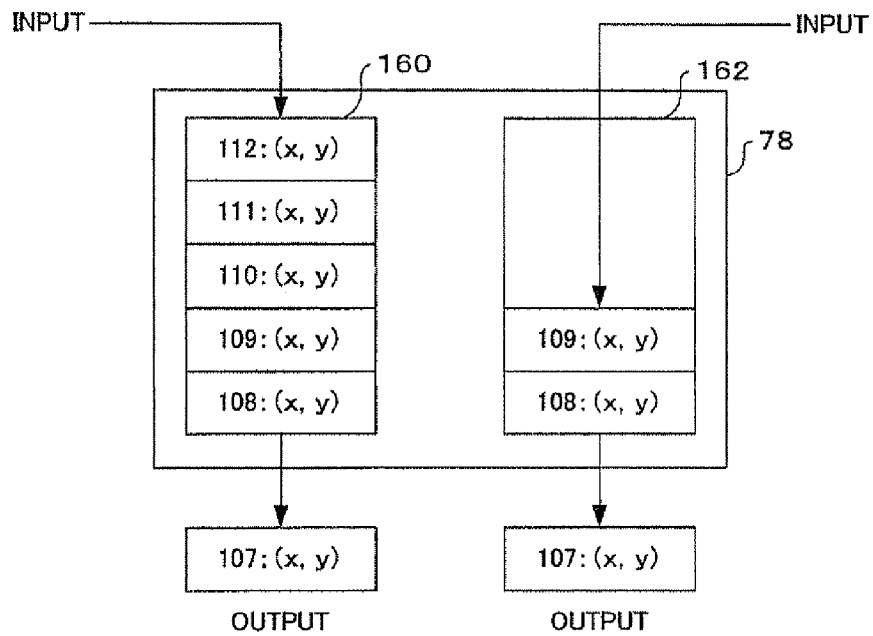
FIGS. 28A and 28B are views illustrative of a method employed in the image control device according to the second embodiment of the invention.

FIG. 28A is a view illustrative of the first coordinate values and the second coordinate values stored in the main storage section 78 of the first image control device 10-1. As shown in FIG. 28A, the main storage section 78 of the first image control device 10-1 includes a first buffer 160 that stores the first coordinate values, and a second buffer 162 that stores the second coordinate values. The data stored in the first buffer 160 and the second buffer 162 is updated by a first-in first-out (FIFO) method each time the frame is updated. The first buffer 160 can store the first coordinate values corresponding to five frames. When the frame has been updated and new first coordinate values have been input, the first coordinate values that have been input before the new first coordinate values by five frames are output. In the example shown in FIG. 28A, when first coordinate values (x, y) corresponding to a reference count value_112_have been input, first coordinate values (x, y) corresponding to a reference count value_107_are output.

When the second coordinate values corresponding to the same reference count value as that of the first coordinate values output from the first buffer 160 have been stored in the second buffer 162, the second coordinate values are output from the second buffer 162. In the example shown in FIG. 28A, second coordinate values (x, y) corresponding to the reference count value_107_are output.

The first image control device 10-1 sets the first coordinate values thus output as the first indication position 31, and sets the second coordinate values thus output as the second indication position 43. The process performed by the first image control device 10-1 and the process performed by the second image control device 10-2 are thus synchronized.

Figure 28B:
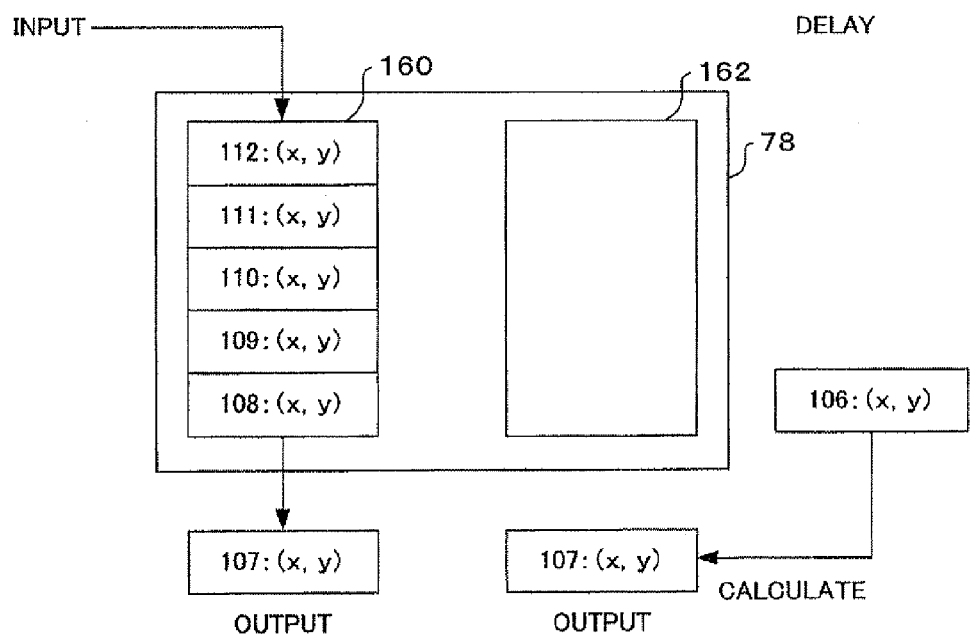

As shown in FIG. 28B, when the second coordinate values corresponding to the same reference count value as that of the first coordinate values output from the first buffer 160 are not stored in the second buffer 162 due to a communication delay or error, second coordinate values that should be set as the second indication position in the current frame are calculated based on second coordinate values (x, y) corresponding to a reference count value_106_that have been set as the second indication position in the preceding frame.

4-6. Process when Delay has Occurred

Figure 29A:
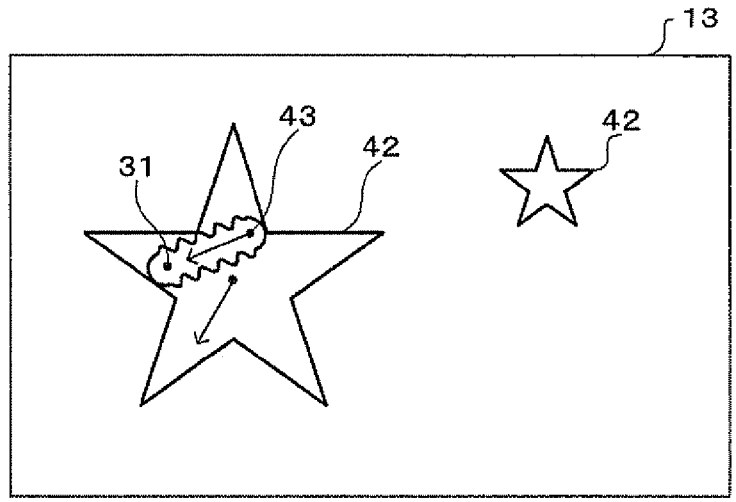
FIGS. 29A to 29C are views illustrative of a method employed in the image control device according to the second embodiment of the invention.
Figure 29B:
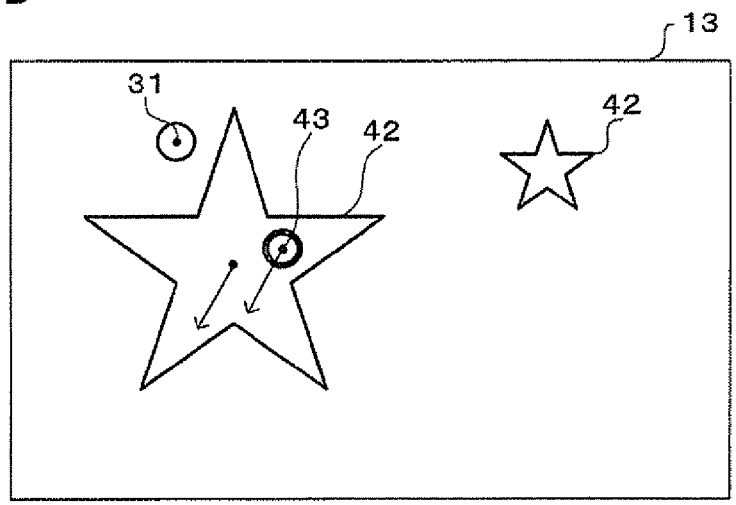
Figure 29C:
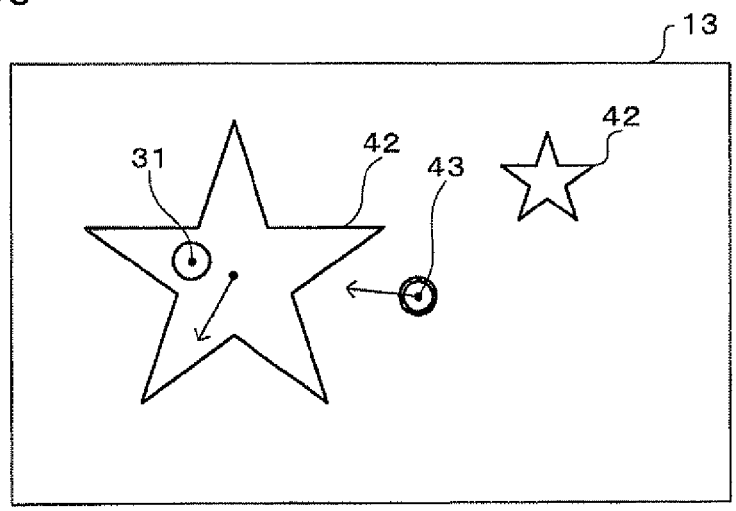

FIGS. 29A to 29C are views illustrative of a method that estimates (predicts) the second coordinate values when a communication delay has occurred. In the example shown in FIG. 29A, the second indication position 43 that has been set in the preceding frame is positioned within the target object 42, the first indication position 31 that has been set in the preceding frame is positioned within the target object 42, and the distance between the first indication position 31 and the second indication position 43 that have been set in the preceding frame is shorter than the first distance. In this case, the player of the second image control device 10-2 may normally operate the controller 16 so that the second indication position 43 approaches the first indication position 31 such that the special mark 50 is displayed, or the special mark 50 is continuously displayed. Therefore, the second coordinate values are calculated to approach the first coordinate values output from the first buffer 160 in the preceding or current frame. Specifically, the second coordinate values are calculated to be coordinate values on the line segment that connects the first coordinate values output from the first buffer 160 in the preceding or current frame and the second coordinate values that have been set as the second indication position 43 in the preceding frame.

In the example shown in FIG. 29B, the second indication position 43 that has been set in the preceding frame is positioned within the target object 42, and the first indication position 31 that has been set in the preceding frame is not positioned within the target object 42. In this case, the player of the second image control device 10-2 may normally operate the controller 16 so that the second indication position 43 is continuously positioned within the target object 42. Therefore, the second coordinate values are calculated to follow the movement of the target object 42 calculated in the preceding or current frame. Specifically, the second coordinate values are calculated based on the moving vector of the target object 42 calculated in the preceding or current frame.

In the example shown in FIG. 29C, the second indication position 43 that has been set in the preceding frame is not positioned within the target object 42. In this case, the player of the second image control device 10-2 may normally operate the controller 16 so that the second indication position 43 is positioned within the target object 42. Therefore, the second coordinate values are calculated to approach the position of the target object 42 calculated in the preceding or current frame. Specifically, the second coordinate values are calculated to be coordinate values on the line segment that connects a representative point of the target object 42 calculated in the preceding or current frame and the second coordinate values that have been set as the second indication position 43 in the preceding frame.

In the example shown in FIG. 29C, two target objects 42 are displayed on the display screen 13. In this case, one of the two target objects 42 is selected based on the priority of each target object 42, and the second coordinate values are calculated based on the representative point of the selected target object 42. The priority may be set based on the position of each target object 42. In this case, the priority is set so that a higher priority is assigned to the target object 42 that is closer to the virtual camera, for example. The priority may be set based on the attribute or the parameter of each target object 42.

The second coordinate values thus estimated and calculated are set as the second indication position 43. When the second coordinate values corresponding to the same reference count value as that of the first coordinate values output from the first buffer 160 are not stored in the second buffer 162 in the subsequent frame, the second coordinate values set as the second indication position are calculated based on the second coordinate values that have been set as the second indication position in the current (preceding) frame. When the second coordinate values corresponding to the same reference count value as that of the first coordinate values output from the first buffer 160 are stored in the second buffer 162 in the subsequent frame, the second coordinate values output from the second buffer 162 are set as the second indication position 43. An image that does not cause inconvenience to the player can thus be displayed even if a communication delay has occurred.

Specifically, the image control device 10 according to this embodiment sets the first designation position based on the first information that changes based on the first operation that designates the position within an image, sets the second designation position based on the second information received from another image control device 10, displays a first gun sight that indicates a first attack position based on the first designation position, displays a second gun sight that indicates a second attack position based on the second designation position, and performs the special display control process that displays an attack effect based on the positional relationship between the first designation position and the second designation position.

More specifically, the image control device 10 according to this embodiment utilizes the first mark 31 as the first gun sight, utilizes the second mark 43 as the second gun sight, and performs the special display control process that displays an attack effect based on the positional relationship between the first indication position (i.e., the position of the first gun sight) and the second indication position (i.e., the position of the second gun sight).

For example, the image control device 10 performs a process that displays a special gun sight (special mark 50) at the special position (e.g., midpoint 49), a process that displays an effect display that imitates lightning to connect the first gun sight and the second gun sight, and an intermediate display process that combines the first gun sight and the second gun sight as a special display control process that implements an attack effect. The image control device 10 also performs a display process that moves the first bullet object 40 toward the special position when the special gun sight is displayed, a display process that moves the second bullet object 48 toward the special position, and a process that causes the first gun object 34 and the second gun object 46 to be aimed at the special position as a special display control process that implements an attack effect.

5. Process According to this Embodiment

Figure 30:
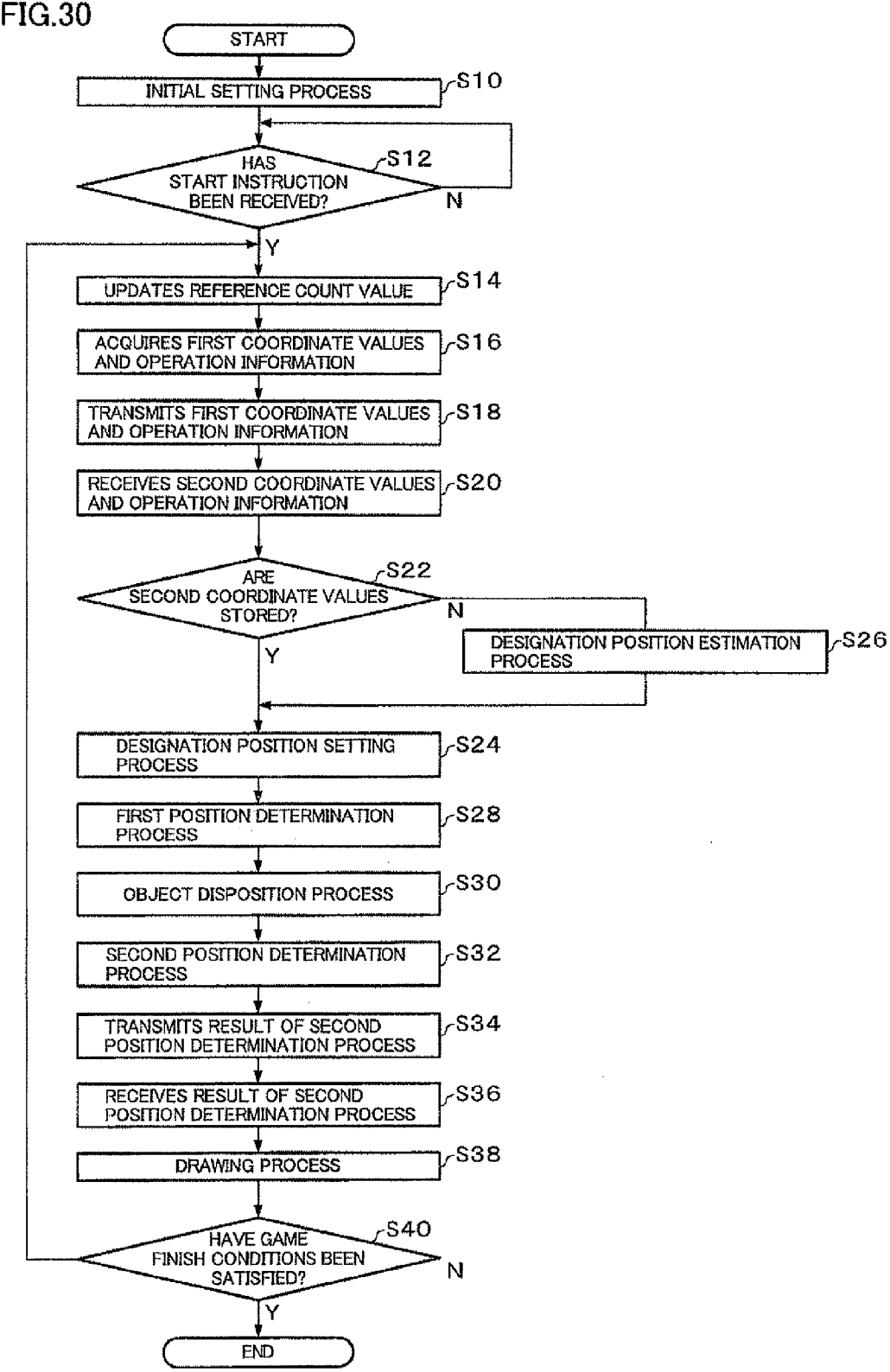
FIG. 30 is a flowchart showing an example of a process performed by the image control device according to the second embodiment of the invention.

An example of the process according to this embodiment is described below using a flowchart shown in FIG. 30. As shown in FIG. 30, the first image control device 10-1 performs the initial setting process (step S10). When the image control device 10 has received a game process start instruction from the server device 4 (Y in step S12), the first image control device 10-1 updates the reference count value of the reference counter (step S14). When the first image control device 10-1 has acquired the first coordinate values, the operation information, and the like based on an operation performed using the controller 16 of the first image control device 10-1 (step S16), the first image control device 10-1 transmits the first coordinate values, the operation information, and the like (step S18), and receives the second coordinate values, the operation information, and the like based on an operation performed using the controller 16 of the second image control device 10-2 (step S20).

The first image control device 10-1 determines whether or not the second coordinate values corresponding to the same reference count value as that of the first coordinate values output from the first buffer 160 are stored in the second buffer 162 (step S22). When the second coordinate values corresponding to the same reference count value as that of the first coordinate values output from the first buffer 160 are stored in the second buffer 162 (Y in step S22), the first image control device 10-1 sets the first coordinate values output from the first buffer 160 as the first indication position 31, and sets the second coordinate values output from the second buffer 162 as the second indication position 43 (step S24).

When the second coordinate values corresponding to the same reference count value as that of the first coordinate values output from the first buffer 160 are stored in the second buffer 162 (N in step S22), the first image control device 10-1 estimates and calculates the second coordinate values (estimation calculation process) (step S26), sets the first coordinate values output from the first buffer 160 as the first indication position 31, and sets the second coordinate values calculated by the estimation calculation process as the second indication position 43 (step S24).

The first image control device 10-1 determines the positional relationship between the first indication position 31 and the second indication position 43 (first position determination process) (step S28), and disposes the object in the object space based on the result of the first position determination process, and the like (object disposition process) (step S30). The first image control device 10-1 then performs the normal position determination process or the special position determination process based on the result of the first position determination process (second position determination process) (step S32), transmits the result of the second position determination process (step S34), and receives the result of the second position determination process performed by the second image control device 10-2 (step S36).

The first image control device 10-1 draws an image of the object space viewed from the virtual camera based on the result of the second position determination process, and the like (step S38). When the game finish conditions have been satisfied (Y in step S40), the first image control device 10-1 finishes the game. When the game finish conditions have not been satisfied (N in step S40), the first image control device 10-1 returns to the step S14.

Figure 31:
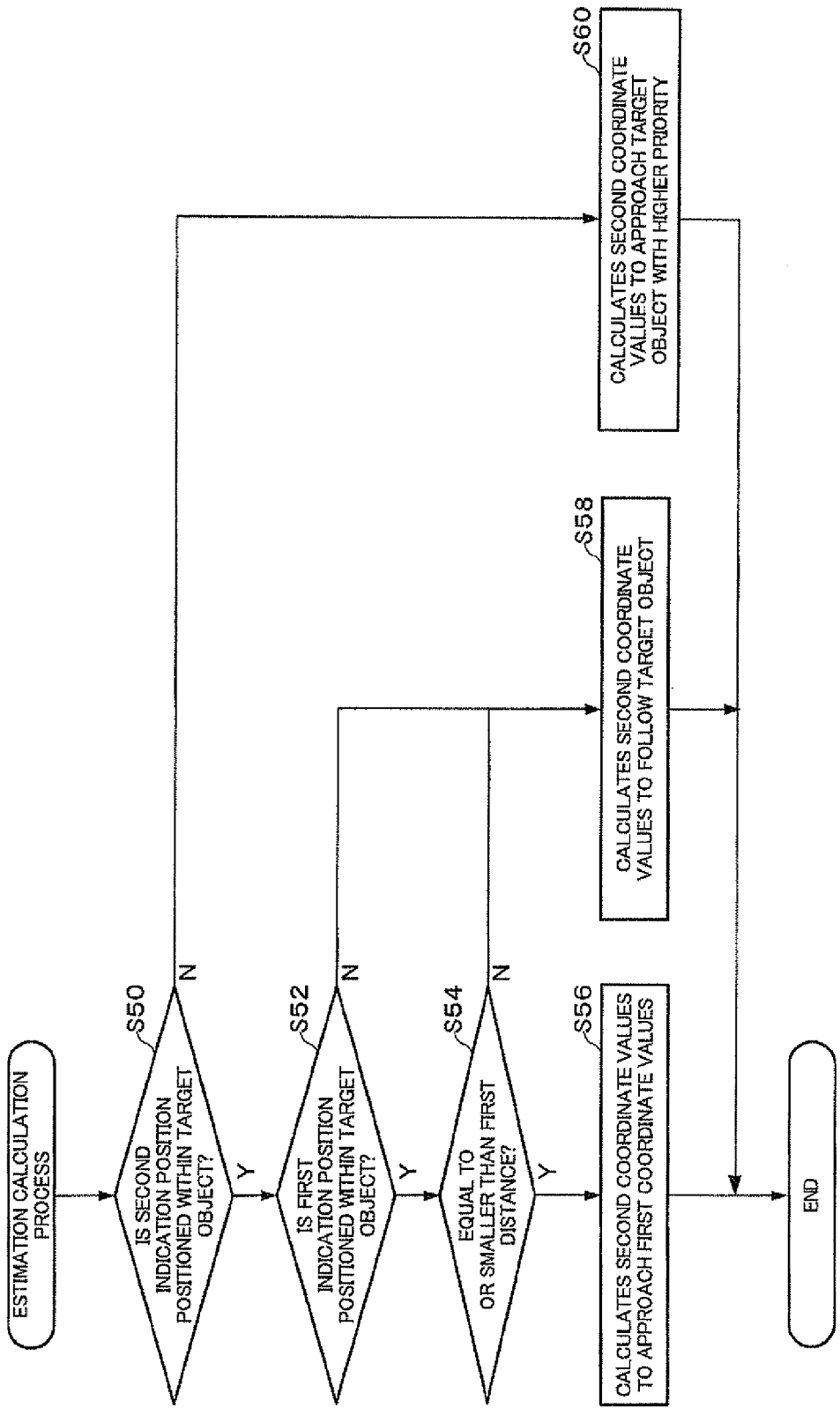
FIG. 31 is a flowchart showing an example of a process performed by the image control device according to the second embodiment of the invention.

The details of the estimation calculation process (step S26 shown in FIG. 30) are described below using a flowchart shown in FIG. 31. As shown in FIG. 31, the first image control device 10-1 refers to the result of the second position determination process on the second indication position 43 in the preceding frame, and determines whether or not the second indication position 43 in the preceding frame is positioned within the target object 42 (step S50). When the second indication position 43 in the preceding frame is positioned within the target object 42 (Y in step S50), the first image control device 10-1 refers to the result of the second position determination process on the first indication position 31 in the preceding frame, and determines whether or not the first indication position 31 in the preceding frame is positioned within the target object 42 (step S52). When the first indication position 31 in the preceding frame is positioned within the target object 42 (Y in step S52), the first image control device 10-1 determines whether or not the result of the first position determination process in the preceding frame is smaller than the first distance (step S54). When the result of the first position determination process in the preceding frame is smaller than the first distance (Y in step S54), the first image control device 10-1 calculates the second coordinate values to approach the first coordinate values in the preceding frame (step S56).

When the second indication position 43 in the preceding frame is positioned within the target object 42 (Y in step S50), the first image control device 10-1 calculates the second coordinate values to follow the target object 42 within which the second indication position 43 is positioned (step S58) when the first indication position 31 in the preceding frame is not positioned within the target object 42 (N in step S52) and the result of the first position determination process in the preceding frame is larger than the first distance (N in step S54).

When the second indication position 43 in the preceding frame is not positioned within the target object 42 (N in step S50), the first image control device 10-1 calculates the second coordinate values to approach the target object with a higher priority (step S60).

The details of the object disposition process (step S30 shown in FIG. 30) are described below using a flowchart shown in FIG. 20. As shown in FIG. 20, when the distance between the first indication position 31 and the second indication position 43 is equal to or shorter than the second distance (Y in step S70), the first image control device 10-1 determines whether or not one second has elapsed after the left button 36 or the right button 38 of the controller 16 of the first image control device 10-1 and the left button 36 or the right button 38 of the controller 16 of the second image control device 10-2 have been pressed for one second (i.e., a running fire operation has started) based on the first count value (step S71). When one second has elapsed after the running fire operation has started (Y in step S71), the first image control device 10-1 determines whether or not the time elapsed after the running fire operation has stopped is within one second based on the second count value (step S72). When the time elapsed after the running fire operation has stopped is within one second (Y in step S72), the first image control device 10-1 disposes the special mark 50 around the special point (the midpoint 49) between the first indication position 31 and the second indication position 43 (step S73), and returns to the step S70.

Even if the distance between the first indication position 31 and the second indication position 43 is not equal to or shorter than the second distance (N in step S70), or the distance between the first indication position 31 and the second indication position 43 is equal to or shorter than the second distance (Y in step S70), the first image control device 10-1 disposes the first mark 32 around the first indication position 31, and disposes the second mark 44 around the second indication position 43 when one second has not elapsed after the running fire operation has started (N in step S71), and the time elapsed after the running fire operation has stopped is not within one second (N in step S72) (step S74). The first image control device 10-1 then determines whether or not the distance between the first indication position 31 and the second indication position 43 is shorter than the first distance (step S76). When the distance between the first indication position 31 and the second indication position 43 is equal to or shorter than the first distance (Y in step S76), the first image control device 10-1 displays the intermediate display around the special point (the midpoint 49) between the first indication position 31 and the second indication position 43 (see FIGS. 17 and 17B) (step S78), and returns to the step S70.

When the distance between the first indication position 31 and the second indication position 43 is not equal to or shorter than the first distance (N in step S76), the first image control device 10-1 determines whether or not the distance between the first indication position 31 and the second indication position 43 is shorter than the zeroth distance (step S80). When the distance between the first indication position 31 and the second indication position 43 is equal to or shorter than the zeroth distance (Y in step S80), the first image control device 10-1 displays the effect display around the special point (the midpoint 49) between the first indication position 31 and the second indication position 43 (see FIGS. 18A and 18B) (step S82), and returns to the step S70.

When the distance between the first indication position 31 and the second indication position 43 is not equal to or shorter than the zeroth distance (N in step S80), the first image control device 10-1 returns to the step S70.

6. Modification

The method described above in connection with the above embodiment is only an example. The scope of the invention also includes a case of employing a method that achieves effects similar to those of the method described above in connection with the above embodiment. The invention is not limited to the above embodiment. Various modifications and variations may be made. Various methods described above in connection with the above embodiment and various methods described below as modifications may be appropriately used in combination as a method that implements the invention.

6-1. First Modification

The above embodiment has been described taking an example that utilizes the controller 16 shown in FIG. 13A that imitates the shape of a machine gun as the operation section 62. Note that an analog stick, an arrow key, a button, a mouse, a trackball, a touch panel display, a housing (operation body or indicator), or a combination thereof may be used as the operation section 62. The positions of the operation section 62 with respect to the display section 60 need not necessarily be fixed. The image control device 10 may be configured so that the position of the operation section 62 with respect to the display section 60 can be arbitrarily changed by the operator.

FIG. 21 is a view showing an example in which a controller 200 that includes a plurality of operating sections is used as the operation section 62 of the first image control device 10-1. In the example shown in FIG. 21, an operation that designates a position within the image is performed by operating the operating section (e.g., analog stick 204 or arrow key 206) that is included in the controller 200 and allows the operator to arbitrarily designate one of a plurality of directions. In this case, the designation operation detection section 64 may be implemented by a pressure sensor that detects an operation signal of the analog stick 204 or the arrow key 206, a plurality of switches, or the like. The designation operation detection section 64 outputs first operation information (i.e., first information) based on the operation performed using the analog stick 204 or the arrow key 206 included in the controller 200.

The controller 200 also includes a button 208 (i.e., first operating section or second operating section) that detects the presence or absence of an operation. The operation information based on an operation performed using the analog stick 204, the arrow key 206, or the button 208 is output to the processing section 100 via wireless or cable communication.

The controller 200 of the second image control device 10-2 may be configured in the same manner as the controller 200 of the first image control device 10-1.

Figure 22:
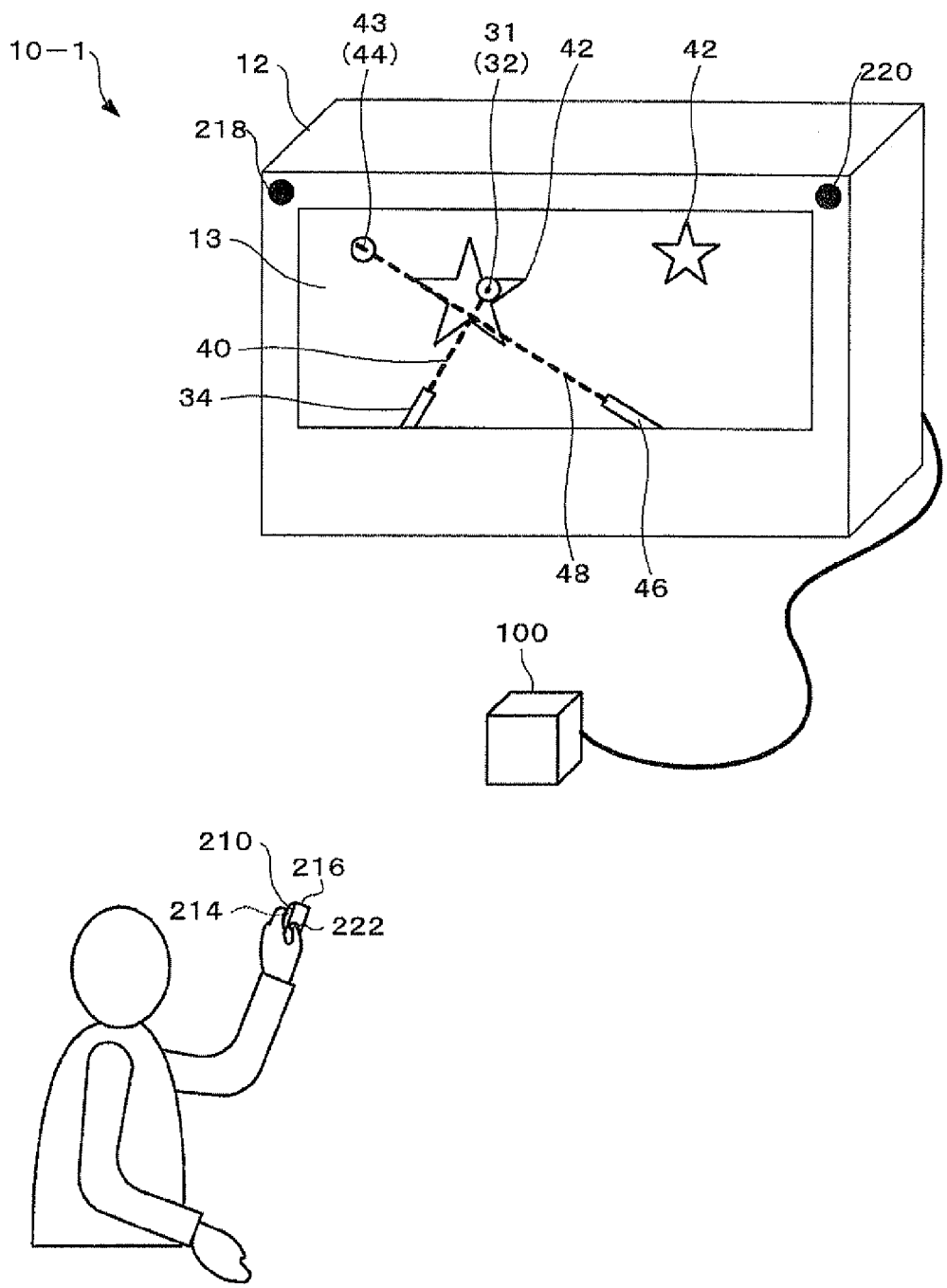
FIG. 22 is a perspective view showing an image control device according to a modification of the second embodiment of the invention.

FIG. 22 is a view showing an example in which a controller 210 (i.e., first indicator) that is held or worn by the player and can be arbitrarily changed in position and direction is used as the operation section 62 of the first image control device 10-1. In the example shown in FIG. 22, an operation that designates a position within the image is performed by changing the direction of the end of the controller 210 by moving the controller 210. In this case, the designation operation detection section 64 may be implemented by an acceleration sensor 214, a camera 216, or the like included in the controller 210.

When using the acceleration sensor 214, the designation operation detection section 64 detects the accelerations of the controller 210 in three orthogonal axial directions, and outputs accelerations (i.e., first information) corresponding to the moving direction, the moving amount, the rotation (tilt) direction, and the rotation amount of the controller 210. When using the camera 216, the designation operation detection section 64 receives infrared light emitted from an infrared LED 218 and an infrared LED 220 provided to have a given positional relationship with the display 12, analyzes the relative positional relationship between the display 12 and the controller 210, and outputs first coordinate values (i.e., first information) of the indication position of the controller 210 on the display screen 13 of the display 12.

The controller 200 also includes a button 222 (i.e., first operating section or second operating section) that detects the presence or absence of an operation. The operation information based on an operation performed using the controller 210 or the button 222 is output to the processing section 100 via wireless or cable communication.

The controller 210 of the second image control device 10-2 may be configured in the same manner as the controller 210 of the first image control device 10-1.

Figure 23:
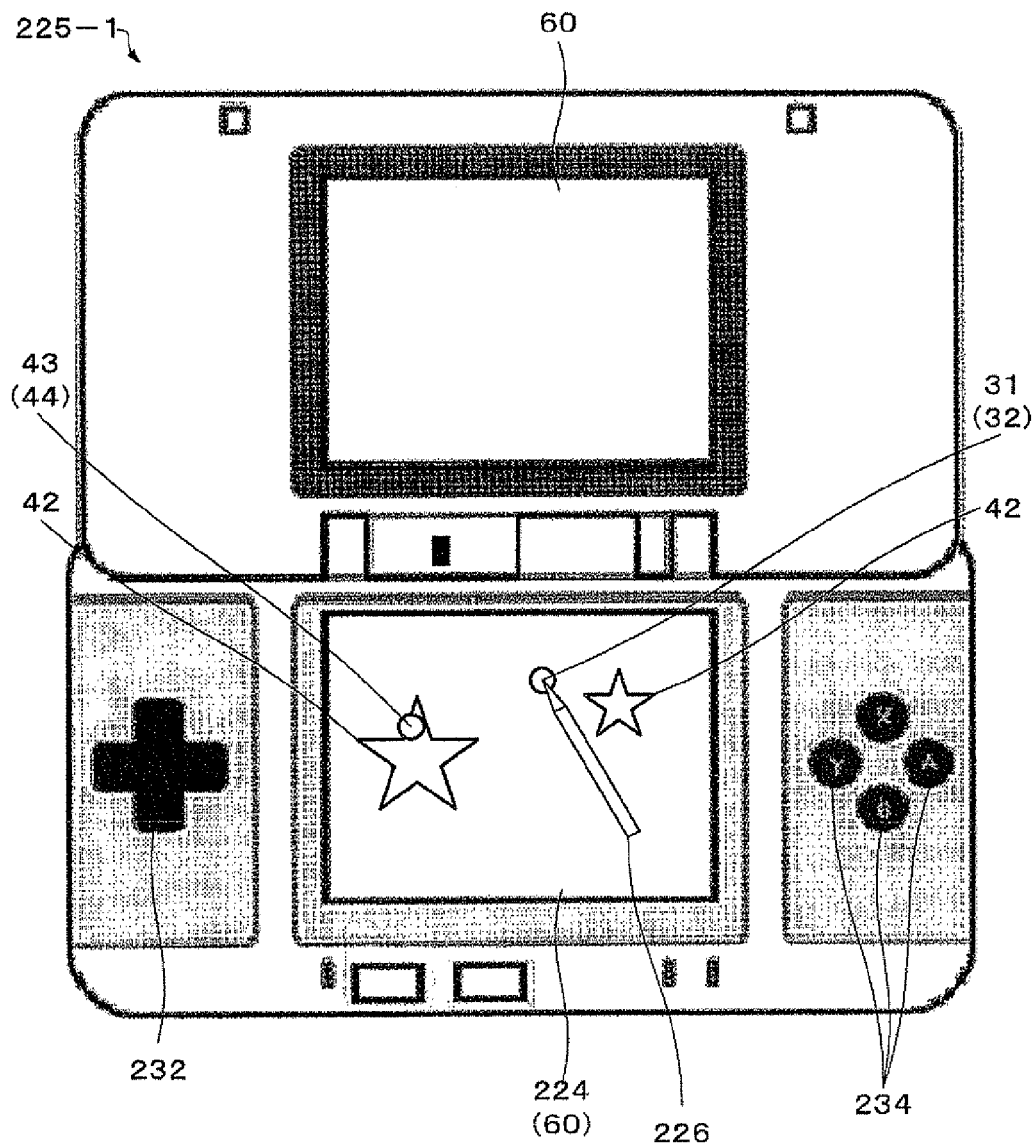
FIG. 23 is a plan view showing an image control device according to a modification of the second embodiment of the invention.

FIG. 23 is a view showing the external configuration of a first image control device 225-1 having the same functions as those of the first image control device 10-1. As shown in FIG. 23, the first image control device 225-1 includes a touch panel display 224 that has a structure in which a liquid crystal display (display section 60) and a touch panel (designation operation detection section) are stacked, and detects the position of a touch operation performed by the player on the display area of the liquid crystal display. When using the first image control device 225-1, a first operation that designates a position within the image may be performed by touching the touch panel display 224 using a touch pen 226. In this case, the designation operation detection section 64 may be implemented by a touch panel. The touch panel is formed using a material having a high light transmittance so that the visibility of an image is maintained even when the touch panel is stacked on the liquid crystal display. The touch panel electrically detects a contact position using a resistive method (e.g., four-wire resistive method or five-wire resistive method), a capacitance method, or the like. The touch panel detects a contact operation using an input instrument (e.g., first touch pen 226) and a contact operation with the fingertip of the player.

The first image control device 225-1 also includes an arrow key 232 that allows the player to arbitrarily designate one of a plurality of directions, and a button 234 (i.e., first operating section or second operating section) that detects the presence or absence of an operation.

The first image control device 225-1 can be carried by the player, and can communicate with another image control device having the same configuration as that of the first image control device 225-1 via a wireless LAN.

6-2. Second Modification

The above embodiment has been described taking an example in which the first designation position setting section 108 sets the first designation position based on the first information that changes based on the first operation that designates a position within the image displayed on the first image control device 10-1, the communication control section 109 causes the communication section to transmit the first information to the destination, and receive the second information that changes based on the second operation that designates a position within the image displayed on the second image control device 10-2, and the second designation position setting section 110 sets the second designation position based on the second information. Note that the communication control section 109 may cause the communication section to receive two or more pieces of information that respectively change based on two or more operations that designate a position within the image using each of two or more image control devices, and the second designation position setting section 110 may set two or more designation positions based on the two or more pieces of information.

For example, the communication control section 109 causes the communication section to communicate with the second image control device 10-2, . . . , and the Nth image control device 10-N, and receive the second coordinate values that change based on the second position designation operation performed using the operation section 62 of the second image control device 10-2, . . . , and the Nth coordinate values that change based on the Nth position designation operation performed using the operation section 62 of the Nth image control device 10-N, and the second designation position setting section 110 sets the second designation position based on the second information, and sets the Nth designation position based on the Nth information. The display control section 102 may perform the normal display control process that displays a first display based on the first designation position, displays a second display based on the second designation position, and displays an Nth display based on the Nth designation position, and may perform the special display control process that displays the special display based on the first designation position, the second designation position, . . . , and the Nth designation position. In this case, the special position calculation section 115 may calculate the center-of-gravity coordinates of three or more designation positions as the special position.

In this case, the image control device may further include a condition determination section that determines whether or not each of the designation positions satisfies a fourth condition, and a counter section that counts the number of designation positions that satisfy the fourth condition. The display control section 102 may control at least one of start and finish of the special display control process and start and finish of the normal display control process based on the number of designation positions that satisfy the fourth condition.

For example, the condition determination section may determine whether or not each of the designation positions has been set, and the counter section may count the number of designation positions that have been set. The display control section 102 may not perform the special display control process even if the positional relationship between two indication positions satisfies a given condition when two designation positions have been set, and may perform the special display control process when the positional relationship between two indication positions satisfies a given condition when three designation positions have been set.

The condition determination section may determine whether or not the positional relationship of each of a plurality of designation positions satisfies the fourth condition, and the counter section may count the number of designation positions for which the positional relationship satisfies the fourth condition. The display control section 102 may not perform the special display control process even if the positional relationship of two indication positions satisfies the fourth condition, and may perform the special display control process when the positional relationship of three designation positions satisfies the fourth condition.

The above embodiment has been described taking an example in which the special position calculation section 115 calculates the coordinates of the midpoint between the first designation position and the second designation position as the special position. Note that the special position is not limited to the coordinates of the midpoint or the center of gravity. A different weighting may set to each of a plurality of designation positions, and the special position may be calculated based on each weighting. For example, a weighting may be set to each designation position based on an attribute or a parameter linked and set to each designation position. Specifically, when an attribute fire is set to the first gun object 34, and an attribute water is set to the second gun object 46, the special position calculation section 115 may calculate a position that is closer to the second indication position 43 than the first indication position 31 as the special position from the coordinates of the line segment that connects the first indication position 31 and the second indication position 43.

6-3. Third Modification

The above embodiment has been described taking an example in which the first operation is performed using one operation section 62 of the first image control device 10-1, and the second operation is performed using one operation section 62 of the second image control device 10-2. Note that a plurality of operation sections 62 may be provided in the first image control device 10-1 or the second image control device 10-2, and a plurality of operations that designate a position within the image may be performed using one image control device 10. In this case, the first designation position setting section 108 sets a plurality of designation positions respectively based on a plurality of pieces of information that change based on a plurality of operations that designate a position within the image.

6-4. Fourth Modification

Various conditions may be set as the start condition or the finish condition of the special display control process, or the start condition or the finish condition of the normal display control process.

For example, when the distance between the first mark 32 and the second mark 44 is equal to or shorter than the second distance, one special mark 50 may be continuously displayed irrespective of whether or not the left button 36 or the right button 38 of the controller 16 of the first image control device 10-1 and the left button 36 or the right button 38 of the controller 16 of the second image control device 10-2 have been pressed.

The above embodiment has been described taking an example in which the first mark 32 and the second mark 44 are displayed instead of the special mark 50 when the distance between the first indication position 31 and the second indication position 43 has become longer than the second distance. Note that the special mark 50 may be continuously displayed until a given period (e.g., 2 sec) has elapsed after the distance between the first indication position 31 and the second indication position 43 has become longer than the second distance. In this case, the counter section 114 starts to count the third count value on condition that a transition has occurred from a state in which the distance between the first indication position 31 and the second indication position 43 is equal to or shorter than the second distance to a state in which the distance between the first indication position 31 and the second indication position 43 is longer than the second distance. The counter section 114 resets the third count value when the distance between the first indication position 31 and the second indication position 43 has become equal to or shorter than the second distance before the third count value reaches a given value (e.g., a count value corresponding to 2 sec). When the third count value has reached a given value in a state in which the distance between the first indication position 31 and the second indication position 43 has become equal to or shorter than the second distance, the display control section 102 displays the first mark 32 and the second mark 44 instead of the special mark 50 (i.e., special display control process).

The display control section 102 controls at least one of start and finish of the special display control process and start and finish of the normal display control process based on the positional relationship between the first designation position and the second designation position. The display control section 102 may control at least one of start and finish of the special display control process and start and finish of the normal display control process based on whether or not a given time has elapsed.

The image control device may further include an event determination section that determines whether or not a given event has occurred, and the display control section 102 may control at least one of start and finish of the special display control process and start and finish of the normal display control process based on occurrence of a given event. For example, the display control section 102 may perform the special display control process when a given item has been acquired, or a given character has appeared.

The image control device may further include an attribute setting section that links one of a plurality of attributes to each of the first designation position and the second designation position. The display control section 102 may control at least one of start and finish of the special display control process and start and finish of the normal display control process based on the combination of the attributes linked to the first designation position and the second designation position.

For example, when an attribute fire is set to the first gun object 34, and an attribute water is set to the second gun object 46, the display control section 102 may not perform the special display control process, or may terminate the special display control process and perform the normal display control process even if the positional relationship between the first designation position and the second designation position satisfies a given condition. When an attribute fire is set to the first gun object 34, and an attribute fire is also set to the second gun object 46, the display control section 102 may terminate the special display control process and perform the normal display control process even if the positional relationship between the first designation position and the second designation position does not satisfy a given condition.

The display control section 102 may perform the special display control process when the first condition is satisfied, and may perform the normal display control process when the second condition is satisfied. If the second condition is set to be easily satisfied as compared with the first condition, the special display control process does not easily continue. If the first condition is set to be easily satisfied as compared with the second condition, the special display control process easily starts. Whether or not the condition is easily satisfied may be adjusted by changing the range within which the positional relationship satisfies the condition, the time required to satisfy the condition, the event occurrence frequency, the number of designation positions that should satisfy the fourth condition, or the number or combination of the conditions.

6-5. Fifth Modification

The above embodiment has been described taking an example in which the second position determination section 116 determines the positional relationship between the target object 42 and the first designation position based on the fourth range, and determines the positional relationship between the target object 42 and the second designation position based on the fourth range. Note that the image control device may further include an attribute setting section that links one of a plurality of attributes to each of the first designation position and the second designation position, and a range change section that changes the fourth range based on the combination of the attributes linked to the first designation position and the second designation position.

For example, the range change section may change the fourth range so that the fourth range increases when an attribute fire is set to the first gun object 34 and an attribute fire is also set to the second gun object 46 as compared with the case where an attribute fire is set to the first gun object 34 and an attribute water is set to the second gun object 46.

When an attribute fire is set to the first gun object 34, and an attribute water is set to the second gun object 46, the range change section may change the fourth range so that the fourth range is smaller than the third range used when the normal display control process is performed. When an attribute fire is set to the first gun object 34, and an attribute fire is also set to the second gun object 46, the range change section may change the fourth range so that the fourth range is larger than the third range used when the normal display control process is performed.

According to this configuration, the degree to which the first bullet object 40 or the second bullet object 48 hits the target object 42 can be changed depending on the combination of the attributes, for example.

Note that the range change section may change the fourth range without changing the third range, or may change the third range and the fourth range based on the combination of the attributes linked to the first designation position and the second designation position.

6-6. Sixth Modification

The above embodiment has been described taking an example in which the update section 118 updates a given parameter with the first update parameter when the normal display control process is performed, and updates a given parameter with the second update parameter when the special display control process is performed. Note that the image control device may further include an attribute setting section that links one of a plurality of attributes to each of the first designation position and the second designation position, and an update parameter change section that changes at least one of the first update parameter and the second update parameter based on the combination of the attributes linked to the first designation position and the second designation position.

For example, the update parameter change section may change the first update parameter or the second update parameter so that the update amount or the update rate of the first update parameter or the second update parameter increases when an attribute fire is set to the first gun object 34 and an attribute fire is set to the second gun object 46 as compared with the case where an attribute fire is set to the first gun object 34 and an attribute water is set to the second gun object 46.

When an attribute fire is set to the first gun object 34, and an attribute water is set to the second gun object 46, the update parameter change section may change the second update parameter so that the update amount or the update rate of the second update parameter is smaller than that of the first update parameter. When an attribute fire is set to the first gun object 34, and an attribute fire is also set to the second gun object 46, the update parameter change section may change the second update parameter so that the update amount or the update rate of the second update parameter is larger than that of the first update parameter. According to this configuration, the degree to which the target object 42 is destroyed when the special display control process is performed can be changed depending on the combination of the attributes, for example.

Note that the update parameter change section may change the second update parameter without changing the first update parameter based on the combination of the attributes linked to the first designation position and the second designation position.

The above embodiment has been described taking an example in which the destruction parameter of the target object 42 is updated as the given parameter. Note that the update section 118 may update a remaining bullet parameter (the first gun object 34 or the second gun object 46 cannot fire a bullet when the remaining bullet parameter has reached a given value), or may update a destruction parameter (the first gun object 34 or the second gun object 46 is destroyed when the destruction parameter has reached a given value), for example.

6-7. Seventh Modification

The image control device may further include an attribute setting section that links one of a plurality of attributes to each of the first designation position and the second designation position, and the display control section 102 may control the image based on the combination of the attributes linked to the first designation position and the second designation position.

For example, the display control section 102 may increase the size of the bullet mark display 126 or the destruction display when an attribute fire is set to the first gun object 34 and an attribute fire is also set to the second gun object 46 as compared with the case where an attribute fire is set to the first gun object 34 and an attribute water is set to the second gun object 46.

The display control section 102 may control the image irrespective of the combination of the attributes linked to the first designation position and the second designation position when the normal display control process is performed, and may control the image based on the combination of the attributes linked to the first designation position and the second designation position when the special display control process is performed.

6-8. Eighth Modification

The above embodiment has been described taking an example in which the display control section 102 displays the first mark 32, the first gun object 34, the first bullet object 40, the bullet mark display 126, and the like based on the first designation position, and displays the second mark 44, the second gun object 46, the second bullet object 48, the bullet mark display 126, and the like based on the second designation position as the normal display control process. Note that the display control section 102 may display at least one of these displays based on the first designation position and the second designation position. Specifically, the display control section 102 may perform at least one of a process that displays a first designation position display that indicates the position designated by the first operation based on the first designation position, and displays a second designation position display that indicates the position designated by the second operation based on the second designation position, a process that displays a first moving path display that indicates the moving path of the first moving object based on the first designation position, and displays a second moving path display that indicates the moving path of the second moving object based on the second designation position, and a process that displays a first movement result display that indicates the movement result of the first moving object based on the first designation position, and displays a second movement result display that indicates the movement result of the second moving object based on the second designation position, as the normal display control process.

The first moving path display may be displayed from the muzzle of the first gun object 34 to the first designation position, and the second moving path display may be displayed from the muzzle of the second gun object 46 to the second designation position. The first moving path display may be displayed from the muzzle of the first gun object 34 to the intersection point of the object, and the second moving path display may be displayed from the muzzle of the second gun object 46 to the intersection point of the object.

6-9. Ninth Modification

The above embodiment has been described taking an example in which the display control section 102 displays the special mark 50, the first gun object 34, the second gun object 46, the first bullet object 40, the second bullet object 48, and the bullet mark display 126 based on the midpoint 49 as the special display control process. Note that the display control section 102 may display at least one of these displays based on the special position. Specifically, the display control section 102 may perform at least one of a process that displays a special position display that indicates the positions designated by the first operation and the second operation based on the special position, a process that displays a first moving path display that indicates the moving path of the first moving object and a second moving path display that indicates the moving path of the second moving object based on the special position, and a process that displays a special movement result display that indicates the movement result of the first moving object and the movement result of the second moving object based on the special position, as the special display control process.

For example, the display control section 102 may display the first gun object 34, the first bullet object 40, and the bullet mark display 126 based on the first indication position 31, and may display the second gun object 46, the second bullet object 48, and the bullet mark display 126 based on the second indication position 43 even if the special mark 50 is displayed based on the midpoint 49.

6-10. Tenth Modification

The above embodiment has been described taking an example in which the second position determination section 116 performs the normal position determination process that determines the positional relationship between the target object 42 and the first designation position, and determines the positional relationship between the target object 42 and the second designation position when the first mark 32 and the second mark 44 are displayed, and performs the special position determination process that determines the positional relationship between the target object 42 and the special position when the special mark 50 is displayed. Note that the second position determination section 116 may determine the positional relationship between the target object 42 and the first designation position, and determine the positional relationship between the target object 42 and the second designation position even when the special mark 50 is displayed.

6-11. Eleventh Modification

The virtual camera control section 124 may control at least one of the position, the direction, and the angle of view of the virtual camera when a transition has occurred between the normal display control process and the special display control process. For example, the virtual camera control section 124 may move the position or the direction of the virtual camera when the special display control process starts or ends, or the normal display control process starts or ends. The virtual camera control section 124 may move the virtual camera closer to the display object that overlaps the special position, or zoom the virtual camera when the special display control process starts, and may return the virtual camera to a reference position or return the angle of view of the virtual camera to a reference value when the normal display control process starts.

6-12. Twelfth Modification

The above embodiment has been described taking an example in which the special position calculation section 115 calculates the special position based on the first designation position and the second designation position, and the display control section 102 controls the image based on the special position when performing the special display control process. Note that the display control section 102 may perform the normal display control process that controls the image based on the first designation position independently of the second designation position, and controls the image based on the second designation position independently of the first designation position when the positional relationship between the first designation position and the second designation position is outside a given range, and may perform the special display control process that controls the image based on at least one of the first designation position and the second designation position when the positional relationship between the first designation position and the second designation position is within a given range.

For example, the display control section 102 may perform the special display control process that displays the special mark 50 around a position corresponding to the first designation position or the second designation position instead of displaying the special mark 50 around a position corresponding to the midpoint between the first designation position and the second designation position.

6-13. Thirteenth Modification

Figure 24A:
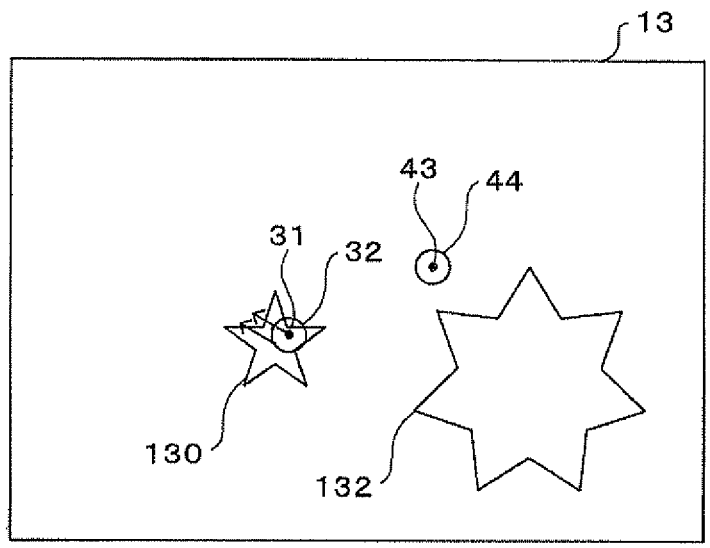

The above embodiment has been described taking an example of executing a game in which the target object 42 can be destroyed when the first operating section provided in the operation section 62 of the first image control device 10-1 has been operated in a state in which the target object 42 overlaps the first mark 32 (i.e., the positional relationship between the display object and the first designation position satisfies the third condition), or when the second operating section provided in the operation section 62 of the second image control device 10-2 has been operated in a state in which the target object 42 overlaps the second mark 44 (i.e., the positional relationship between the display object and the second designation position satisfies the third condition). As shown in FIG. 24A, a first object 130 may be moved to follow the movement of the first mark 32 or the second mark 44, or the moving target object 42 may be stopped when the first operating section provided in the operation section 62 of the first image control device 10-1 is continuously operated in a state in which the first object 130 (i.e., first display object) overlaps the first mark 32 (i.e., the positional relationship between the display object and the first designation position satisfies the third condition), or when the second operating section provided in the operation section 62 of the second image control device 10-2 is continuously operated in a state in which the first object 130 overlaps the second mark 44 (i.e., the positional relationship between the display object and the second designation position satisfies the third condition).

In this example, the display control section 102 performs a normal movement control process (i.e., normal display control process) that controls the movement of the first object 130 (i.e., first display object) (i.e., controls the image) based on the first designation position independently of the second designation position, and controls the movement of the first object 130 (i.e., controls the image) based on the second designation position independently of the first designation position. The display control section 102 performs a special movement control process (i.e., special display control process) that controls the movement of the first object 130 (i.e., controls the image) based on the positional relationship between the first object 130 and the first designation position and the positional relationship between the first object 130 and the second designation position based on a given condition.

In this example, a relatively small first object 130 and a relatively large second object 132 (i.e., second display object) are displayed, as shown in FIG. 24A. A relatively small weight parameter is set to the first object 130, and a relatively large weight parameter is set to the second object 132. The display control section 102 moves the first object 130 to follow the movement of the first mark 32 when the first operating section provided in the operation section 62 of the first image control device 10-1 is continuously operated in a state in which the first object 130 overlaps the first mark 32. Alternatively, the display control section 102 moves the second object 132 to follow the movement of the second mark 44 (i.e., performs the normal display control process) when the second operating section provided in the operation section 62 of the second image control device 10-2 is continuously operated in a state in which the first object 130 overlaps the second mark 44.

However, the display control section 102 does not move the second object 132 to follow the movement of the first mark 32 even when the first operating section provided in the operation section 62 of the first image control device 10-1 is continuously operated in a state in which the second object 132 overlaps the first mark 32. The display control section 102 does not move the second object 132 to follow the movement of the second mark 44 (i.e., does not perform the normal display control process) even when the second operating section provided in the operation section 62 of the second image control device 10-2 is continuously operated in a state in which the second object 132 overlaps the second mark 44.

Figure 24B:
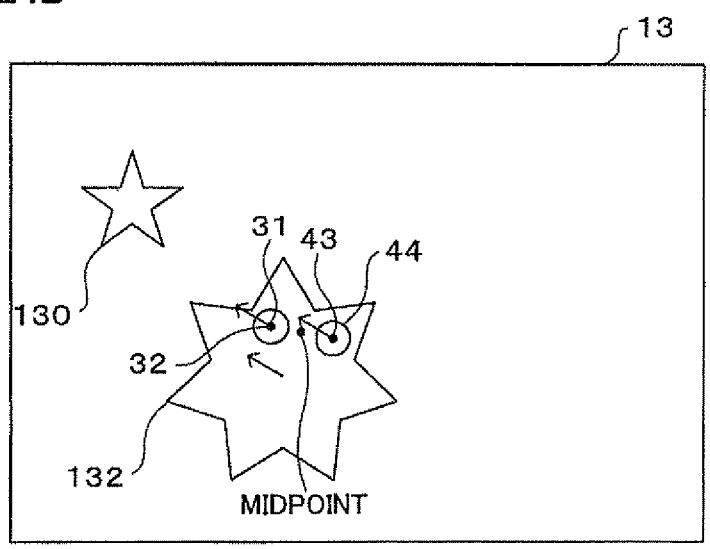

As shown in FIG. 24B, the display control section 102 moves the second object 132 to follow the movement of at least one of the first mark 32 and the second mark 44 (i.e., performs the special display control process) when the first operating section provided in the operation section 62 of the first image control device 10-1 is continuously operated in a state in which the second object 132 overlaps the first mark 32, and the second operating section provided in the operation section 62 of the second image control device 10-2 is continuously operated in a state in which the second object 132 overlaps the second mark 44.

In this case, the second position determination section 116 determines whether or not the positional relationship between the first object 130 and the first designation position satisfies the third condition, determines whether or not the positional relationship between the second object 132 and the first designation position satisfies the third condition, determines whether or not the positional relationship between the first object 130 and the second designation position satisfies the third condition, and determines whether or not the positional relationship between the second object 132 and the second designation position satisfies the third condition. The display control section 102 performs the normal display control process that moves the first object 130 based on the first designation position when the positional relationship between the first object 130 and the first designation position satisfies the third condition independently of the positional relationship between the first object 130 and the second designation position, and performs the normal display control process that moves the first object 130 based on the second designation position when the positional relationship between the first object 130 and the second designation position satisfies the third condition independently of the positional relationship between the first object 130 and the first designation position.

The display control section 102 does not move the second object 132 based on the first designation position when the positional relationship between the second object 132 and the second designation position does not satisfy the third condition even when the positional relationship between the second object 132 and the first designation position satisfies the third condition, and does not move the second object 132 based on the second designation position when the positional relationship between the second object 132 and the first designation position does not satisfy the third condition even when the positional relationship between the second object 132 and the second designation position satisfies the third condition. The display control section 102 performs the special display control process that moves the second object 132 based on at least one of the first designation position and the second designation position when the positional relationship between the second object 132 and the first designation position and the positional relationship between the second object 132 and the second designation position satisfy the third condition.

When the display control section 102 performs the special movement control process, the display control section 102 may move the second object 132 based on the resultant vector of the moving vector of the first designation position and the moving vector of the second designation position, or may move the second object 132 to follow the midpoint (i.e., special position) between the first designation position and the second designation position when moving the second object 132 based on the first designation position and the second designation position.

The display control section 102 performs the special display control process that moves the first object 130 based on at least one of the first designation position and the second designation position when the positional relationship between the first object 130 and the first designation position and the positional relationship between the first object 130 and the second designation position satisfy the third condition.

6-14. Fourteenth Modification

The above embodiment has been described taking an example in which the first mark 32, the second mark 44, the special mark 50, and the like are expressed using two-dimensional image data, and the first gun object 34, the first bullet object 40, the target object 46, and the like are expressed using three-dimensional image data. Note that the first mark 32, the second mark 44, the special mark 50, and the like may be expressed using three-dimensional image data, and the first gun object 34, the first bullet object 40, the target object 46, and the like may be expressed using two-dimensional image data. The first mark 32, the second mark 44, the special mark 50, the first gun object 34, the first bullet object 40, and the target object 46 may be expressed using two-dimensional image data or three-dimensional image data.

The positional relationship between various displays may be determined in the two-dimensional space or the three-dimensional space. The positional relationship between various displays may be determined by converting two-dimensional data into three-dimensional data, or converting three-dimensional data into two-dimensional data, if necessary.

For example, the image control device 10 calculates the first indication position (i.e., first designation position) and the second indication position (i.e., second designation position) in the three-dimensional space, and controls the image based on the first indication position and the second indication position.

Specifically, the image control device 10 calculates the three-dimensional first indication position, disposes the first mark at the calculated three-dimensional first indication position, and controls the direction of the first mark so that the direction of the first mark is necessarily normal to the virtual camera. The image control device 10 generates an image of the three-dimensional space viewed from the virtual camera, and displays the generated image (i.e., normal display control process).

For example, the image control device 10 converts the coordinate values of the two-dimensional first indication position 31 into three-dimensional coordinate values to determine the three-dimensional first indication position. Specifically, the image control device 10 determines the three-dimensional first indication position as follows.

The image control device 10 calculates (x1, y1) of the three-dimensional first indication position (x1, y1, z1) in the three-dimensional space based on the two-dimensional first indication position 31. The image control device 10 sets the value z1 of the three-dimensional first indication position to a value at a given distance from the previous position with respect to the viewpoint position of the virtual camera. Specifically, the image control device 10 sets the value z1 of the three-dimensional first indication position to a given depth value ZP in the virtual camera coordinate system.

Note that the image control device 10 may determine a plurality of given depth values in advance based on the viewpoint position of the virtual camera, and may set the value z1 of the three-dimensional first indication position to one of the given depth values.

The image control device 10 may set the three-dimensional first indication position so that the first indication position is necessarily disposed at a position closer to the virtual camera than other objects. For example, when another object is disposed at the first indication position, the image control device 10 sets the three-dimensional first indication position at a position that is located within a given range around the other object so that the first mark is closer to the virtual camera than the other object.

For example, the image control device 10 sets the depth value of the intersection point of a ray (first straight line L1) that passes through the position of the virtual camera and the three-dimensional first indication position and the other object (or the hit determination volume of the other object) to be the depth value (value z1) of the three-dimensional first indication position. When the ray (first straight line L1) that passes through the position of the virtual camera and the three-dimensional first indication position does not intersect the other object, the image control device 10 sets the depth value (value z1) of the three-dimensional first indication position to a default value (e.g., ZP).

The image control device 10 calculates the three-dimensional second indication position, disposes the second mark at the calculated three-dimensional second indication position, and controls the direction of the second mark so that the direction of the second mark is necessarily normal to the virtual camera. The image control device 10 generates an image of the three-dimensional space viewed from the virtual camera, and displays the generated image (i.e., normal display control process).

For example, the image control device 10 converts the coordinate values of the two-dimensional second indication position 43 into three-dimensional coordinate values to determine the three-dimensional second indication position. Specifically, the image control device 10 determines the three-dimensional second indication position as follows.

The image control device 10 calculates (x2, y2) of the three-dimensional second indication position (x2, y2, z2) in the three-dimensional space based on the two-dimensional second indication position 43. The image control device 10 sets the value z2 of the three-dimensional second indication position to a value at a given distance from the previous position with respect to the viewpoint position of the virtual camera. Specifically, the image control device 10 sets the value z2 of the three-dimensional second indication position to a given depth value ZP in the virtual camera coordinate system.

Note that the image control device 10 may determine a plurality of given depth values in advance based on the viewpoint position of the virtual camera, and may set the value z2 of the three-dimensional second indication position to one of the given depth values.

The image control device 10 may set the three-dimensional second indication position so that the second indication position is necessarily disposed at a position closer to the virtual camera than other objects. For example, when another object is disposed at the second indication position, the image control device 10 sets the three-dimensional second indication position at a position that is located within a given range around the other object so that the second mark is closer to the virtual camera than the other object.

For example, the image control device 10 sets the depth value of the intersection point of a ray (second straight line L2) that passes through the position of the virtual camera and the three-dimensional second indication position and the other object (or the hit determination volume of the other object) to be the depth value (value z2) of the three-dimensional second indication position. When the ray (second straight line L2) that passes through the position of the virtual camera and the three-dimensional second indication position does not intersect the other object, the image control device 10 sets the depth value (value z2) of the three-dimensional second indication position to a default value (e.g., ZP).

The image control section 10 calculates the three-dimensional special position based on the three-dimensional first indication position and the three-dimensional second indication position based on a given condition.

For example, the image control section 10 determines that a given condition is satisfied when the distance between the three-dimensional first indication position and the three-dimensional second indication position in the three-dimensional space is shorter than a given distance. The image control section 10 may determine that a given condition is satisfied when the three-dimensional first indication position and the three-dimensional second indication position indicate an identical object. Specifically, the image control section 10 may determine that a given condition is satisfied when an object that intersects the ray (first straight line L1) that passes through the position of the virtual camera and the three-dimensional first indication position is the same as an object that intersects the ray (second straight line L2) that passes through the position of the virtual camera and the three-dimensional second indication position.

The image control section 10 calculates the three-dimensional special position as follows.

The image control section 10 may calculate the midpoint between the three-dimensional first indication position and the three-dimensional second indication position as the special position.

The image control device 10 calculates the two-dimensional midpoint 49 based on the two-dimensional first indication position 31 and the two-dimensional second indication position 43. The image control section 10 may convert the coordinate values of the two-dimensional midpoint 49 into three-dimensional coordinate values, and may set the three-dimensional coordinate values to be the special position. In this case, the image control device 10 may set the value z3 of the three-dimensional special position (x3, y3, z3) to a value at a given distance from the previous position with respect to the viewpoint position of the virtual camera. Specifically, the image control device 10 sets the value z3 of the three-dimensional first indication position to a given depth value ZP in the virtual camera coordinate system.

The image control device 10 may correct the three-dimensional special position. For example, the image control device 10 may correct the value z3 of the three-dimensional special position to the value z1 of the three-dimensional first indication position or the value z2 of the three-dimensional second indication position.

The image control device 10 may correct the special position so that the special position is necessarily disposed at a position closer to the virtual camera than other objects. For example, when another object is disposed at the special position, the image control device 10 may correct the special position to a position that is located within a given range around the other object so that the special mark is closer to the virtual camera than the other object.

When the three-dimensional first indication position and the three-dimensional second indication position indicate an identical object, the image control section 10 may set the special position around the identical object. Specifically, when an object that intersects the ray (first straight line L1) that passes through the position of the virtual camera and the three-dimensional first indication position is the same as an object that intersects the ray (second straight line L2) that passes through the position of the virtual camera and the three-dimensional second indication position, the image control section 10 sets a position that is located within a given range around the object at a position closer to the virtual camera than the object to be the three-dimensional special position.

The image control device 10 disposes the special mark at the calculated three-dimensional special position, and controls the direction of the special mark so that the direction of the special mark is necessarily normal to the virtual camera. The image control device 10 generates an image of the three-dimensional space (in which the special mark is disposed) viewed from the virtual camera, and displays the generated image (i.e., special display control process).

When the distance between the three-dimensional first indication position and the three-dimensional second indication position is longer than the first distance (i.e., outside the first range), the image control device 10 disposes the first mark at the three-dimensional first indication position, and disposes the second mark at the three-dimensional second indication position. The image control device 10 generates an image of the three-dimensional space (in which the first mark and the second mark are disposed) viewed from the virtual camera, and displays the generated image (i.e., normal display control process).

When the distance between the three-dimensional first indication position and the three-dimensional second indication position is longer than the second distance and is equal to or shorter than the first distance (i.e., within the first range and outside the second range), the image control device 10 may dispose an intermediate object that connects the first mark disposed at the three-dimensional first indication position and the second mark disposed at the three-dimensional second indication position. The image control device 10 generates an image of the three-dimensional space (in which the first mark, the second mark, and the intermediate object are disposed) viewed from the virtual camera, and displays the generated image (i.e., special display control process).

When the left button 36 or the right button 38 of the first controller 16 of the first image control device 10-1 and the left button 36 or the right button 38 of the first controller 16 of the second image control device 10-2 have been pressed for one second (i.e., a given time has elapsed) in a state in which the distance between the three-dimensional first indication position and the three-dimensional second indication position is equal to or shorter than the second distance (i.e., within the second range) due to a further decrease in the distance between the three-dimensional first indication position and the three-dimensional second indication position, the image control device 10 may dispose the special mark (i.e., special position display) at the special position calculated based on the three-dimensional first indication position and the three-dimensional second indication position instead of the first mark and the second mark, and may control the direction of the special mark so that the direction of the special mark is necessarily normal to the virtual camera. The image control device 10 may then generate an image of the three-dimensional space (in which the special mark is disposed) viewed from the virtual camera, and display the generated image (i.e., special display control process) (i.e., the normal display control process or the special display control process is selectively performed). The second distance is included within the size (three-dimensional range) of the target object 42. The special mark has such a size (three-dimensional range) that the special mark can include the three-dimensional first indication position and the three-dimensional second indication position. The special mark thus indicates the position indicated by the first controller 16 of the first image control device 10-1 and the first controller 16 of the second image control device 10-2. The image of the special mark is generated by mapping a special mark texture having a color distribution that indicates the special mark onto a transparent polygon that is disposed at the special position in the three-dimensional space.

When the distance between the three-dimensional first indication position and the three-dimensional second indication position has exceeded the second distance, or when the left button 36 or the right button 38 of the first controller 16 of the first image control device 10-1 and the left button 36 or the right button 38 of the first controller 16 of the second image control device 10-2 have not been pressed for one second, the image control device 10 disposes the first mark at the three-dimensional first indication position instead of the special mark, and disposes the second mark at the three-dimensional second indication position.

When disposing the special mark at the special position in the three-dimensional space, and generating an image, the first bullet object fired from the first gun object 34 moves toward the three-dimensional special position instead of the three-dimensional first indication position (i.e., special display control process), and the second bullet object fired from the second gun object 46 moves toward the three-dimensional special position instead of the three-dimensional second indication position (i.e., special display control process). When the special mark is displayed, the first gun object 34 and the second gun object 46 are controlled to aim at the special position (i.e., special display control process).

When the image control device 10 disposes the special mark at the three-dimensional special position, and generates an image, the image control device 10 may determine whether or not the three-dimensional target object overlaps the special position by determining the positional relationship between the three-dimensional target object and the special position (i.e., special position determination process).

The image control device 10 sets the hit determination volume to the target object 42 in order to determine whether or not the first bullet object 40 or the second bullet object 48 has hit the target object 42 in the three-dimensional space. In this case, a second hit determination volume (i.e., fourth range) used when the special mark 50 is disposed may be larger than a first hit determination volume (i.e., third range) used when the special mark is not disposed.

The first image control device 10-1 generates an image viewed from the virtual camera based on the virtual camera control section 124 of the first image control device 10-1, and the second image control device 10-2 generates an image viewed from the virtual camera based on the virtual camera control section 124 of the second image control device 10-2. Specifically, the first image control device 10-1 sets the first designation position, the direction of the first mark, the second designation position, the direction of the second mark, the special position, and the direction of the special mark in the three-dimensional space based on the virtual camera of the first image control device 10-1. The second image control device 10-2 sets the first designation position, the direction of the first mark, the second designation position, the direction of the second mark, the special position, and the direction of the special mark in the three-dimensional space based on the virtual camera of the second image control device 10-2.

6-15. Fifteenth Modification

The above embodiment has been described taking an example in which the display object controlled based on an operation performed using the operation section 62 of the first image control device 10-1 differs in color from the display object controlled based on an operation performed using the operation section 62 of the second image control device 10-2. Note that it may be possible to allow the player to distinguish an operation performed using the operation section 62 of the first image control device 10-1 from an operation performed using the operation section 62 of the second image control device 10-2 by causing an effect sound output based on an operation performed using the operation section 62 of the first image control device 10-1 to differ from an effect sound output based on an operation performed using the operation section 62 of the second image control device 10-2.

6-16. Sixteenth Modification

The above embodiment has been described taking an example in which the second position determination section 116 determines whether or not the first straight line or the second straight line intersects the hit determination volume having the relatively narrow third range set to the target object 42 when the normal display control process is performed, and determines whether or not the first straight line or the second straight line intersects the hit determination volume having the relatively wide fourth range set to the target object 42 when the special display control process is performed. Note that the hit determination range set to the first straight line and the second straight line may be changed without causing the hit determination volume set to the target object 42 to differ between the normal display control process and the special display control process. For example, the second position determination section 116 may determine whether or not the relatively narrow third range formed around the first straight line or the relatively narrow third range formed around the second straight line intersects the hit determination volume having a given range set to the target object 42 when the normal display control process is performed, and may determine whether or not the relatively narrow fourth range formed around the first straight line or the relatively narrow fourth range formed around the second straight line intersects the hit determination volume having a given range set to the target object 42 when the special display control process is performed.

6-17. Seventeenth Modification

The above embodiment has been described taking an example in which a plurality of image control devices 10 including the first image control device 10-1 and the second image control device 10-2 form a client-server online game system in which the image control devices 10 communicate via the server device 4. Note that a plurality of image control devices 10 including the first image control device 10-1 and the second image control device 10-2 may form a peer-to-peer online game system in which the image control devices 10 directly communicate.

Figure 32:
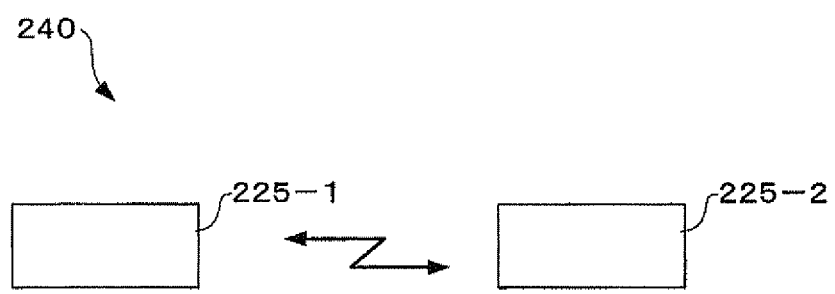
FIG. 32 is a view showing an example of an image control system according to a modification of the second embodiment of the invention.

FIG. 32 is a view showing a peer-to-peer image control system 240 that is formed by the first image control device 225-1 shown in FIG. 23 and a second image control device 225-2 that has the same configuration as that of the first image control device 225-1. Each of the first image control device 225-1 and the second image control device 225-2 can be carried by the player. The communication section 86 of each of the first image control device 225-1 and the second image control device 225-2 has a wireless LAN function. The wireless LAN function of the communication section 86 conforms to the IEEE 802.11 standard (e.g., IEEE 802.11b). The communication section 86 can perform a broadcast, unicast, or multicast packet communication (data communication).

The term broadcast communication refers to transmitting a packet including data to unspecified image control devices (nodes) present within the communication area of the first image control device 225-1. The first image control device 225-1 transmits data by designating a special network address that indicates the entire communication area of the first image control device 225-1. The term unicast communication refers to transmitting data (packet including data) to a specific image control device (node) present within the communication area of the first image control device 225-1 by designating a single network address. The term multicast communication refers to transmitting data (packet including data) to a plurality of image control devices (nodes) present within the communication area of the first image control device 225-1 by designating the network addresses of the plurality of image control devices.

In the image control system 240 that implements a peer-to-peer communication, the first image control device 225-1 or the second image control device 225-2 is set to be a host. The host stores management information so that information stored in the first image control device 225-1 coincides with information stored in the second image control device 225-2. Therefore, when the first image control device 225-1 and the second image control device 225-2 are present within the communication area, an identical image is displayed on the display section 60 of the first image control device 225-1 and the display section 60 of the second image control device 225-2, and the first image control device 225-1 and the second image control device 225-2 can execute an identical game.

6-18. Eighteenth Modification

The invention may be applied to various games. The invention may be applied to various image control devices such as an arcade game system, a consumer game system, a large-scale attraction system in which a number of players participate, a simulator, a multimedia terminal, a system board which generates a game image, and a mobile phone.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory information storage medium storing a program for controlling an image, the program causing a computer to function as:
 a designation position setting section that sets a first designation position based on first information that changes based on a first operation that designates a position within the image, and sets a second designation position based on second information that changes based on a second operation that designates a position within the image;
 a display control section that performs (i) a normal display control process that controls the image based on the first designation position, and controls the image based on the second designation position, and (ii) a special display control process that controls the image based on the first designation position and the second designation position being within a predetermined distance of each other; and
 an update section that (a) updates a destruction parameter with a first update parameter when the normal display control process is performed and a hit is caused in relation to the first operation or the second operation, and (b) updates the destruction parameter with a second update parameter when the special display control process is performed and a hit is caused in relation to the first operation or the second operation, wherein
 an update amount of the second update parameter is larger than an update amount of the first update parameter.

2. The information storage medium as defined in claim 1, wherein the display control section performs the normal display control process that displays a first display based on the first designation position, and displays a second display based on the second designation position, and performs the special display control process that displays a special display based on the first designation position and the second designation position.

3. The information storage medium as defined in claim 1, the program causing the computer to further function as:
 a first position determination section that determines a positional relationship between the first designation position and the second designation position,
 wherein the display control section controls at least one of a start and a finish of the special display control process and a start and a finish of the normal display control process based on the positional relationship between the first designation position and the second designation position.

4. The information storage medium as defined in claim 3, wherein the display control section performs the normal display control process that displays a first display based on the first designation position, and displays a second display based on the second designation position when the positional relationship between the first designation position and the second designation position is outside a first range, and displays one of a plurality of intermediate displays that gradually change in shape based on the positional relationship between the first designation position and the second designation position, based on the first designation position and the second designation position when the positional relationship between the first designation position and the second designation position is within the first range and outside a second range, and performs the special display control process that displays a special display based on the first designation position and the second designation position when the positional relationship between the first designation position and the second designation position is within the second range.

5. The information storage medium as defined in claim 1, the program causing the computer to further function as:
 a special position calculation section that calculates a special position based on the first designation position and the second designation position,
 wherein the display control section displays a special display based on the special position when the special display control process is performed, a first moving object relating to the first operation moves toward the special position instead of toward the first designation position, and a second moving object relating to the second operation moves toward the special position instead of toward the second designation position.

6. The information storage medium as defined in claim 1, the program causing the computer to further function as:
 a special position calculation section that calculates a special position based on the first designation position and the second designation position,
 wherein the display control section performs the special display control process that controls the image based on the special position.

7. The information storage medium as defined in claim 6, the program causing the computer to further function as:
 a second position determination section that performs a normal position determination process that determines a positional relationship between a display object displayed within the image and the first designation position, and determines a positional relationship between the display object and the second designation position, and performs a special position determination process that determines a positional relationship between the display object and the special position.

8. The information storage medium as defined in claim 1, the program causing the computer to further function as:
 a special position calculation section that calculates a special position based on the first designation position and the second designation position;
 a second position determination section that performs a normal position determination process that determines a positional relationship between a target object displayed within the image and the first designation position, and determines a positional relationship between the target object and the second designation position, and performs a special position determination process that determines a positional relationship between the target object and the special position; and
 an object space setting section that sets a hit determination volume so that a hit determination volume that is used when the special display control process is performed is larger than a hit determination volume that is used when the normal display control process is performed,
 wherein the display control section performs the special display control process that controls the image based on the special position, and
 wherein the position determination section determines whether the first moving object or the second moving object has hit the target object using the hit determination volume.

9. The information storage medium as defined in claim 1, the program causing the computer to further function as:
   a first position determination section that determines whether a positional relationship between the first designation position and the second designation position is within a given range,
   wherein the display control section performs the normal display control process that controls the image based on the first designation position, and controls the image based on the second designation position when the positional relationship between the first designation position and the second designation position is outside the given range, and performs the special display control process that controls the image based on at least one of the first designation position and the second designation position when the positional relationship between the first designation position and the second designation position is within the given range.

10. The information storage medium as defined in claim 1, the program causing the computer to further function as:
    a counter section that counts a given time,
    wherein the display control section controls at least one of a start and a finish of the special display control process and a start and a finish of the normal display control process based on whether the given time has elapsed.

11. The information storage medium as defined in claim 1, the program causing the computer to further function as:
    an event determination section that determines whether a given event has occurred,
    wherein the display control section controls at least one of a start and a finish of the special display control process and a start and a finish of the normal display control process based whether the given event has occurred.

12. The information storage medium as defined in claim 1, wherein the designation position setting section sets three or more designation positions based on three or more pieces of information that respectively change based on three or more operations that designate a position within the image, and
    wherein the display control section performs the normal display control process that controls the image based on each of the three or more designation positions, performs the special display control process that controls the image based on the three or more designation positions, and controls at least one of a start and a finish of the special display control process and a start and a finish of the normal display control process based on a number of the designation positions.

13. The information storage medium as defined in claim 1, the program causing the computer to further function as:
    an attribute setting section that links one of a plurality of attributes to each of the first designation position and the second designation position,
    wherein the display control section controls at least one of a start and a finish of the special display control process and a start and a finish of the normal display control process based on a combination of the attributes linked to the first designation position and the second designation position.

14. The information storage medium as defined in claim 1, the program causing the computer to further function as:
    a second position determination section that determines a positional relationship between a display object displayed within the image and the first designation position, and determines a positional relationship between the display object and the second designation position; and
    an object space setting section that sets a hit determination volume so that a hit determination volume that is used when the special display control process is performed is larger than a hit determination volume that is used when the normal display control process is performed,
    wherein the display control section performs the special display control process that displays a special display based on the first designation position and the second designation position, and
    wherein the second position determination section determines whether the first moving object or the second moving object has hit the target object using the hit determination volume.

15. The information storage medium as defined in claim 1, the program causing the computer to further function as:
    a first position determination section that determines whether a positional relationship between the first designation position and the second designation position is within a given range;
    a second position determination section that performs a normal position determination process that determines a positional relationship between a display object displayed within the image and the first designation position, and determines a positional relationship between the display object and the second designation position, and performs a special position determination process that determines a positional relationship between the display object and the special position:
    a special position calculation section that calculates a special position based on the first designation position and the second designation position,
    an attribute setting section that links one of a plurality of attributes to each of the first designation position and the second designation position; and
    a range change section that changes the given range based on a combination of the attributes linked to the first designation position and the second designation position, wherein
    the display control section performs (iii) the normal display control process that controls the image based on the first designation position, and controls the image based on the second designation position when the positional relationship between the first designation position and the second designation position is outside the given range, (iv) the special display control process that controls the image based on at least one of the first designation position and the second designation position when the positional relationship between the first designation position and the second designation position is within the given range, and (v) the special display control process that controls the image based on the special position, and
    the second position determination section performs the normal position determination process that determines the positional relationship between the display object and the first designation position based on a third range, and determines the positional relationship between the display object and the second designation position based on the third range, and performs the special position determination process that determines the positional relationship between the display object and the special position based on a fourth range.

16. The information storage medium as defined in claim 1, the program causing the computer to further function as:
    an attribute setting section that links one of a plurality of attributes to each of the first designation position and the second designation position; and an update parameter change section that changes at least one of the first update parameter and the second update parameter based on a combination of the attributes linked to the first designation position and the second designation position.

17. The information storage medium as defined in claim 1, the program causing the computer to further function as:
an attribute setting section that links one of a plurality of attributes to each of the first designation position and the second designation position,
wherein the display control section controls the image based on a combination of the attributes linked to the first designation position and the second designation position.

18. The information storage medium as defined in claim 1, wherein the display control section functions as:
an object space setting section that sets an object in an object space,
a virtual camera control section that controls at least one of a position, a direction, and an angle of view of a virtual camera based on the given condition, and
a drawing section that draws an image of the object space viewed from the virtual camera.

19. The information storage medium as defined in claim 1, the program causing the computer to further function as:
a second position determination section that determines a positional relationship between a target object displayed within the image and the first designation position, and determines a positional relationship between the target object and the second designation position,
wherein the display control section performs the special display control process based on the positional relationship between the target object and the first designation position and the positional relationship between the target object and the second designation position.

20. The information storage medium as defined in claim 1, the program causing the computer to further function as:
a second position determination section that determines a positional relationship between a target object displayed within the image and the first designation position, and determines a positional relationship between the target object and the second designation position,
wherein the display control section performs (iii) the special display control process based on the positional relationship between the target object and the first designation position and the positional relationship between the target object and the second designation position, and (iv) the normal display control process that moves the target object based on the first designation position, and moves the target object based on the second designation position.

21. The information storage medium as defined in claim 1, the program causing the computer to further function as:
a first designation position setting section that sets a first designation position based on first information that changes based on a first operation that designates a position within an image displayed on a first image control device;
a communication control section that causes the first image control device to transmit the first information to a destination, and receive second information that changes based on a second operation that designates a position within an image displayed on a second image control device; and
a second designation position setting section that sets a second designation position based on the second information.

22. The information storage medium as defined in claim 21,
wherein the communication control section causes the first image control device to receive two or more pieces of information that respectively change based on two or more operations that designate a position within an image displayed on each of two or more of the second image control devices,
wherein the second designation position setting section sets two or more designation positions based on the two or more pieces of information, and
wherein the display control section performs the normal display control process that controls the image based on the first designation position, and controls the image based on each of the two or more designation positions, performs the special display control process that controls the image based on the first designation position and the two or more designation positions, and controls at least one of a start and a finish of the special display control process and a start and a finish of the normal display control process based on a number of the designation positions.

23. The information storage medium as defined in claim 1, wherein
the display control section (iii) displays a first gun sight that indicates a first attack position based on the first designation position, (iv) displays a second gun sight that indicates a second attack position based on the second designation position, and (v) when performing a special display control process, displays an attack effect based on a positional relationship between the first designation position and the second designation position.

24. A non-transitory information storage medium storing a program for controlling an image, the program causing a computer to function as:
a designation position setting section that sets a first designation position based on first information that changes based on a first operation that designates a position within the image, and sets a second designation position based on second information that changes based on a second operation that designates a position within the image:
a second position determination section that determines a positional relationship between a target object displayed within the image and the first designation position, and determines a positional relationship between the target object and the second designation position,
a display control section that performs (i) a normal display control process that controls the image and moves the target object based on the first designation position, and controls the image and moves the target object based on the second designation position, and (ii) a special display control process that controls the image based on the first designation position and the second designation position based on the positional relationship between the target object and the first designation position and the positional relationship between the target object and the second designation position;
an update section that (i) updates a destruction parameter with a first update parameter when the normal display control process is performed and a hit is caused in relation to the first operation or the second operation, and (ii) updates the destruction parameter with a second update parameter when the special display control process is performed and a hit is caused in relation to the first operation or the second operation, wherein an update amount of the second update parameter is larger than an update amount of the first update parameter, wherein the second position determination section determines whether a positional relationship between a first object displayed within the image and the first designation position satisfies a third condition, determines whether a positional relationship between a second object displayed within the image and the first designation position satisfies the third condition, determines whether a positional relationship between the first object and the second designation position satisfies the third condition, and determines whether a positional relationship between the second object and the second designation position satisfies the third condition; and wherein the display control section performs the normal display control process that moves the first object based on the first designation position when the positional relationship between the first object and the first designation position satisfies the third condition, and moves the first object based on the second designation position when the positional relationship between the first object and the second designation position satisfies the third condition, and performs the special display control process that moves the second object based on at least one of the first designation position and the second designation position when the positional relationship between the second object and the first designation position and the positional relationship between the second object and the second designation position satisfy the third condition.

25. The information storage medium as defined in claim 24, wherein the display control section does not move the second object based on the first designation position when the positional relationship between the second object and the second designation position does not satisfy the third condition even when the positional relationship between the second object and the first designation position satisfies the third condition, and does not move the second object based on the second designation position when the positional relationship between the second object and the first designation position does not satisfy the third condition even when the positional relationship between the second object and the second designation position satisfies the third condition.

26. An image control device that controls an image, the image control device comprising:

a designation position setting section that sets a first designation position based on first information that changes based on a first operation that designates a position within the image, and sets a second designation position based on second information that I changes based on a second operation that designates a position within the image;

a display control section that performs (i) a normal display control process that controls the image based on the first designation position, and controls the image based on the second designation position, and (ii) a special display control process that controls the image based on the first designation position and the second designation position being within a predetermined distance of each other; and an update section that (i) updates a destruction parameter with a first update parameter when the normal display control process is performed and a hit is caused in relation to the first operation or the second operation, and (ii) updates the destruction parameter with a second update parameter when the special display control process is performed and a hit is caused in relation to the first operation or the second operation, wherein an update amount of the second update parameter is larger than an update amount of the first update parameter.

27. The image control device as defined in claim 26, wherein the display control section (iii) displays a first gun sight that indicates a first attack position based on the first designation position, (iv) displays a second gun sight that indicates a second attack position based on the second designation position, and (v) when performing the special display control process, displays an attack effect based on a positional relationship between the first designation position and the second designation position.

28. An image control method that controls an image, the image control method comprising:

setting a first designation position based on first information that changes based on a first operation that designates a position within the image, and setting a second designation position based on second information that changes based on a second operation that designates a position within the image;

performing a normal display control process that controls the image based on the first designation position, and controls the image based on the second designation position;

performing a special display control process that controls the image based on the first designation position and the second designation position being within a predetermined distance of each other;

updating a destruction parameter with a first update parameter when the normal display control process is performed and a hit is caused in relation to the first operation or the second operation; and updating the destruction parameter with a second update parameter when the special display control process is performed and a hit is caused in relation to the first operation or the second operation, wherein an update amount of the second update parameter is larger than an update amount of the first update parameter, and at least one of the setting, the performing a normal display control process, the performing a special display control process, the updating a destruction parameter with a first update parameter, and the updating a destruction parameter with a second update parameter are performed by a processor.

29. The image control method as defined in claim 28, further comprising:

displaying a first gun sight that indicates a first attack position based on the first designation position;

displaying a second gun sight that indicates a second attack position based on the second designation position; and when performing the special display control process, displaying an attack effect based on a positional relationship between the first designation position and the second designation position.

* * * * *